(12) United States Patent
Lalande et al.

(10) Patent No.: US 11,642,838 B2
(45) Date of Patent: May 9, 2023

(54) PROCESS CONTROL SYSTEMS AND METHODS USING A SOLID-STATE ADDITIVE MANUFACTURING SYSTEM AND CONTINUOUS FEEDING SYSTEMS AND STRUCTURES

(71) Applicant: MELD MANUFACTURING CORPORATION, Christiansburg, VA (US)

(72) Inventors: Frederic Lalande, Blacksburg, VA (US); Christopher Garguilo, Blacksburg, VA (US); Chase Cox, Blacksburg, VA (US); Nanci Hardwick, Blacksburg, VA (US); Anita T Broach, Christiansburg, VA (US)

(73) Assignee: Meld Manufacturing Corporation, Christiansburg, VA (US)

( * ) Notice: Subject to any disclaimer, the term of this patent is extended or adjusted under 35 U.S.C. 154(b) by 36 days.

(21) Appl. No.: 17/016,517

(22) Filed: Sep. 10, 2020

(65) Prior Publication Data
US 2021/0078258 A1    Mar. 18, 2021

Related U.S. Application Data

(63) Continuation of application No. PCT/US2019/021910, filed on Mar. 12, 2019.
(Continued)

(51) Int. Cl.
*B29C 64/393* (2017.01)
*B33Y 50/02* (2015.01)
(Continued)

(52) U.S. Cl.
CPC ......... *B29C 64/393* (2017.08); *B29C 64/147* (2017.08); *B29C 64/218* (2017.08);
(Continued)

(58) Field of Classification Search
CPC ... B29C 64/393; B29C 64/147; B29C 64/218; B29C 64/236; B29C 64/241; B29C 64/245; B29C 64/329; B33Y 50/02; B33Y 30/00
See application file for complete search history.

(56) References Cited

U.S. PATENT DOCUMENTS

| | | | |
|---|---|---|---|
| 8,397,947 | B2 | 3/2013 | Schultz |
| 8,875,976 | B2 | 11/2014 | Schultz |

(Continued)

FOREIGN PATENT DOCUMENTS

| | | |
|---|---|---|
| CN | 106112254 A | 11/2016 |
| CN | 107598357 A | 1/2018 |

(Continued)

OTHER PUBLICATIONS

ISR for PCT/US19/21910 dated Sep. 11, 2019.
ESSR for EP19767147.2 dated Mar. 9, 2022.

*Primary Examiner* — Michael M. Robinson
(74) *Attorney, Agent, or Firm* — Rhodes IP PLC; Christopher R. Rhodes

(57) ABSTRACT

A process control system and a method for process control of a solid-state additive manufacturing system capable of performing various additive processes, such as joining, additive manufacturing, coating, repair and others, are disclosed. The process control system is capable of simultaneous measuring, monitoring and controlling multiple process variables, viz. material temperature, actuator down force, tool force (or torque), tool position, tool angular and transverse velocity, spindle torque (angular velocity), filler flow rate, filler composition, track width, inert gas flow rate and others. A feeding system for continuous supply of filler material to the solid-state additive manufacturing system is also disclosed. The filler material can be in a form of a powder, granules, briquettes, beads, flakes, wires, rods, (Continued)

films, scrap pieces, sheets, blocks or their combinations. Methods for generation of different periodic and non-periodic structures and joints using the process-controlled solid-state additive manufacturing system are also disclosed.

13 Claims, 56 Drawing Sheets

Related U.S. Application Data

(60) Provisional application No. 62/663,595, filed on Apr. 27, 2018, provisional application No. 62/641,931, filed on Mar. 12, 2018.

(51) Int. Cl.
*B29C 64/147* (2017.01)
*B29C 64/329* (2017.01)
*B29C 64/245* (2017.01)
*B29C 64/236* (2017.01)
*B29C 64/241* (2017.01)
*B29C 64/218* (2017.01)
*B33Y 30/00* (2015.01)

(52) U.S. Cl.
CPC .......... *B29C 64/236* (2017.08); *B29C 64/241* (2017.08); *B29C 64/245* (2017.08); *B29C 64/329* (2017.08); *B33Y 50/02* (2014.12); *B33Y 30/00* (2014.12)

(56) References Cited

U.S. PATENT DOCUMENTS

| | | |
|---|---|---|
| 8,893,954 B2 | 11/2014 | Schultz |
| 9,205,578 B2 | 12/2015 | Schultz |
| 9,266,191 B2 | 2/2016 | Kandasamy |
| 9,463,279 B2 | 10/2016 | Pommereu |
| 9,511,445 B2 | 12/2016 | Kandasamy |
| 9,511,446 B2 | 12/2016 | Kandasamy |
| 9,862,054 B2 | 1/2018 | Kandasamy |
| 9,943,929 B2 | 1/2018 | Schultz |
| 10,105,790 B2 | 10/2018 | Kandasamy |
| 2012/0279441 A1 | 11/2012 | Creehan |
| 2012/0279442 A1* | 11/2012 | Creehan .................. C23C 26/00 228/2.1 |
| 2015/0045928 A1 | 2/2015 | Perez et al. |
| 2017/0216962 A1* | 8/2017 | Schultz .............. B23K 20/1215 |
| 2018/0050418 A1* | 2/2018 | Dong .................... B33Y 30/00 |
| 2018/0361501 A1 | 12/2018 | Hardwick |
| 2020/0306869 A1 | 10/2020 | Hardwick |
| 2021/0197457 A1 | 7/2021 | Broach |
| 2021/0245293 A1 | 8/2021 | Hardwick |
| 2021/0283846 A1* | 9/2021 | Otis, Jr. ................ B33Y 10/00 |
| 2021/0308937 A1 | 10/2021 | Broach |
| 2022/0080522 A1 | 3/2022 | Cox |
| 2022/0176633 A1 | 6/2022 | Hardwick |

FOREIGN PATENT DOCUMENTS

| | | |
|---|---|---|
| EP | 3703888 A1 | 9/2020 |
| KR | 10-1099863 B1 | 12/2011 |
| WO | 2013002869 A2 | 1/2013 |

* cited by examiner

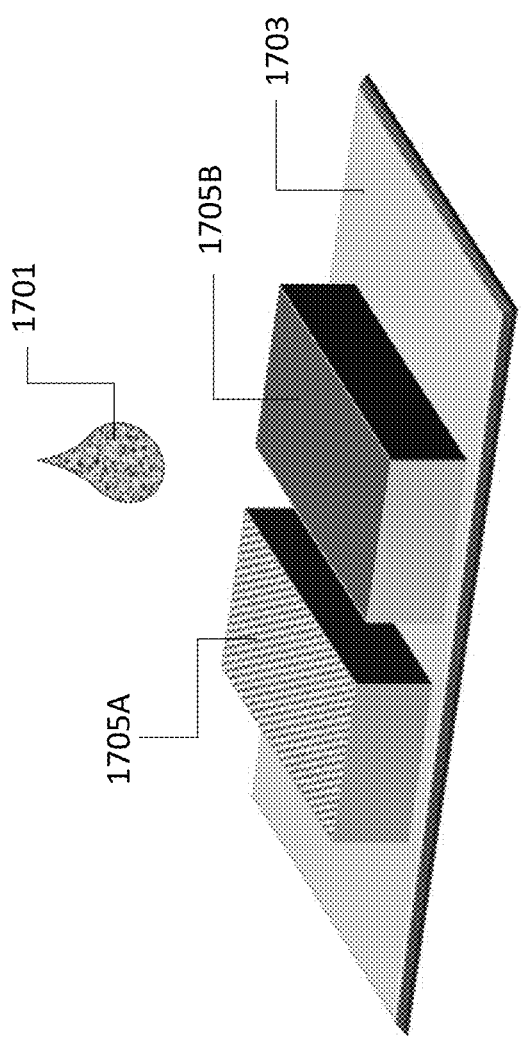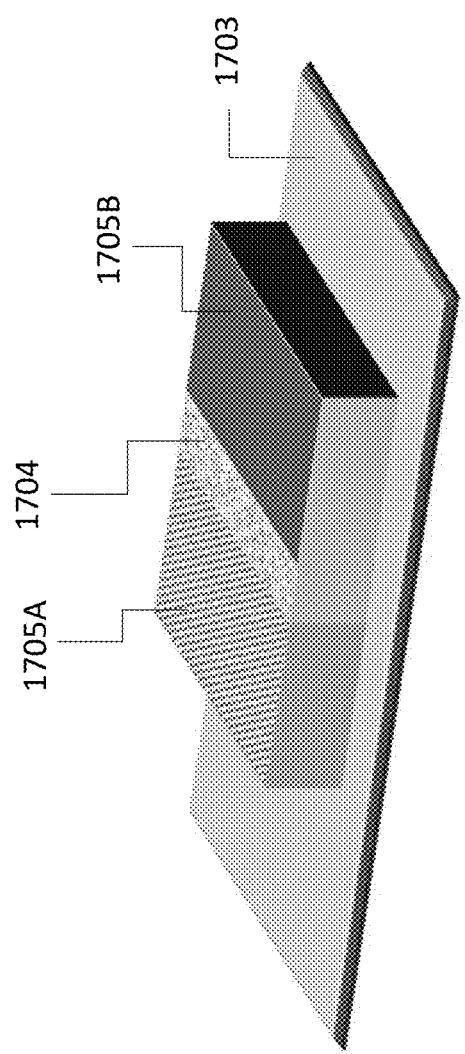

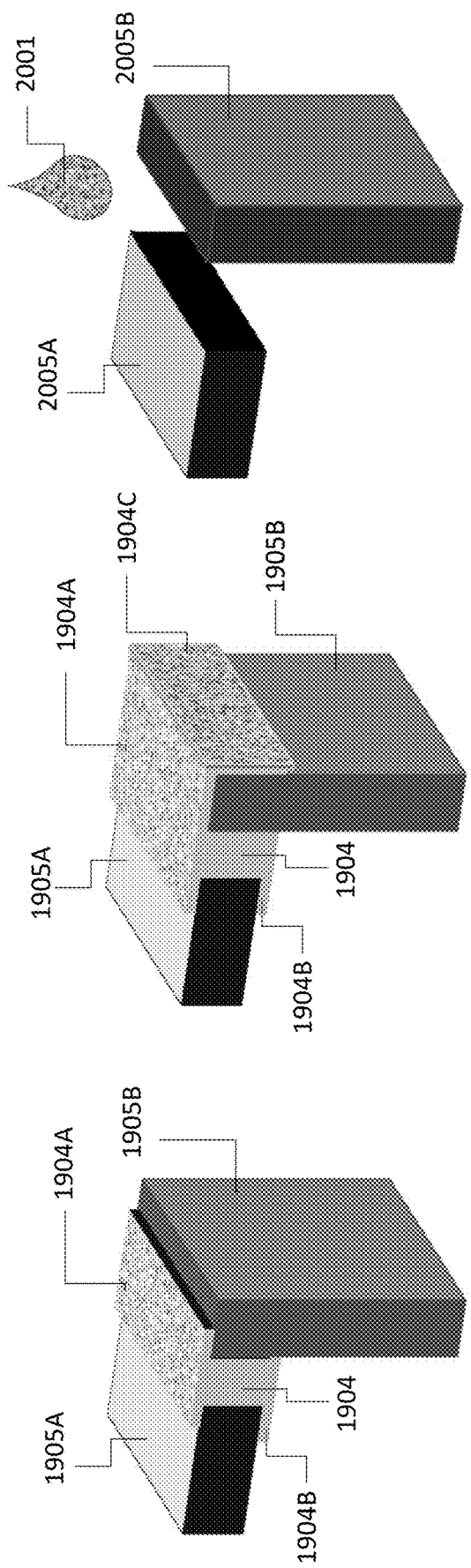

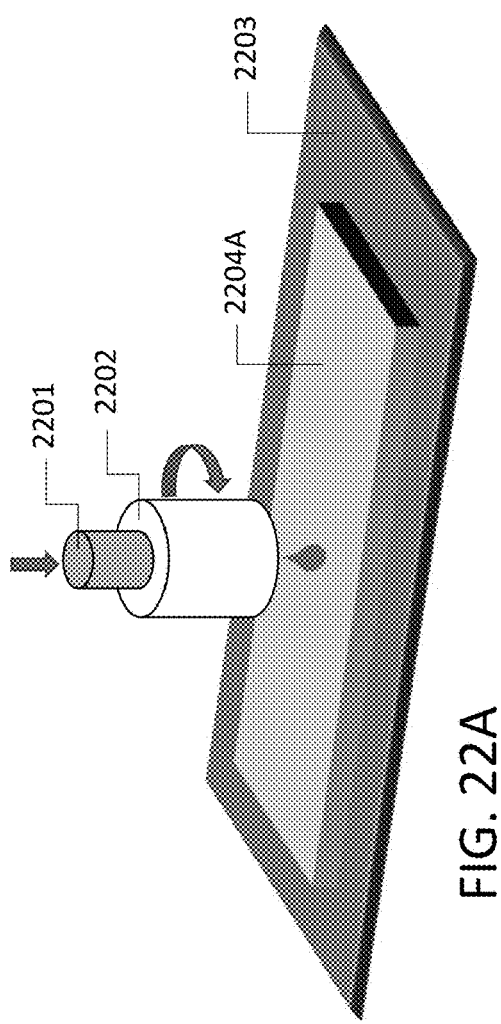
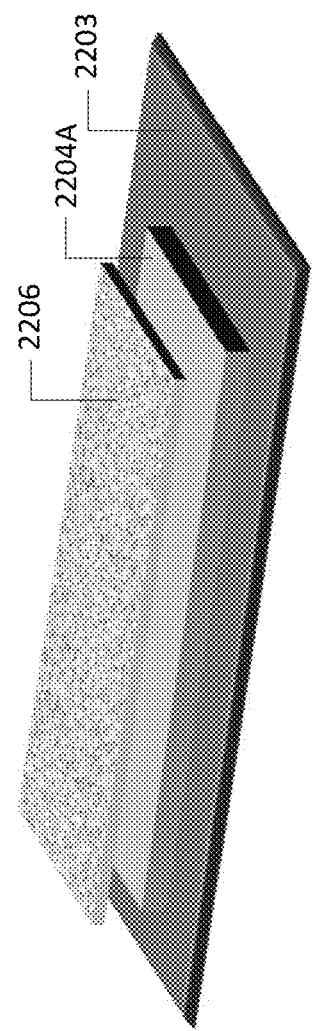
FIG. 22A
FIG. 22B

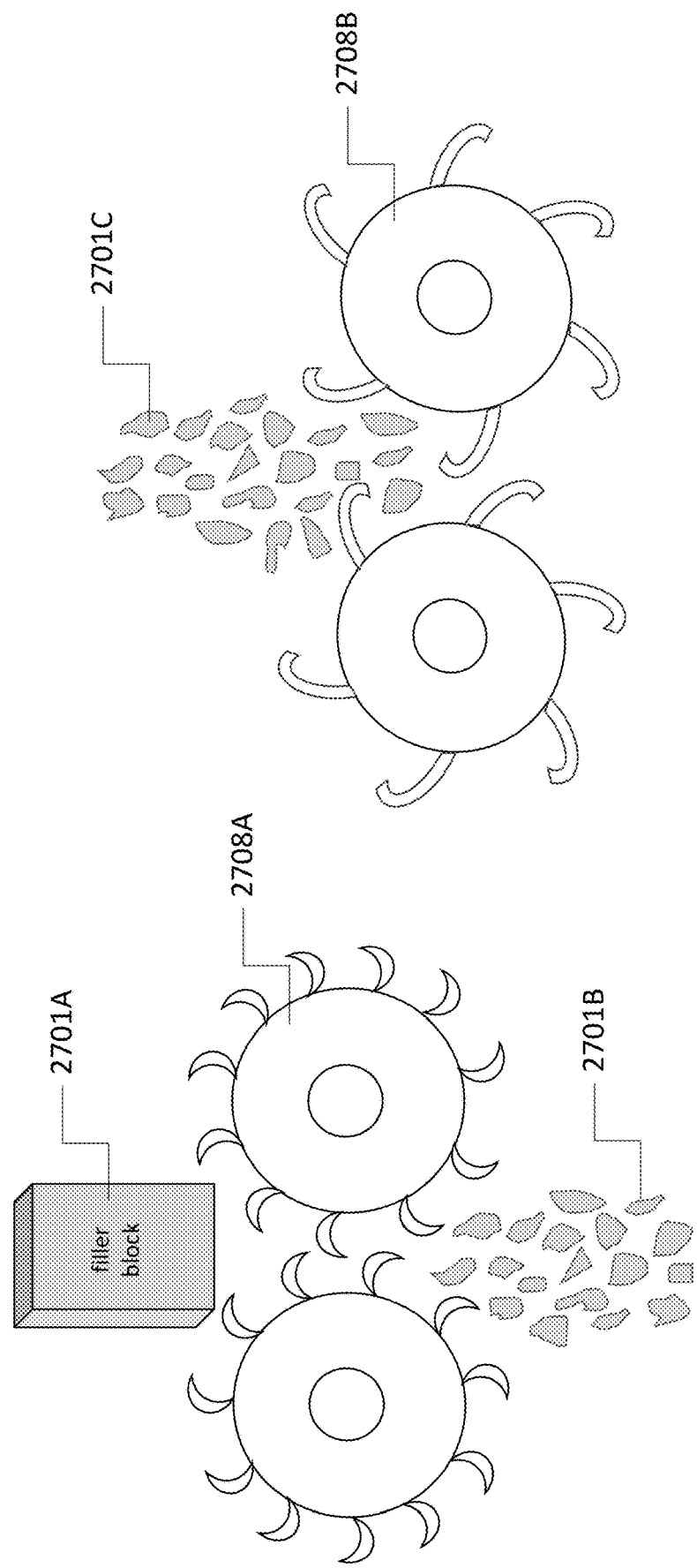

PROCESS CONTROL SYSTEMS AND METHODS USING A SOLID-STATE ADDITIVE MANUFACTURING SYSTEM AND CONTINUOUS FEEDING SYSTEMS AND STRUCTURES

CROSS-REFERENCE TO RELATED APPLICATIONS

This application is a continuation application of PCT/US2019/021910 filed on Mar. 12, 2019. This application also relies on the disclosure of and claims priority to and the benefit of the filing date of U.S. Provisional Application No. 62/641,931 filed on Mar. 12, 2018, and U.S. Provisional Application No. 62/663,595 filed on Apr. 27, 2018, the disclosures of which are hereby incorporated by reference in their entireties.

SUMMARY

Embodiments of the invention provide a process control system for a solid-state additive manufacturing system and various related operations performed by a solid-state additive manufacturing machine. The solid-state additive manufacturing machine is capable of deposition of different filler materials, viz. metals, metal alloys, metal matrix composites (MMCs), polymers, plastics, ceramics, composites, hybrid materials and various gradient compositions, where the filler material is in a form of a rod, wire, granules, powder, powder-filled-tube, sheet, irregular flakes, or their combination and is deposited on and/or in a workpiece. By depositing a material by the solid-state additive manufacturing machine and utilizing certain process conditions, solid-state additive processing including coating, joining, surface functionalization, repair or fabrication of 3D- and 4D-structures can be accomplished. Depending on the performed process and the process conditions, the deposited material may have different structures at the nano- and/or micro-levels in comparison to the structures present in the incoming filler material, may have gradient structures and/or compositions, porous structures, combinations of multiple nano-/micro-structures, etc. The workpiece used in a solid-state additive manufacturing process can be or include almost any shape and/or size including but not limited to flat or curved substrates, joints (including but not limited to corner joints, butt joints, lap joints, tee joints, and edge joints), rails, pipes, window frames, automotive and aerospace parts and structures and many other structures.

The solid-state additive manufacturing system that is capable of performing any of the following processes, viz. coating, joining, surface functionalization, repair or fabrication of 3D- and 4D-structures, is intrinsically different from any of the friction stir systems known in the art. The main difference from the known art is that the solid-state additive manufacturing system is performing the additive process as a solid-state thermo-mechanical additive process by adding the material, known as a filler material, to the workpiece(s) to generate a joint, repair a defective spot, coat a part, or generate an additive 3D- or 4D-structure. The solid-state additive manufacturing process is in fact a solid-state process that deposits the filler material on a workpiece or in a workpiece, mixes and homogenizes the materials (filler and workpiece material) with the aid of frictional heating, which occurs due to the severe friction in the processed zone and generates chemical or physical bonding between the deposited material and the workpiece without the filler material melting.

Briefly, the basics of these solid-state additive manufacturing processes include: 1. heat is generated by the friction between the rotating tool and the workpiece surface; 2. the generated heat enables significant amount of plastic deformation in the vicinity of the rotating tool; 3. a substantial strain is imparted to the workpiece material resulting in refinement of its micro-structure; 4. material adjacent to the tool softens and the softened material is mechanically stirred; and/or 5. at the same time or within close proximity of the softening of the material, the softened material is mixed and joined with the filler material added via the passageway of the tool using mechanical pressure supplied by the tool shoulder.

Some of the benefits of these solid-state additive manufacturing processes, only some of which are described herein, include: 1. they are solid-state, and often single-step processes; 2. they offer the possibility to work with thermally-sensitive and air-sensitive materials; 3. they do not require prior surface preparation; 4. they provide good dimensional stability (minimal distortion of the parts because it is performed in a solid state); 4. they enable good control over the processed workpiece's surface depth; 5. they consume little energy since the heat is generated by friction, and thus, no external energy is needed to cause the plastic deformation of the material; 6. they facilitate excellent bonding properties with the substrate (workpiece); 7. they have a good reproducibility; and 8. they offer potential for process automation. Therefore, the solid-state additive manufacturing system and the associated solid-state additive manufacturing processes and technologies are considered to be environmentally-friendly, mainly due to the relatively low external energy costs, as well as the fact that no harsh chemicals are needed in the process and no exhaust gases and fumes are generated.

The present invention relates to tools and methods for disposing, coating, repairing, or modifying the surface of a metal substrate using frictional heating and compressive/shear loading of a consumable metal against the substrate. More particularly, embodiments of the invention include solid-state additive friction-based fabrication tooling comprising a non-consumable member with a throat and a consumable member disposed in the throat, wherein consumable filler material is capable of being introduced to the throat in a continuous manner during deposition using frictional heating and compressive/shear loading of the filler material onto the substrate.

The inventors have developed new deposition techniques for solid-state additive manufacturing tools, such as friction-based fabrication tools. The techniques and tooling allow for the repair of, joining of, and/or altering of the composition of and depositing of coatings on substrates, such as metal substrates, efficiently and in a simple manner. For example, the inventors have developed a tool comprising a non-consumable body and a throat defining a passageway lengthwise through the body which is shaped to deliver a consumable filler material to a substrate using compressive loading and frictional heating. Such tools are capable of resulting in high quality adhesions between the substrate and filler material and high strength products which have an increased resistance to failure.

The inventors have made further advancements in this field by reducing the effect of some of the mechanical challenges presented by feeding solid material into a spindle, including reducing down time of the machinery due to build-up of consumable material within the spindle, improving efficiency of the deposition process by finding ways to continuously introduce consumable material to the tool, and by developing processes for introducing variations in the composition of the feed material during the deposition process and for preparing functionally graded substrates in a simplified manner.

Such advancements in the field have made digital manufacturing of specialty alloys a possibility. State-of-the-art digital manufacturing technologies for metal parts have evolved around powder metallurgy and fusion welding-based processes. Both of these processing methodologies yield parts with inferior mechanical and physical properties as compared to wrought metal of the same composition. Additionally, the production rates for even the fastest processes are relatively low (about 40 lbs./hr for Ti) and the part envelopes are limited to a few cubic feet.

To address some of these particular manufacturing difficulties, the present inventors have developed a novel high-speed, large-volume wrought metal deposition technology capable of enabling affordable, full-density, near net-shape component manufacturing from a wide range of alloys, including specialty high-strength steels and ultra-fine-grained alloys. The ability to rapidly fabricate complex wrought alloy components from the ground up will provide a leap-ahead advancement in digital manufacturing and combat readiness.

The great flexibility of the solid-state additive manufacturing system to perform many processes of many varieties requires complex process control systems. Some of the complexity of these processes originates from the variety of materials that can be deposited by the solid-state additive manufacturing machine, as well as the variety of substrates, structures and parts that can be subjected to the deposition operations. Each category of the materials that can be deposited with the solid-state additive manufacturing machine as fillers can differ considerably from each other, resulting in the requirement for controlled process parameters to be very different from one category to another. For instance, the required down force, the torque, the temperature, the filler flow rate, or the generated friction and associated frictional heating are very different for a thermoplastic polymer filler material from those for a steel or aluminum filler material. Furthermore, the form of the material to be deposited (powder, pellets, rods, sheets, wires, or irregular flakes or any combination of them) dictates which of the parameters are critical or limiting for the particular solid-state additive manufacturing operation. The substrate or the part subjected to the solid-state additive manufacturing deposition operation further dictates which parameters need to be closely measured, monitored and controlled as well as their corresponding critical values' ranges.

The variation in tool geometries and sizes further complicates the process control system. Different tool geometries and sizes coupled with the filler materials properties supplied by the tool to the surface of the substrate will affect the parameter values that need to be controlled. The potential to perform different operations with a given solid-state additive manufacturing machine, such as cladding, coating, surface functionalization, repair, cavity filling, rib deposition and so on, adds another requirement for the process control system to be flexible and accommodate all of the different tools and operations that are available. Furthermore, the tool and the pin (if present) might rotate with the same or different speeds, in the same or opposite direction, as compared with the speed(s) of the shoulder and the spindle. The pin (if present) might penetrate within different depths in the workpiece, or the pin (if present) may be positioned so as not to penetrate the workpiece.

What makes the solid-state additive manufacturing process even more complicated is the fact that there are auxiliary operations that are required to be performed before, during and after performing the main process and such auxiliary operations need to be tightly controlled and might vary from one process to another.

Taking into account all of the variables, both independent and dependent, there is a need for controlling the values of the relevant process variables and the movements of all the relevant machine parts operating within the solid-state additive manufacturing system. An adequate process control system will measure, sense and record the relevant process variables and will be capable of providing a feedback, i.e. action or correction, if those variables that are closely controlled are outside of the specified range of values.

Therefore, there is an urgent need for a process control system capable of controlling a complex solid-state additive manufacturing machine and associated parts, which process control system should also be capable of controlling various sets of multiple variables that need to be measured and/or monitored during various additive manufacturing processes. Such a process control system can be programmed with computer-readable code (i.e. software) for control of the master set of process variables, their critical values and allowed process value ranges, as well as sets of process variables that do not need tight process control but need to be monitored/recorded. Moreover, the process control system and software-controlled solid-state additive manufacturing machine can control not only the specified master set of variables (usually comprising independent process variables), but also the process variables that are dependent on the already controlled independent process variables. These dependent variables, also known as nested controlled variables, are closely related to some of the independent variables and do not need to be controlled in a closed loop system; open loop control or only their monitoring is sufficient. As an example only, by controlling the spindle and/or tool angular velocity, one could affect the spindle and/or tool torque and could indirectly control the temperature of the filler material before and during its deposition on the workpiece.

According to embodiments of the present invention, the process control system includes multiple operationally-synchronized open and closed control loops. The process control system is capable of accommodating and controlling various solid-state additive manufacturing processes and operations dealing with a wide range of materials by taking into account the filler material properties (density, melting point, compressive strength, tensile strength, etc.) and forms (powder, granules, rods) and then suggesting process variables that would yield the desired material structure in the deposited layer while providing satisfactory bonding with the workpiece. Moreover, the process control system is capable of controlling the solid-state additive manufacturing machine dealing with variety of workpieces with simple and complex geometries (e.g. flat substrates, pipes, rails, aerospace and automotive parts, etc.).

According to embodiments, the process control system of the present invention includes multiple sensors, detectors and cameras for monitoring, measuring and observing the solid-state additive manufacturing process variables. The sensors can be disposed in multiple locations. For instance, temperature sensors can be located in or around the feeding system, and/or in, around the spindle, and/or in, around the tool, and/or in, around various areas or spots of a workpiece and/or backing panel, etc. A sensor for angular velocity can be used in conjunction with the spindle and the tool (if the velocities are different). A position sensor can be used in multiple locations for sensing the position of the filler rod, tool position, workpiece position, etc.

As examples only, listed below are the sensors that are used as integral parts of the process control system:

| Process variable | Sensor |
| --- | --- |
| Position | Hall-effect sensor, potentiometer, encoder, laser |
| Force | Force gauge |
| Torque, strain, stress | Strain gauge |
| Angular velocity | Hall-effect sensor, optical gate, encoder |
| Linear velocity | Encoder |
| Track roughness | Profilometer, camera |
| Temperature | Pyrometer, thermo-couple, thermometer |
| Track thickness | Dial indicator, digital balance, proximity sensor |

The process control system can be operated manually or automatically. Automatic operation is a great feature for each process control system, especially in situations where a new type of a filler material is introduced. For instance, suppose a new polymer material needs to be deposited as a coating with the solid-state additive manufacturing machine. The polymer is introduced as a filler material and its material properties are imported into an algorithm, as a part of the process-controlled solid-state additive manufacturing system. The algorithm takes into account one or more properties of the polymer, such as the friction coefficient, the compressive strength and so on, and calculates how much push down force is needed, the required torque of the spindle, and the torque of the tool at a given operational temperature to execute the required operation of coating the polymer on the workpiece. The solid-state additive manufacturing machine starts to perform its operations and subroutines by an automatically-governed control system, but let's suppose that the operator is noticing excess material heating, and thus, material flowing on the workpiece surface and no sufficient friction stir force is in place. The process control system provides the operator with the opportunity to manually import a command, e.g. for changes in the tool angular velocity or for the tool torque, which will immediately affect the filler temperature and deposition rate. Or, if the solid-state additive manufacturing machine operator notices a "flashing" behavior of the filler material on the workpiece surface during the deposition process due to an improperly adjusted tool speed (rotational, transverse) or tool downward force, then the operator has an option to intervene in the process control and adjust the tool speed or tool force or both manually.

Various Aspects of the Invention are provided below. However, these should not be construed to be limiting.

Aspect A1. A method for process control of a solid-state additive manufacturing system comprising at least one of the following steps:

a) Identifying measured, controlled and manipulated solid-state additive manufacturing process variables for the particular solid-state additive manufacturing process;

b) Generating algorithms for process control of solid-state additive manufacturing variables and system parts;

c) Generating codes for the controlled solid-state additive manufacturing process variables and codes for the controlled movements of different solid-state additive manufacturing system parts relevant for the particular solid-state additive manufacturing process;

d) Measuring and recording the process values, PV, for each of the controlled process variable at the critical locations in the solid-state additive manufacturing system and at certain time periods for discontinuous variable measurements;

e) Calculating the difference Δ (Δ=SP−PV) for each of the controlled process variable, where SP is the set value;

f) Generating feedback control signals for each of the controlled process variables, if the difference (A) is outside of their respective critical ranges A; and/or g) Generating movements of the relevant solid-state additive manufacturing machine parts by computer execution of the codes that control the operation of the machine parts.

Aspect A2. The method of Aspect A1, wherein the particular solid-state additive manufacturing process is one of the following: joining, coating, surface functionalization, repair or additive manufacturing of a 3D-structure or any combination of these.

Aspect A3. The method of Aspect A1 or any preceding Aspect, wherein the measured variables are those which have been measured and include at least one of the following variables: filler material temperature, spindle temperature, tool temperature, tool position, down force, tool pressure, spindle torque, spindle angular velocity, tool torque, tool transverse velocity, tool angular velocity, filler material flow rate, gas flow rate, and vibration.

Aspect A4. The method of Aspect A1 or any preceding Aspect, wherein the controlled variables are those which are corrected by influencing their input to the solid-state additive manufacturing machine and include at least one of the following variables: filler material temperature, spindle temperature, tool temperature, tool position, down force, tool pressure, spindle torque, spindle angular velocity, tool torque, tool transverse velocity, tool angular velocity, filler material flow rate, gas flow rate, and vibration.

Aspect A5. The method of Aspect A1 or any preceding Aspect, wherein the manipulated variables are those which input has been corrected into the solid-state additive manufacturing process and include at least one of the following variables: filler material temperature, spindle temperature, tool temperature, tool position, down force, tool pressure, spindle torque, spindle angular velocity, tool torque, tool transverse velocity, tool angular velocity, filler material flow rate, gas flow rate, and vibration.

Aspect A6. The method of Aspect A1 or any preceding Aspect, wherein the computer execution of certain codes is capable of controlling the movements of certain solid-state additive manufacturing machine parts and wherein controlled solid-state additive manufacturing machine parts are being at least one of the following: the feeding system, the spindle, the tool and the workpiece(s).

Aspect A7. The method of Aspect A1 or any preceding Aspect, wherein the computer execution of certain codes is capable of controlling the rotational and/or the transverse movements of certain machine parts.

Aspect A8. The method of Aspect A7 or any preceding Aspect, wherein the computer execution of a code controls the transverse movement of the actuator pushing the filler rod.

Aspect A9. The method of Aspect A7 or any preceding Aspect, wherein the computer execution of a code controls the movement of the powder-like or granular filler material.

Aspect A10. The method of Aspect A7 or any preceding Aspect, wherein the computer execution of a code controls the rotational movement of the spindle.

Aspect A11. The method of Aspect A7 or any preceding Aspect, wherein the computer execution of a code controls the transverse movement of the tool.

Aspect A12. The method of Aspect A7 or any preceding Aspect, wherein the computer execution of a code controls the rotational movement of the tool.

Aspect A13. The method of Aspect A7 or any preceding Aspect, wherein the computer execution of a code controls the transverse movement of the workpiece(s).

Aspect A14. The method of Aspect A1 or any preceding Aspect, which is capable of monitoring and controlling the temperature of the hopper, wherein the filler material in a form of powder or granules or their combination is supplied.

Aspect A15. The method of Aspect A1 or any preceding Aspect, which is capable of monitoring and controlling the temperature of the feeding system, wherein the filler material is added in a form of rod, granules, powder or their combination.

Aspect A16. The method of Aspect A1 or any preceding Aspect, which is capable of monitoring and controlling the temperature of the workpiece.

Aspect A17. The method of Aspect A1 or any preceding Aspect, which is capable of monitoring and controlling the temperature of the spindle.

Aspect A18. The method of Aspect A1 or any preceding Aspect, which is capable of monitoring and controlling the temperature of the tool.

Aspect A19. The method of Aspect A1 or any preceding Aspect, which is capable of monitoring and controlling the temperature of the workpiece platform.

Aspect A20. The method of Aspect A1 or any preceding Aspect, which is capable of monitoring and controlling the vibration of the spindle.

Aspect A21. The method of Aspect A1 or any preceding Aspect, which is capable of monitoring and controlling the position of the tool above the workpiece.

Aspect A22. The method of Aspect A1 or any preceding Aspect, which is capable of monitoring and controlling the position of the filler rod in the feeding system.

Aspect A23. The method of Aspect A1 or any preceding Aspect, which is capable of monitoring and controlling the flow rate of the filler powder or granular material in the feeding system.

Aspect A24. The method of Aspect A1 or any preceding Aspect, which is capable of monitoring and controlling the down force in the feeding section.

Aspect A25. The method of Aspect A1 or any preceding Aspect, which is capable of monitoring and controlling the tool force in x, y, z directions.

Aspect A26. The method of Aspect A1 or any preceding Aspect, which is capable of monitoring and controlling the spindle torque.

Aspect A27. The method of Aspect A1 or any preceding Aspect, which is capable of monitoring and controlling the tool torque.

Aspect A28. The method of Aspect A1 or any preceding Aspect, which is capable of monitoring and controlling the spindle angular velocity.

Aspect A29. The method of Aspect A1 or any preceding Aspect, which is capable of monitoring and controlling the tool angular velocity.

Aspect A30. The method of Aspect A1 or any preceding Aspect, which is capable of monitoring and controlling the average track thickness.

Aspect A31. The method of Aspect A1 or any preceding Aspect, which is capable of monitoring and controlling the average track width.

Aspect A32. The method of Aspect A1 or any preceding Aspect, which is capable of monitoring and controlling the density in the deposited layer.

Aspect A33. The method of Aspect A1 or any preceding Aspect, which is capable of monitoring and controlling the concentration in the filler material.

Aspect A34. The method of Aspect A1 or any preceding Aspect, which is capable of monitoring and controlling the grain structure in the deposited layer.

Aspect A35. The method of Aspect A1 or any preceding Aspect, which is capable of monitoring and controlling the mechanical properties in the deposited layer.

Aspect A36. The method of Aspect A1 or any preceding Aspect, wherein the algorithm and the code are written for the process control of the actuator push down force, $F_{act}$ in a closed loop.

Aspect A37. The algorithm and code of Aspect A36 or any preceding Aspect, which is capable of controlling the actuator push down force by manipulating the power supplied from a motor.

Aspect A38. The method of Aspect A1 or any preceding Aspect, wherein the algorithm and the code are written for the process control of the filler material flow rate, $Q_f$ in a closed loop.

Aspect A39. The algorithm and code of Aspect A38 or any preceding Aspect, which are capable of controlling the filler material flow rate, $Q_f$ by manipulating the power supplied from a motor.

Aspect A40. The method of Aspect A1 or any preceding Aspect, wherein the algorithm and the code are written for the process control of the friction force between the tool and the workpiece, $F_f$ in a closed loop.

Aspect A41. The method of Aspect A1 or any preceding Aspect, wherein the algorithm and the code are written for the process control of the friction coefficient between the tool and the workpiece, $K_f$ in a closed loop.

Aspect A42. The algorithm and code of Aspect A40 or any preceding Aspect, which are capable of controlling the friction force $F_f$ by adjusting the actuator down force $F_{act}$.

Aspect A43. The algorithm and code of Aspect A40 or any preceding Aspect, which are capable of controlling the friction force $F_f$ by adjusting the spindle torque.

Aspect A44. The algorithm and code of Aspect A40 or any preceding Aspect, which are capable of controlling the friction force $F_f$ by adjusting the tool torque.

Aspect A45. The algorithm and code of Aspect A41 or any preceding Aspect, which are capable of controlling the friction coefficient $K_f$ by adjusting the actuator down force $F_{act}$.

Aspect A46. The algorithm and code of Aspect A41 or any preceding Aspect, which are capable of controlling the friction coefficient $K_f$ by adjusting the spindle torque.

Aspect A47. The algorithm and code of Aspect A41 or any preceding Aspect, which are capable of controlling the friction coefficient $K_f$ by adjusting the tool torque.

Aspect A48. The method of Aspect A1 or any preceding Aspect, wherein the algorithm and the code are written for the process control of the workpiece surface temperature $T_f$ in a closed loop.

Aspect A49. The algorithm and code of Aspect A48 or any preceding Aspect, which are capable of controlling the workpiece surface temperature $T_f$ by adjusting the actuator down force $F_{act}$.

Aspect A50. The algorithm and code of Aspect A48 or any preceding Aspect, which are capable of controlling the workpiece surface temperature $T_f$ by adjusting the spindle torque.

Aspect A51. The algorithm and code of Aspect A48 or any preceding Aspect, which are capable of controlling the workpiece surface temperature Tf by adjusting the tool torque.

Aspect A52. A process control system for the solid-state additive manufacturing system, which comprises:
- a push down actuator, and
- building parts for constructing multi-variable control loops for controlling the additive manufacturing process, wherein the building parts include at least one of the following components: sensors, detectors, gauges, cameras, filters, actuators and controllers, and
- a programmable computer executing the codes controlling the operation of the individual solid-state additive manufacturing machine parts and controlling the process variables.

Aspect A53. The process control system of Aspect A52 or any preceding Aspect, wherein the process variables can be controlled in open control loops, closed control loops and any combination of them.

Aspect A54. The process control system of Aspect A52 or any preceding Aspect, which comprises a push down actuator which is capable to provide the necessary down push force for the filler material to be deposited on the workpiece.

Aspect A55. The actuator in Aspect A54 or any preceding Aspect, which is capable of pushing down a rod filler material with a controlled speed.

Aspect A56. The actuator in Aspect A54 or any preceding Aspect, which is capable of pushing down a powder filler material with a controlled flow rate.

Aspect A57. The actuator in Aspect A54 or any preceding Aspect, which is capable of pushing down a granular filler material with a controlled flow rate.

Aspect A58. The actuator in Aspect A54 or any preceding Aspect, which is capable of pushing down any combination of filler materials in form of powder, granules and rods with a controlled flow rate.

Aspect A59. The actuator in Aspect A54 or any preceding Aspect, which is directly controlled by a power supplied by a motor.

Aspect A60. The process control system of Aspect A52 or any preceding Aspect, wherein the process control system is designed for monitoring, measuring and sensing the process variables relevant for the particular solid-state additive manufacturing process.

Aspect A61. The process control system of Aspect A52 or any preceding Aspect, wherein the process control system is capable for providing variables' correction (feedback) for the variables controlled in closed loops.

Aspect A62. The process control system of Aspect A52 or any preceding Aspect, wherein the process control system comprises at least one actuator to generate transverse or angular movement of a solid-state additive manufacturing machine part.

Aspect A63. The process control system of Aspect 62A or any preceding Aspect, wherein the system comprising at least one actuator capable to control the movement of at least one of the following solid-state additive manufacturing machine parts: spindle, tool and workpiece.

Aspect A64. The process control system of Aspect A52 or any preceding Aspect, wherein the system comprises at least one sensor for monitoring the vibration of the spindle.

Aspect A65. The process control system of Aspect A52 or any preceding Aspect, wherein the system comprises at least one detector for monitoring the temperature of the filler material.

Aspect A66. The process control system of Aspect A52 or any preceding Aspect, wherein the system comprises at least one temperature detector for detecting the temperature of the spindle.

Aspect A67. The process control system of Aspect A52 or any preceding Aspect, wherein the system comprises at least one temperature detector for detecting the temperature of the tool.

Aspect A68. The process control system of Aspect A52 or any preceding Aspect, wherein the system comprises at least one temperature detector for detecting the temperature of the workpiece.

Aspect A69. The process control system of Aspect A52 or any preceding Aspect, wherein the system comprises at least one detector for measuring the spindle torque.

Aspect A70. The process control system of Aspect A52 or any preceding Aspect, wherein the system comprises at least one detector for measuring the tool torque.

Aspect A71. The process control system of Aspect A52 or any preceding Aspect, wherein the system comprises at least one detector for measuring the spindle angular velocity.

Aspect A72. The process control system of Aspect A52 or any preceding Aspect, wherein the system comprises at least one detector for measuring the tool angular velocity.

Aspect A73. The process control system of Aspect A52 or any preceding Aspect, wherein the system comprises at least one detector for measurement of the down force.

Aspect A74. The process control system of Aspect A52 or any preceding Aspect, wherein the system comprises at least one detector for measurement of the tool force in x, y, and z-directions.

Aspect A75. The process control system of Aspect A52 or any preceding Aspect, wherein the system comprises at least one detector for measuring the track width.

Aspect A76. The process control system of Aspect A52 or any preceding Aspect, wherein the system comprises at least one detector for measuring the track thickness.

Aspect A77. The process control system of Aspect A52 or any preceding Aspect, wherein the system comprises at least one optical detector for monitoring the track grain structure.

Aspect A78. The process control system of Aspect A52 or any preceding Aspect, wherein the system comprises at least one detector for measuring the mechanical properties the deposited layer.

Aspect A79. The process control system of Aspect A52 or any preceding Aspect, wherein the system comprises of at least one detector for measuring the flow rate of the filler.

Aspect A80. The process control system of Aspect A52 or any preceding Aspect, wherein the system comprises of at least one detector for measuring the concentration of the filler material.

Aspect A81. The process control system of Aspect A52 or any preceding Aspect, wherein the system comprises of at least one detector for detecting the density in the deposited layer.

Aspect A82. The process control system of Aspect A52 or any preceding Aspect, wherein the system comprises at least one camera for monitoring the solid-state additive manufacturing process.

Aspect A83. The process control system of Aspect A52 or any preceding Aspect, wherein the system comprises of at least one drive for a controlled movement of the tool and workpiece in x, y and z direction.

Aspect A84. The process control system of Aspect A52 or any preceding Aspect, wherein the system comprises of at least one drive for a rotational movement of the spindle and the tool.

Aspect A85. The process control system of Aspect A52 or any preceding Aspect, wherein the system comprises at least one detector for the surface finish (roughness) of the deposited layer.

Aspect A86. The process control system of Aspect A52 or any preceding Aspect, which further comprises a detector for measuring the friction force between the tool and the workpiece surface.

Aspect A87. A method for generating structures by a software-controlled solid-state additive manufacturing process.

Aspect A88. The method of Aspect A87, wherein the generated structure comprises of one repeating building block (cell).

Aspect A89. The building block in the generated structure Aspect A88 or any preceding Aspect, which is a hexagonal honeycomb cell.

Aspect A90. The building block in the generated structure Aspect A88 or any preceding Aspect, which is a triangular honeycomb cell.

Aspect A91. The building block in the generated structure Aspect A88 or any preceding Aspect, which is a square-like honeycomb cell.

Aspect A92. The method of Aspect A87 or any preceding Aspect, wherein the generated structure comprises of at least two repeating building blocks (cells).

Aspect A93. The method of Aspect A87 or any preceding Aspect, wherein the generated structure is a periodic cell structure.

Aspect A94. The method of Aspect A87 or any preceding Aspect, wherein the generated structure is a non-periodic cell structure.

Aspect A95. The method of Aspect A87 or any preceding Aspect, wherein the generated structure is a gradient cell structure.

Aspect A96. The method of Aspect A87 or any preceding Aspect, wherein the generated structure is a super-imposed double- or triple-structure.

Aspect A97. The method of Aspect A87 or any preceding Aspect, wherein the generated structure is a hierarchical structure.

Aspect A98. The method of Aspect A87 or any preceding Aspect, wherein the generated structure is a combination of periodic and non-periodic cell structures.

Aspect A99. The method of Aspect A87 or any preceding Aspect, wherein the generated structure is a combination of periodic, non-periodic, super-imposed and hierarchical structures.

Aspect A100. The method of Aspect A87 or any preceding Aspect, wherein the generated structure is made of one material type.

Aspect A101. The method of Aspect A87 or any preceding Aspect, wherein the generated structure is made of at least two material types.

Aspect A102. The method of Aspect A87 or any preceding Aspect, wherein the generated structure is made of at least one of the following materials: metal, MMC, metal alloy, composite, plastic, polymer, blend, or any combination of them.

Aspect A103. The method of Aspect A87 or any preceding Aspect, wherein the generated structure is made of a shape memory material.

Aspect A104. The method of Aspect A87 or any preceding Aspect, which is a 3D printing method with the software-controlled manufacturing system.

Aspect A105. The method of Aspect A87 or any preceding Aspect, which is a 4D printing method with the software-controlled manufacturing system.

Aspect A106. The method of Aspect A87 or any preceding Aspect, wherein the generated structure is capable of reversible changes in its shape.

Aspect A107. The method of Aspect A87 or any preceding Aspect, wherein the generated structure is a product of the solid-state additive manufacturing process and a subsequent controlled deformation of the initially-formed structure.

Aspect A108. The method of Aspect A87 or any preceding Aspect, wherein the generated structure is a product of the solid-state additive manufacturing process and a subsequent thermal treatment of the initially-formed structure.

Aspect A109. The method of Aspect A87 or any preceding Aspect, wherein the generated structure is a multi-layer structure comprising of at least one honeycomb structured layer.

Aspect A110. The structure of Aspect A109 or any preceding Aspect which does not comprise adhesive layers.

Aspect A111. The method of Aspect A87 or any preceding Aspect, wherein the generated structure is a sandwiched structure comprising the honeycomb interlayer.

Aspect A112. The structure of Aspect A111 or any preceding Aspect which does not comprise adhesive layers.

Aspect A113. The method of Aspect A1, further comprising one or more of the following:
h) Identifying the independent and dependent solid-state additive manufacturing process variables for the particular solid-state additive manufacturing process;
i) Selecting a process control strategy and a process control design structure;
j) Identifying the critical points in the solid-state additive manufacturing system, wherein the given process variables must be monitored and/or measured;
k) Determining the continuity of each variable measurement; in the case of discontinuous measurements, determining the frequency of taking each variable measurement;
l) Programming a computer using the generated codes for controlling the process variables and controlling the additively-manufactured parts, relevant for the execution of the particular process;
m) Generating desired set points, SP, for each of the controlled process variables in the particular solid-state additive manufacturing process; and/or
n) Identifying the critical ranges for the difference $\Delta$, wherein A is calculated as $\Delta = SP-PV$ for each of the controlled process variables; in cases of $\Delta$-value being within the critical range, no need of correction of the particular variable.

Aspect B1 is a method for process control of a solid-state additive manufacturing system, comprising: identifying a set of one or more process variables for a solid-state additive manufacturing process; providing one or more process control algorithms capable of controlling the one or more process variables, which process control algorithms are configured to: obtain a process value (PV) for each process variable; generate a set point (SP) for each process variable; calculate $\Delta = SP-PV$ for each process variable; determine if $\Delta$ exceeds a predetermined range for one or more (or each) process variable; and, if $\Delta$ exceeds the predetermined range; generate a feedback control signal for one or more (or each) process variable, wherein the feedback control signal is capable of controlling operation of one or more solid-state additive manufacturing machine component associated with one or more of the process variables.

Aspect B2 is the method of any other Aspect, wherein the one or more process control algorithms are capable of controlling the process variables in one or more multi-variable control loops.

Aspect B3 the method of any other Aspect, wherein the solid-state additive manufacturing process comprises joining, coating, surface functionalization, repair and/or additive manufacturing of a 3D-structure, or any combination of these processes.

Aspect B4 is the method of any other Aspect, wherein the one or more process variables are chosen from measured variables, controlled variables, and manipulated variables.

Aspect B5 is the method of any other Aspect, wherein the measured variables, controlled variables, or manipulated variables are chosen from one or more of filler material temperature, spindle temperature, tool temperature, tool position, down force, tool pressure, spindle torque, spindle angular velocity, tool torque, tool transverse velocity, tool angular velocity, filler material flow rate, gas flow rate, and/or vibration.

Aspect B6 is the method of any other Aspect further comprising controlling operation of one or more machine component chosen from a feeding system, a spindle, a tool and workpiece(s).

Aspect B7 is the method of any other Aspect, further comprising controlling rotational and/or transverse movements of one or more machine component.

Aspect B8 is the method of any other Aspect, further comprising controlling transverse movement of an actuator pushing a filler material or rod, and/or controlling movement of powder-like or granular filler material, and/or controlling rotational movement of a spindle, and/or controlling transverse movement of a tool, and/or controlling rotational movement of a tool, and/or controlling transverse movement of workpiece(s).

Aspect B9 is the method of any other Aspect, further comprising monitoring and/or controlling temperature of a hopper, and/or feeding system temperature, and/or temperature of one or more workpiece, and/or temperature of a spindle, and/or temperature of a tool, and/or temperature of one or more workpiece platform, and/or vibration of a spindle, and/or position of a tool relative to a workpiece, and/or position of filler material in a feeding system, and/or flow rate of filler material in a feeding system, and/or down force in a feeding section, and/or tool force in x, y, and/or z directions, and/or spindle torque, and/or tool torque, and/or spindle angular velocity, and/or tool angular velocity, and/or track thickness and/or track width, and/or density of one or more deposited layer, and/or concentration in a filler material, and/or grain structure of one or more deposited layer, and/or mechanical properties of one or more deposited layer.

Aspect B10 is the method of any other Aspect, further comprising controlling actuator push down force, $F_{act}$; and/or actuator push down force; and/or filler material flow rate, $Q_f$; and/or filler material flow rate, $Q_f$ by manipulating power supplied from a motor; and/or friction force between tool and workpiece, $F_f$; and/or a friction coefficient between tool and workpiece, $K_f$, and/or friction force $F_f$ by adjusting actuator down force $F_{act}$, by adjusting spindle torque, by adjusting tool torque, and/or by adjusting actuator down force $F_{act}$; and/or friction coefficient $K_f$ by adjusting spindle torque and/or by adjusting tool torque; and/or workpiece surface temperature $T_f$; and/or workpiece surface temperature $T_f$ by adjusting actuator down force $F_{act}$, by adjusting spindle torque, and/or by adjusting tool torque.

Aspect B11 is a process control system for a solid-state additive manufacturing system, comprising: an additive manufacturing machine comprising the following machine components: a non-consumable member having a body and a throat capable of receiving a consumable filler material; a push-down actuator capable of providing a downward force on the consumable filler material; one or more sensors, detectors, filters, cameras or gauges capable of obtaining a process value (PV) for one or more process variables; one or more actuators, motors, or controllers capable of controlling operation of one or more of the machine components; one or more processors; a non-transitory computer-readable storage medium having one or more process control algorithms capable of instructing the one or more processors to control operation of one or more of the machine components by way of the one or more actuators, motors, or controllers.

Aspect B12 is the process control system of any other Aspect, wherein the one or more process control algorithms are capable of controlling one or more of the process variables in one or more multi-variable control loops.

Aspect B13 is the process control system of any other Aspect, wherein one or more of the multivariable control loops comprise open control loops, closed control loops, or any combination.

Aspect B14 is the process control system of any other Aspect, wherein the filler material is a rod filler material, a powder filler material, a granular filler material, or any combination thereof.

Aspect B15 is the process control system of any other Aspect, further comprising a push down actuator to supply down push force for the filler material to be deposited on a workpiece.

Aspect B16 is the process control system of any other Aspect, wherein the push down actuator is capable of providing controlled speed to push down a rod filler material.

Aspect B17 is the process control system of any other Aspect, capable of providing push down force to a powder filler material with a controlled flow rate.

Aspect B18 is the process control system of any other Aspect, capable of providing push down force to a granular filler material with a controlled flow rate.

Aspect B19 is the process control system of any other Aspect, capable of providing push down force to any combination of filler materials in form of powder, granules and rods with a controlled flow rate.

Aspect B20 is the process control system of any other Aspect, wherein the actuator is controlled by power supplied by a motor.

Aspect B21 is the process control system of any other Aspect, which is capable of monitoring, measuring and sensing one or more of the process variables relevant for a particular solid-state additive manufacturing process.

Aspect B22 is the process control system of any other Aspect, which is capable of providing variable correction (feedback) for one or more of the process variables controlled in closed loops.

Aspect B23 is the process control system of any other Aspect, further comprising at least one actuator to generate transverse or angular movement of one or more of the additive manufacturing machine components.

Aspect B24 is the process control system of any other Aspect, further comprising at least one actuator capable of controlling movement one or more or all of the machine components, including at least one of a spindle, tool and/or workpiece.

Aspect B25 is the process control system of any other Aspect, further comprising at least one sensor for monitoring spindle vibration.

Aspect B26 is the process control system of any other Aspect, further comprising at least one detector for monitoring temperature of the filler material.

Aspect B27 is the process control system of any other Aspect, further comprising at least one temperature detector for detecting spindle temperature.

Aspect B28 is the process control system of any other Aspect, further comprising at least one temperature detector for detecting tool temperature.

Aspect B29 is the process control system of any other Aspect, further comprising at least one temperature detector for detecting workpiece temperature.

Aspect B30 is the process control system of any other Aspect, further comprising at least one detector for measuring spindle torque.

Aspect B31 is the process control system of any other Aspect, further comprising at least one detector for measuring tool torque.

Aspect B32 is the process control system of any other Aspect, further comprising at least one detector for measuring spindle angular velocity.

Aspect B33 is the process control system of any other Aspect, further comprising at least one detector for measuring tool angular velocity.

Aspect B34 is the process control system of any other Aspect, further comprising at least one detector for measuring down force.

Aspect B35 is the process control system of any other Aspect, further comprising at least one detector for measuring tool force in x-, y-, and/or z-directions.

Aspect B36 is the process control system of any other Aspect, further comprising at least one detector for measuring track width.

Aspect B37 is the process control system of any other Aspect, further comprising at least one detector for measuring track thickness.

Aspect B38 is the process control system of any other Aspect, further comprising at least one optical detector for monitoring track grain structure.

Aspect B39 is the process control system of any other Aspect, further comprising at least one detector for measuring mechanical properties of one or more deposited layer.

Aspect B40 is the process control system of any other Aspect, further comprising at least one detector for measuring filler material flow rate.

Aspect B41 is the process control system of any other Aspect, further comprising at least one detector for measuring concentration of the filler material.

Aspect B42 is the process control system of any other Aspect, further comprising at least one detector for detecting density of one or more deposited layer.

Aspect B43 is the process control system of any other Aspect, further comprising at least one camera for monitoring a solid-state additive manufacturing process.

Aspect B44 is the process control system of any other Aspect, further comprising at least one drive for controlled movement of tool and workpiece in x, y and/or z directions.

Aspect B45 is the process control system of any other Aspect, further comprising at least one drive for rotational movement of spindle and tool.

Aspect B46 is the process control system of any other Aspect, further comprising at least one detector for surface finish (roughness) of one or more deposited layer.

Aspect B47 is the process control system of any other Aspect, further comprising a detector for measuring friction force between tool and workpiece surface.

Aspect C1 is a 3D structure comprising repeating building blocks and/or cells.

Aspect C2 is the 3D structure of any other Aspect, wherein the building blocks and/or cells comprise on or more or combinations of hexagonal honeycomb cells, triangular honeycomb cells, square-like honeycomb cells.

Aspect C3 is the 3D structure of any other Aspect, comprising at least two repeating building blocks/cells.

Aspect C4 is the 3D structure of any other Aspect, which comprises one or more or combinations of a periodic cell structure, a non-periodic cell structure, a gradient cell structure, a super-imposed double- or triple-structure, a hierarchical structure, a combination of periodic and non-periodic cell structures, and/or a combination of periodic, non-periodic, super-imposed and hierarchical structures.

Aspect C5 is the 3D structure of any other Aspect, which is made of one material type.

Aspect C6 is the 3D structure of any other Aspect, which is made of at least two material types.

Aspect C7 is the 3D structure of any other Aspect, which is made of at least one of metal, MMC, metal alloy, composite, plastic, polymer, blend, or any combination thereof.

Aspect C8 is the 3D structure of any other Aspect, which is made of a shape memory material.

Aspect C9 is the 3D structure of any other Aspect, which is capable of reversible changes in shape.

Aspect C10 is the 3D structure of any other Aspect, which is a product of a solid-state additive manufacturing process and a subsequent controlled deformation of an initially-formed structure.

Aspect C11 is the 3D structure of any other Aspect, which is a product of a solid-state additive manufacturing process and a subsequent thermal treatment of an initially-formed structure.

Aspect C12 is the 3D structure of any other Aspect, which is a multi-layer structure comprising at least one honeycomb structured layer.

Aspect C13 is the 3D structure of any other Aspect, which does not comprise adhesive layers.

Aspect C14 is the 3D structure of any other Aspect, which is a sandwiched structure comprising a honeycomb interlayer.

Aspect C15 is the 3D structure of any other Aspect, which does not comprise adhesive layers.

Aspect C16 is the 3D structure of any other Aspect, which is a 3D printing method with a software-controlled manufacturing system.

Aspect C17 is the 3D structure of any other Aspect, which is a 4D printing method with a software-controlled additive manufacturing system.

Aspect C18 is a three-dimensional structure comprising a honeycomb structure disposed on a substrate, wherein the honeycomb structure comprises an additive material.

Aspect C19 is a three-dimensional structure comprising two super-imposed honeycomb structures disposed on a single substrate.

Aspect C20 is a three-dimensional structure comprising a first layer and a second layer, wherein the first layer comprises two super-imposed honeycomb structures and the second layer comprises a hierarchical honeycomb structure.

Aspect C21 is a multilayer structure comprising at least one honeycomb interlayer, wherein the multilayer structure does not comprise an adhesive layer.

Aspect C22 is a three-dimensional structure comprising a honeycomb layer disposed on a substrate, wherein the honeycomb layer comprises a frame comprising a first material and a filler disposed within the frame comprising a second material.

Aspect C23 is a three-dimensional structure comprising a honeycomb layer disposed on a substrate, wherein the honeycomb layer has one or more stiffening ribs disposed between adjacent cells of the honeycomb.

Aspect C24 is a laminate structure comprising one or more thermoplastic layers and/or metal layers and a prepreg layer, wherein the laminate structure does not comprise an adhesive layer.

Aspect D1 is a process for generating a porous structure comprising: depositing a hybrid material on a substrate, which hybrid material comprises a lower melting point component and a higher melting point component; and subjecting the deposited hybrid material to a post-processing treatment which incinerates the lower melting point component resulting in a porous structure.

Aspect D2 is the process of any other Aspect, wherein the post-processing treatment comprises one or more of heat treatment, annealing, and/or sintering.

These and other aspects, embodiments, and their features and advantages will be apparent in the foregoing Detailed Description.

BRIEF DESCRIPTION OF THE DRAWINGS

The accompanying drawings illustrate certain aspects of embodiments of the present invention and should not be used to limit the invention. Together with the written description the drawings serve to explain certain principles of the invention.

FIGS. 17A, 17B, 17C and 17D are schematic diagrams of a process of joining two parts, made of the same, similar or dissimilar materials according to embodiments of the invention, where FIG. 17A shows the solid-state additive manufacturing machine is depositing reinforced or unreinforced material that provides a good bonding between the parts needed to be joined, FIG. 17B shows two parts joined together; and FIGS. 17C and D show additional strengthening/stiffening structures are added for the bonding zone after removal of the backing plate.

FIG. 18A shows the additive manufacturing machine is depositing reinforced or unreinforced material that would keep the two parts in place, and FIGS. 18B and C show two parts joined together with stiffening structures.

FIGS. 19A, 19B, 19C and 19D are schematic diagrams of a process of joining two parts made of same, similar or dissimilar materials according to embodiments of the invention, where FIG. 19A shows the additive manufacturing machine is depositing reinforced or unreinforced material that would provide a good bonding between the parts needed to be joined, FIG. 19B shows two parts joined together, and FIGS. 19C and D show additional strengthening/stiffening structures added to the bonding zone.

FIGS. 20A, 20B 20C, 20D and 20E are schematic diagrams of a process of joining two parts made of same, similar or dissimilar materials according to embodiments of the invention, where FIG. 20A shows the solid-state additive manufacturing machine is depositing reinforced or unreinforced material that would keep the two parts in place and FIGS. 20B-E show embodiments of two parts joined together with stiffening structures.

FIG. 21A shows the additive manufacturing machine is depositing reinforced or unreinforced material that would keep the two parts in place.

FIGS. 22A, 22B and 22C are schematic diagrams of a process of making sandwiched thermoplastic polymer structures comprising a prepreg inter-layer according to embodiments of the invention, where FIG. 22A shows deposition of the first thermoplastic polymer layer, FIG. 22B shows placement of the pre-manufactured prepreg, and FIG. 22C shows deposition of the second thermoplastic polymer layer.

FIG. 23A shows deposition of the first metal, metal alloy or MMC layer, FIG. 23B shows placement of the pre-manufactured prepreg layer, FIG. 23C shows deposition of the second metal, metal alloy or MMC layer, and FIG. 23D shows deposition of thermoplastic layers around the prepreg inter-layer for providing better bonding.

FIG. 25A shows a drive wheel system with one set of rollers and FIG. 25B shows a drive wheel system with three sets of rollers.

FIG. 25C shows a drive wheel system with multiple sets of rollers, where the rollers can have specific roller surface features or textures, and FIGS. 25D and 25E show a drive wheel system with multiple sets of rollers with variable gaps between the rollers.

FIG. 27A is a schematic diagram showing feeding rollers with crescent blades (or knife-type blades) for chopping pieces from a block of filler material according to an embodiment.

FIG. 27B is a schematic of feeding rollers with paddle-type blades for supplying briquettes, chops, flakes, granules or powder into the solid-state additive manufacturing system.

FIG. 29A shows an auger screw in the hopper according to an embodiment and FIG. 29B shows an auger screw in the spindle according to an embodiment. In embodiments, the system can have one or more auger screws in both the hopper and the spindle.

DETAILED DESCRIPTION

Figure 1:
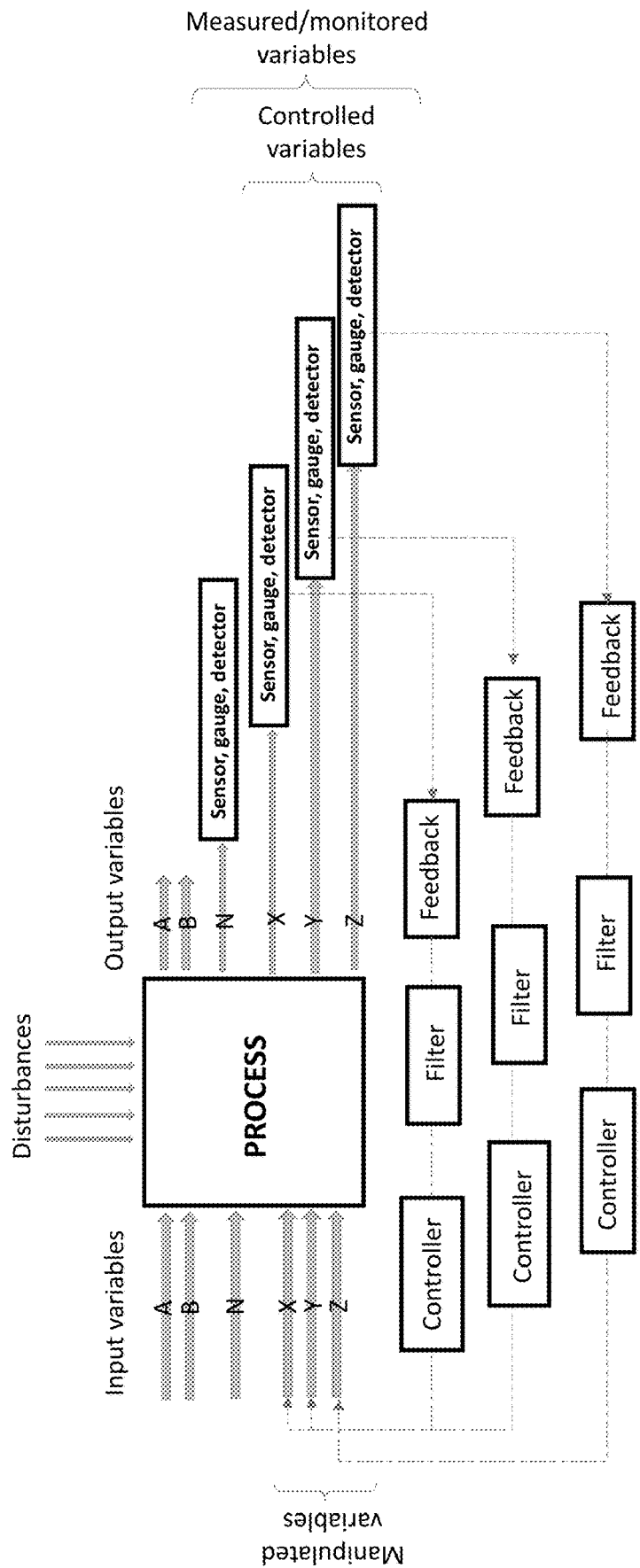
FIG. 1 is a block diagram of a complex process control system for a solid-state additive manufacturing system comprising multiple open and closed control loops according to an embodiment of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Embodiments of the present invention provide novel and nonobvious improvements upon previous technology related to filler material feeding systems for solid-state additive manufacturing. Such previous technology is described in U.S. Patent Application Publication No. 2014/0174344, which is individually incorporated by reference herein in its entirety to provide an efficient way of supplementing the enabling disclosure of this invention. The present invention is also related to the disclosures provided in U.S. Pat. No. 8,893,954 (see also 2014/0134325), U.S. Pat. No. 8,636,194 (see also 2010/0285207), U.S. Pat. No. 9,643,279 (see also 2016/0107262, U.S. Pat. No. 9,943,929 (see also 2017/0216962), U.S. Pat. No. 9,205,578 (see also 2014/0130736), U.S. Pat. No. 8,632,850 (see also 2012/0009339), U.S. Pat. No. 8,875,976 (see also 2012/0279441), U.S. Pat. No. 8,397,974 (see also 2012/0279442), U.S. Pat. No. 9,862,054 (see also 2016/0074958), U.S. Pat. No. 9,266,191 (see also 2015/0165546), U.S. Pat. No. 9,511,446 (see also 2016/0175982), U.S. Pat. No. 9,511,445 (see also 2016/0175981), and U.S. Application Publication Nos. 2008/0041921, 2013/014012, 2017/0043429, 2017/0057204, 2018/0085849, as well as International Patent Application Publication No. WO2013/002869, which are each incorporated by reference herein in their entireties.

As used herein (within both the specification and the drawings), the term "code" refers to what is known in the art as computer-readable code, computer-readable instructions, computer-executable instructions, or "software". Any of the algorithms, methods, processes, flow diagrams, and/or routines, described in this specification or depicted in the drawings can be programmed or implemented in such code. The computer-readable instructions can be programmed in any suitable programming language, including JavaScript, C, C#, C++, Java, Python, Perl, Ruby, Swift, Visual Basic, and Objective C. By such programming the computer-readable instructions, code, or software instruct a processor to carry out the operations and commands of the novel process control system and method described herein.

A skilled artisan will further appreciate, in light of this disclosure, how the invention can be implemented, in addition to software, using hardware or firmware. For example, the hardware can be or include circuitry for performing a specific operation, process, command, method, algorithm, or other task described in this disclosure. As such, the process control system and method disclosed herein can be implemented in a system comprising any combination of software, hardware, or firmware.

As used herein, the term "coating material" is used interchangeably with "filler material"; both relate to an additive material which is fed through a throat of a rotating stirring tool as described in this disclosure. The additive material can also be referred to interchangeably in this disclosure as a "consumable" material.

As used herein, the term "honeycomb" or "honeycomb structure" refers to a manmade three-dimensional structure having rows of identically-shaped and identically-sized cells juxtaposed or adjacent to each other. The cells can be any rectilinear shape including triangular, square, rectangular, hexagonal, octagonal, and so on. The cells can also be superimposed, have one or more additional layers which can have geometries that differ from one layer to another. Thus, such structure can resemble natural honeycomb with strictly hexagonal cells or can have different rectilinear variations such as the examples shown in the drawings.

In embodiments, the present invention provides: (a) a novel process control system for a solid-state additive manufacturing system and associated additive manufacturing processes performed with the solid-state additive manufacturing system, (b) a process control method for executing and controlling different processes with the manufacturing system, (c) various additive structures that can be generated with the software-controlled manufacturing system, and (d) various feeding system designs for continuous supply of the filler material to the solid-state additive manufacturing machine.

In embodiments, the software-controlled solid-state additive manufacturing system includes the solid-state additive manufacturing machine with numerous associated parts and tools (such as various tools with the same or different tool shapes for processing different material types, including for example, polymer fillers, metal fillers, blends, composites, and parts such as clamps, spindle, bearings for the spindle, motors, generator, drives, inert gas supply, shield, machine covers, etc.), as well as multiple control-, sensor-, monitoring-, and/or imaging-devices, driving units, motors, and actuators. A synchronized and successful operation of the solid-state additive manufacturing system is possible by engaging a reliable process control system configuration that is capable of controlling the process variables and the movements of the machine parts during the particular solid-state additive manufacturing process. The process control system includes a software-operated solid-state additive manufacturing machine and numerous detectors, cameras, gauges, actuators (controllers) located at single or multiple locations within the solid-state additive manufacturing system for control and execution of the particular operations and routines of a given solid-state additive manufacturing process, where the process can be joining, coating, repair, surface functionalization or 3D additive structure fabricated with the software-controlled solid-state additive manufacturing system.

In one embodiment, multiple operations and/or routines are needed to execute the given solid-state additive manufacturing process, e.g. coating. The process control system is capable of controlling all or some of the process steps and associated operations, which include one or more of or any combination or sub-combination of the following (not listed in particular order, some of these steps and operations occur at the same time or occur in a different order than listed):

load the filler material (powder, granules, rod),
provide the sufficient down force (depending on the filler type) that would push the filler down towards the spindle,
achieve desired spindle angular velocity and torque,
achieve desired tool angular velocity and torque,
achieve desired filler material temperature,
provide workpiece clamping,
achieve desired workpiece temperature,
proceed with an inert gas purge into the working area,
bring the rotating tool into close proximity with the workpiece,
proceed with fixed spot stirring and filler deposition,
proceed with transverse tool movement while the filler is still depositing,
proceed subsequent build-up of layers via the tool's back-forth transverse movement to achieve the desired deposited layer (coating) thickness,
perform lateral tool movement and tool back-forth movement to achieve the desired deposited layer (coating) width,
once the deposited layer thickness and width are achieved, reduce the spindle and tool angular velocity and torque to zero, and
retract the tool from the workpiece.

Furthermore, embodiments provide a method for process control of a solid-state additive manufacturing system. In one embodiment, the method for a process-controlled solid-state additive manufacturing system includes at least one of or any combination or sub-combination of the following steps:

Identifying measured, controlled and manipulated process variables for a particular solid-state additive manufacturing process;
Identifying the independent and dependent process variables for a given solid-state additive manufacturing process;
Selecting a process control strategy and a process control design structure;
Identifying the critical points in the solid-state additive manufacturing system, where the given process variables must be monitored and/or measured;
Determining the continuity of each variable measurement; and in case of discontinuous measurements, determining the frequency of taking each variable measurement;
Generating algorithms for process control of the variables that need to be controlled and manipulated during the solid-state additive manufacturing process;
Generating computer-readable code for the controllable and manipulated process variables;
Generating computer-readable code for controlled movements of different machine parts relevant for a given process;
Programming a computer using the generated computer-readable code for controlling the process variables and controlling the machine parts, relevant for the execution of a given solid-state additive manufacturing process,
Generating desired set points, "SP", for each of the controlled process variables in the given process;
Measuring and recording the process values, "PV", for each of the controlled process variable at critical locations in the solid-state additive manufacturing system and at certain time periods for discontinuous variable measurements;
Identifying the critical ranges for the difference $\Delta$, where $\Delta$ is calculated as: $\Delta=SP-PV$ for each of the controlled process variables; in situations where the $\Delta$-value is within the critical range, and there is thus no need for correction of the particular variable;
Calculating the difference $\Delta$ ($\Delta=SP-PV$) for each of the controlled process variable;
Generating feedback control signals for each of the controlled process variables by computer execution of the computer-readable codes that control the process variables;
Correcting the controlled process variable, if the difference ($\Delta$) is outside of the critical range for a given process variable;
Generating movements of the relevant solid-state additive manufacturing machine parts by computer execution of the computer-readable codes that control the operation of the solid-state additive manufacturing machine parts.

A variety of predefined additive structures can be generated with the software-controlled solid-state additive manufacturing system as such system is capable of a solid-state thermo-mechanical additive (e.g. layer-by-layer) manufacturing process. Some of the additive structures, periodic and non-periodic structures, super-imposed and hierarchical structures are described in the embodiments below.

The solid-state additive manufacturing process and manufacturing system are affected by many input process variables, designated as A, B, ... N, ... X, Y, Z in FIG. 1 and many process disturbances. As shown in FIG. 1, selected process variables, depending on their relevance for the particular solid-state additive manufacturing process, can be controlled in closed-loops. In such cases, the variables' process values are provided as feedback into the process and enter the process as "manipulated variables" (FIG. 1). The Filter in the closed loop process control determines if the variable needs a correction, while the Controller takes an action when the variable is off from the predetermined range and needs correction by adjusting one or more input variables which enter and influence the process. The closed-loop control cycle is then reinitiated by Feedback received from one or more sensors, gauges, or detectors which measure corresponding output variables exiting the process. Additionally, one or more disturbances may enter the process which may affect the value of the one or more output variables. Not all of the monitored and measured variables (e.g. X-, Y-, and Z-variables) are controlled with a closed loop control system. For instance, the N-variable in FIG. 1 is measured or monitored, but not closed-loop controlled. However, in some embodiments, if the N-variable value goes out of range, then actions can be taken through some of the other variables that are controlled via closed-loop process control systems and are closely related to the N-variable, or the operator can manually intervene in the process. The variables A and B in FIG. 1 are not monitored or measured during the solid-state additive manufacturing process.

Figure 2:
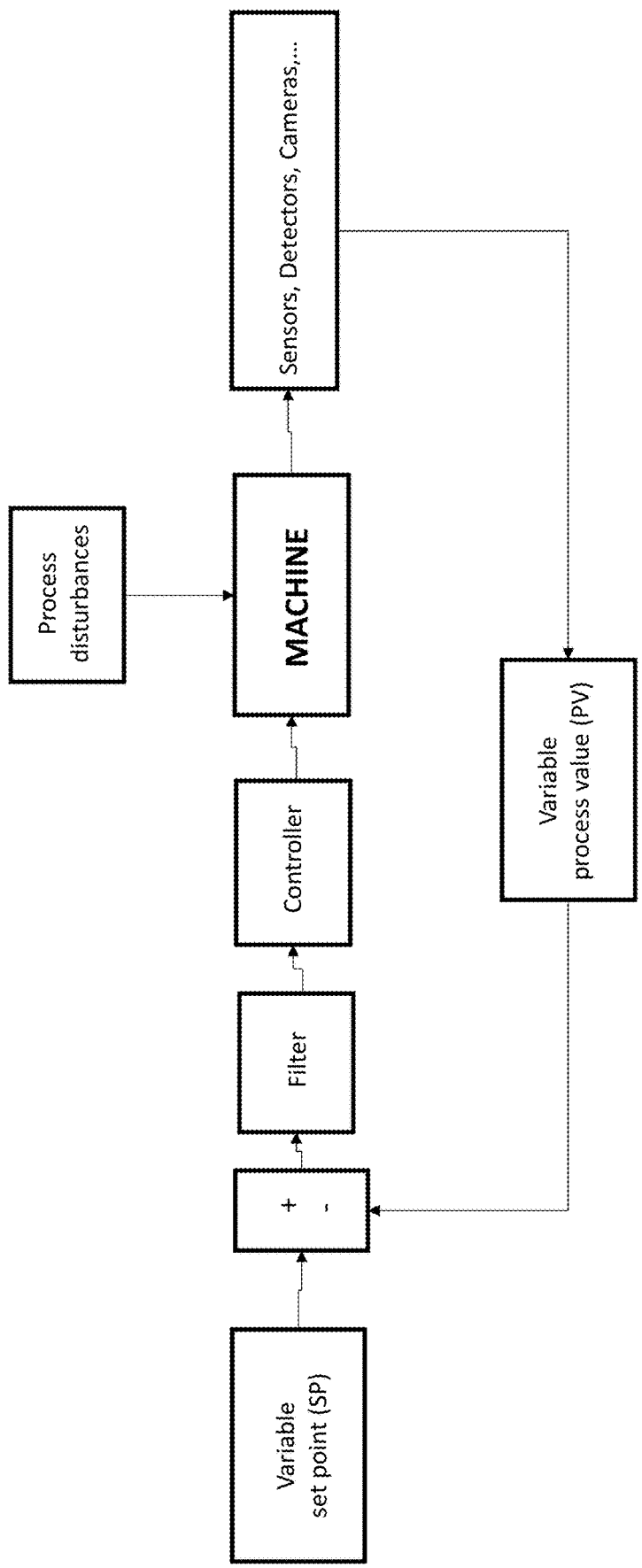
FIG. 2 is a block diagram of a closed-loop control system for the solid-state additive manufacturing process with a variable set point (SP) and a variable process value (PV) as a feedback according to an embodiment of the invention.

FIG. 2 presents a block diagram of a closed-loop variable control process for a single generic machine variable, where the variable process value (PV) information is continuously fed into the system and compared to the desired variable values (set point, SP), and consequently, manipulated by the Controller in cases when the Filter determines that the difference Δ is out of the critical range. Again, output from the system is measured by one or more sensors, detectors, and cameras, and this output can be affected by one or more process disturbances. Specific examples of control processes for closed-loop controlled variables are provided in FIG. 3A and FIGS. 4-8, which are related to block diagrams for the actuator down force, spindle torque, tool angular velocity, feeder temperature, tool temperature, and traverse speed closed-loop control processes, respectively.

Figure 3A:
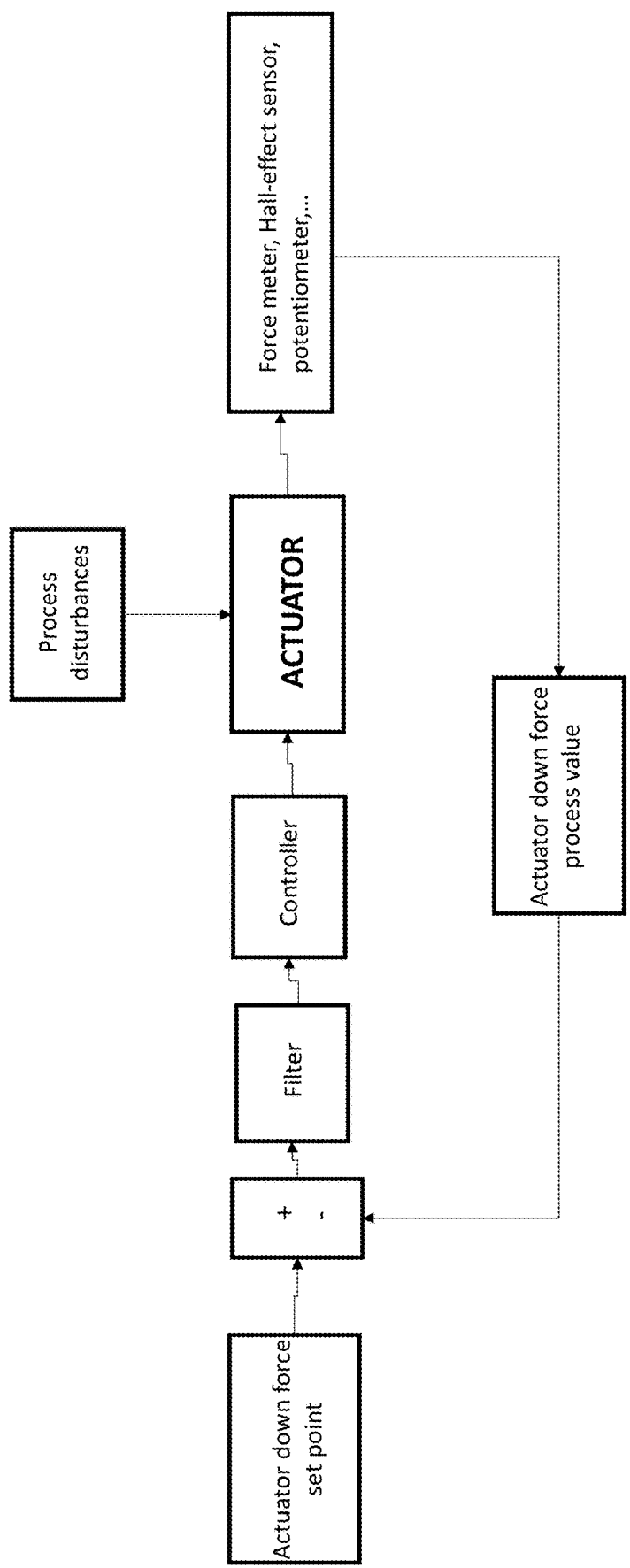
FIG. 3A is a block diagram of a feedback control system for the actuator down force variable in the additive manufacturing process according to an embodiment of the invention.
Figure 3B:
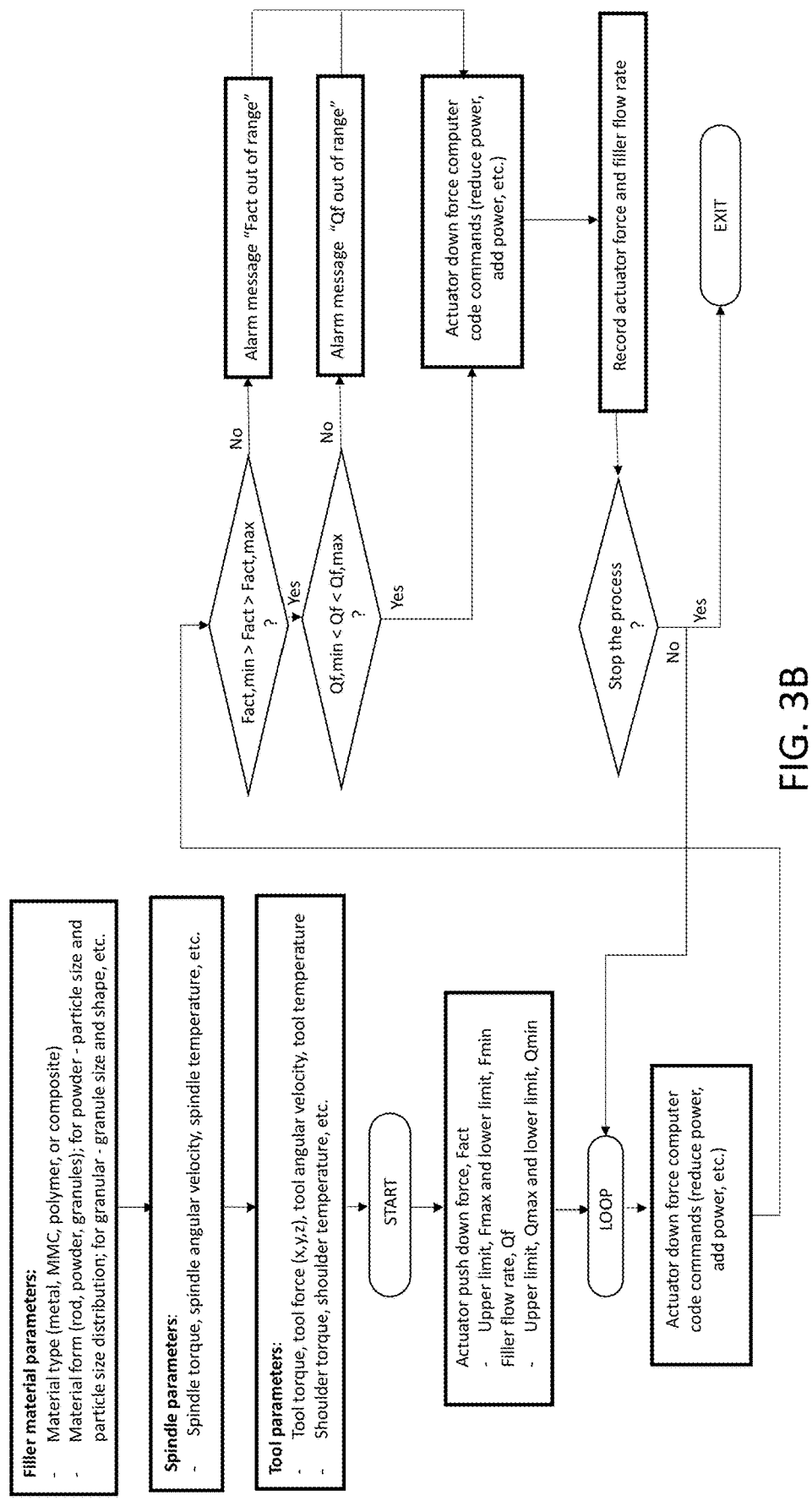
FIG. 3B is a flow diagram of the process control of actuator down force and filler flow rate in an additive manufacturing process according to an embodiment of the invention.

In some embodiments, the actuator down force is controlled in a closed control loop, and consequently, the filler material flow rate (i.e. filler material supply to the workpiece) is controlled, as well. This is a unique feature of the process control system of the present invention and distinguishes the process control system from process control systems where no filler material is added to the welding process. A flow diagram of the process control of the actuator down force, $F_{act}$, and the filler flow rate, $Q_f$, is provided in FIG. 3B. Initial information on one or more parameters of the filler material, its nature, viz. metal, metal alloy, MMC, polymer, ceramic, or composite, and the filler form, viz. powder, granules, or rods, are provided as inputs for the computer control code for the material; one or more spindle and tool parameters, such as spindle and tool torque and angular velocity, spindle and tool temperature and others, which can be employed during a given solid-state additive manufacturing process, are also fed into respective computer control codes as inputs. The actuator push down force, $F_{act}$, is controlled in a closed loop system, which control system might also involve the dependent variable, filler flow rate, $Q_f$. The boundary conditions for both variables are then imposed as the maximum and the minimum acceptable values for $F_{act}$ (i.e. $F_{act,max}$ and $F_{act,min}$) and $Q_f$ (i.e. $Q_{f,max}$ and $Q_{f,min}$). If the $F_{act}$ is outside the acceptable range defined between the maximum and minimum $F_{act}$ value, $F_{act,max}$ and $F_{act,min}$, then an alarm message "$F_{act}$ out of range" appears on a computer monitor used for the software control of the solid-state additive manufacturing system. In such cases, the computer code responsible for controlling the actuator down force activates the power supply to add or reduce the power depending on the measured $F_{act}$ (i.e. if it is below $F_{act,min}$ or if it is above the $F_{act,max}$ value, respectively). If the $F_{act}$ value is within the acceptable range defined between $F_{act,min}$ and $F_{act,max}$, then the code checks the filler material flow rate $Q_f$, which is mainly affected by the actuator push down force, $F_{act}$, but can be affected by other process parameters, such as spindle temperature and torque. If the $Q_f$ is outside the range defined between $Q_{f,min}$ and $Q_{f,max}$, then an alarm message "$Q_f$ out of range" appears on the computer monitor and an action is taken via adding or reducing the power supply, which directly affects the actuator down force $F_{act}$, and thus, the filler flow rate, $Q_f$. The actuator down force $F_{act}$, and the filler flow rate $Q_f$ are recorded, and then a decision is made to stop or reinitiate the control process.

In another embodiment, the friction force, $F_f$, between the tool shoulder and the workpiece surface is controlled in a closed loop control system. Since this friction force directly affects the heat generated by the friction, which usually occurs in the affected working zone including the workpiece surface, then the workpiece surface temperate, $T_f$, would also be directly affected by the friction force, $F_f$. The friction force, $F_f$, is controlled in a closed loop process control system as presented in FIG. 3C. Input parameters, such as the actuator down force, $F_{act}$, and filler material flow rate, $Q_f$, as well as the spindle and tool parameter are fed into the computer software/code embodying the algorithms governing the solid-state additive manufacturing process. The boundary conditions for the Ff (i.e. Ff, max and Ff, mm) and Tf (i.e. Tf, max and $T_{f,min}$) are imposed. Once the process starts, $F_f$ is closely recorded. If it is within the range defined between $F_{f,min}$ and $F_{f,max}$, then the code continues to record the $T_f$ on the workpiece surface, which is mainly affected by the friction force, $F_f$, but can be also affected by other parameters, as well. If the $F_f$ is outside the defined range, then an alarm message "$F_f$ out of range" appears on a computer monitor and actions are taken by increasing or reducing the actuator push force and/or spindle torque, depending of the actual $F_f$ value (i.e. if it is below or above the acceptable range for $F_f$). Consequently, the workpiece surface temperature, $T_f$ which is mainly affected by the friction can be controlled, as well. The friction force, $F_f$, and the workpiece surface temperature, $T_f$, are recorded, and then a decision is made to stop or reinitiate the control process.

Figure 3C:
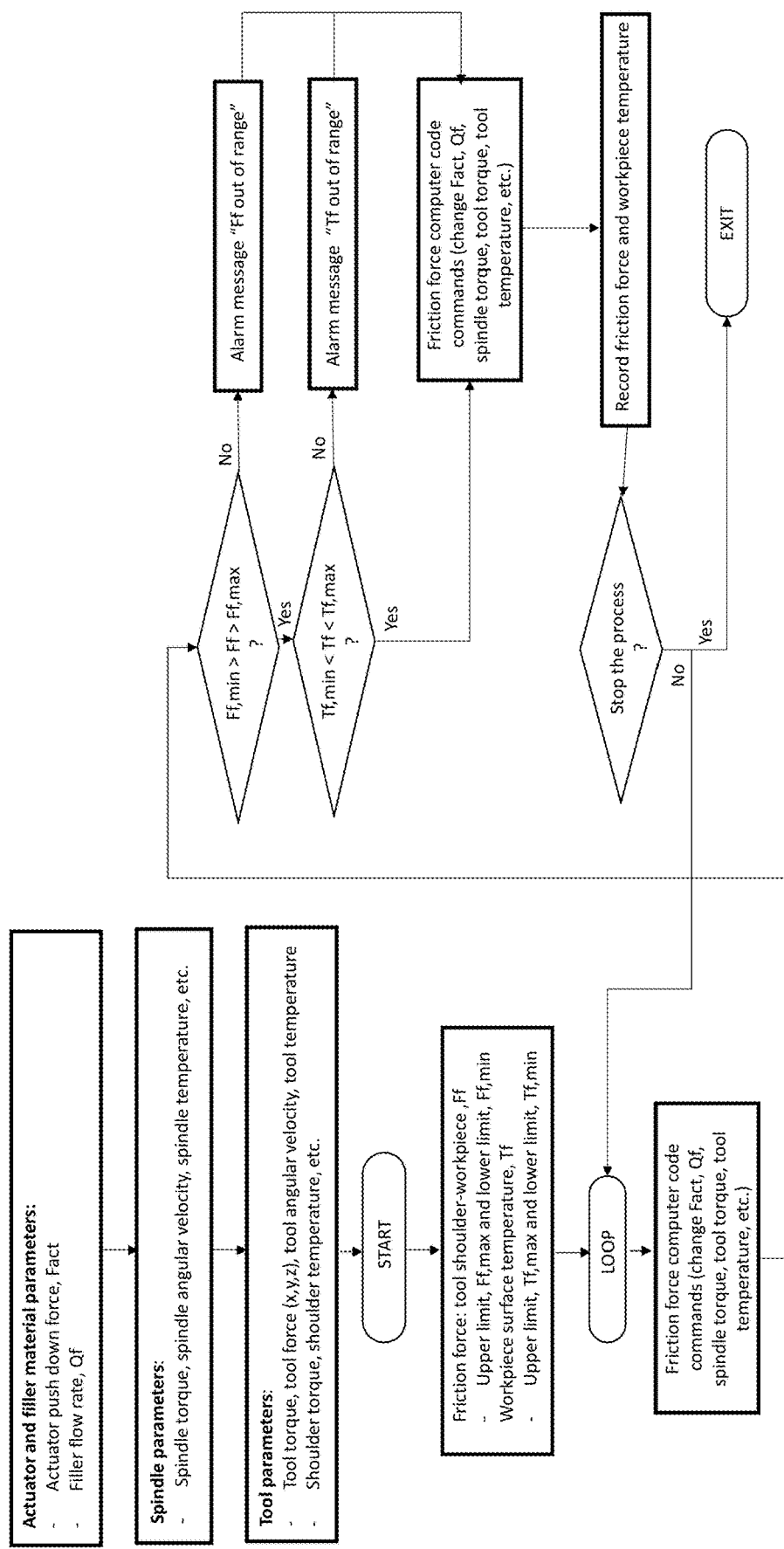
FIG. 3C is a flow diagram of the process control of the friction force and workpiece surface temperature in a solid-state additive manufacturing process according to an embodiment of the invention.
Figure 4:
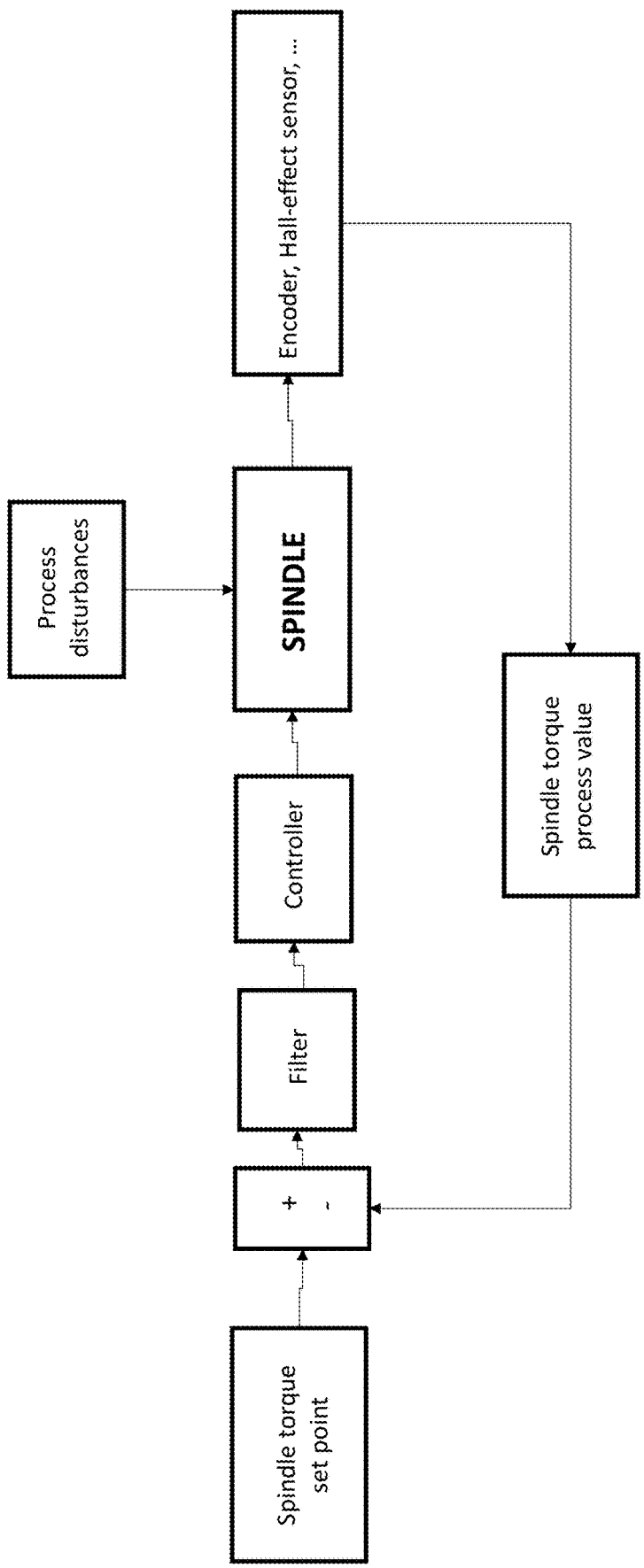
FIG. 4 is a block diagram of a feedback control system for the spindle torque variable in the solid-state additive manufacturing process according to an embodiment of the invention.
Figure 5:
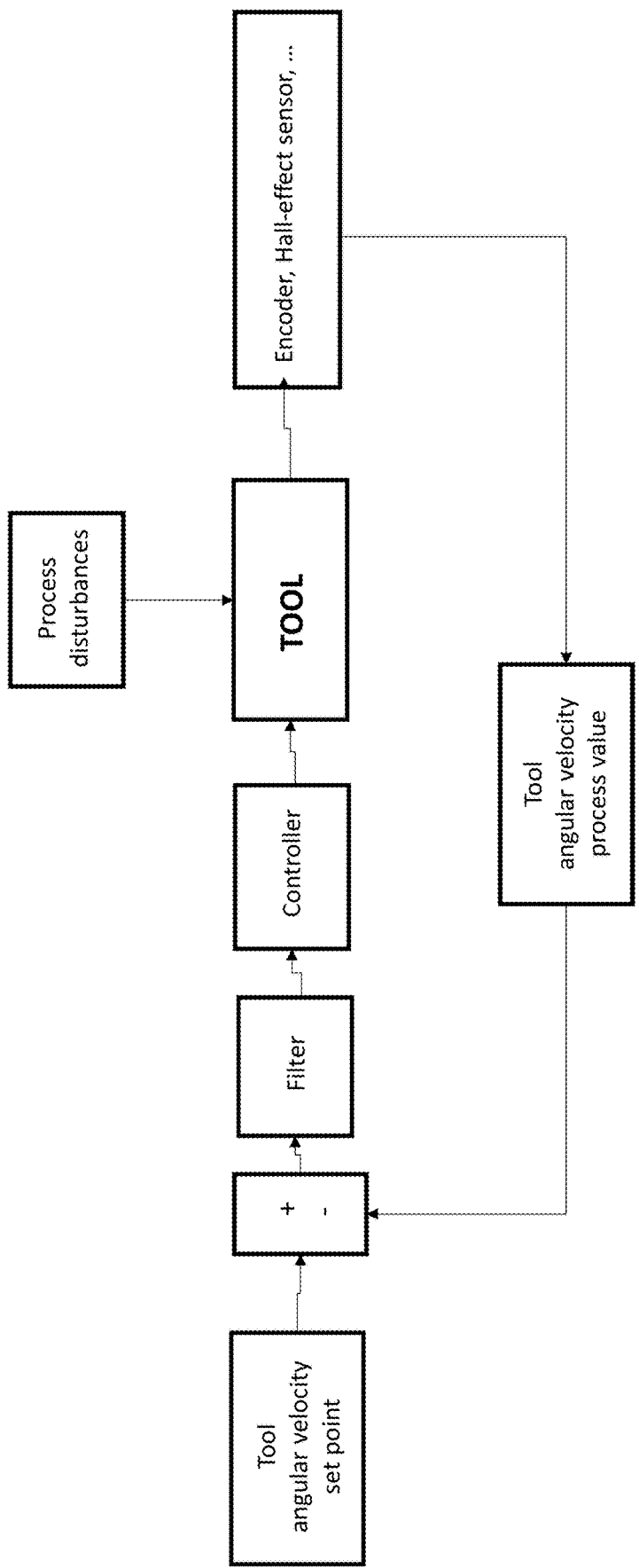
FIG. 5 is a block diagram of a feedback control system for the tool angular velocity variable in the solid-state additive manufacturing process according to an embodiment of the invention.
Figure 6:
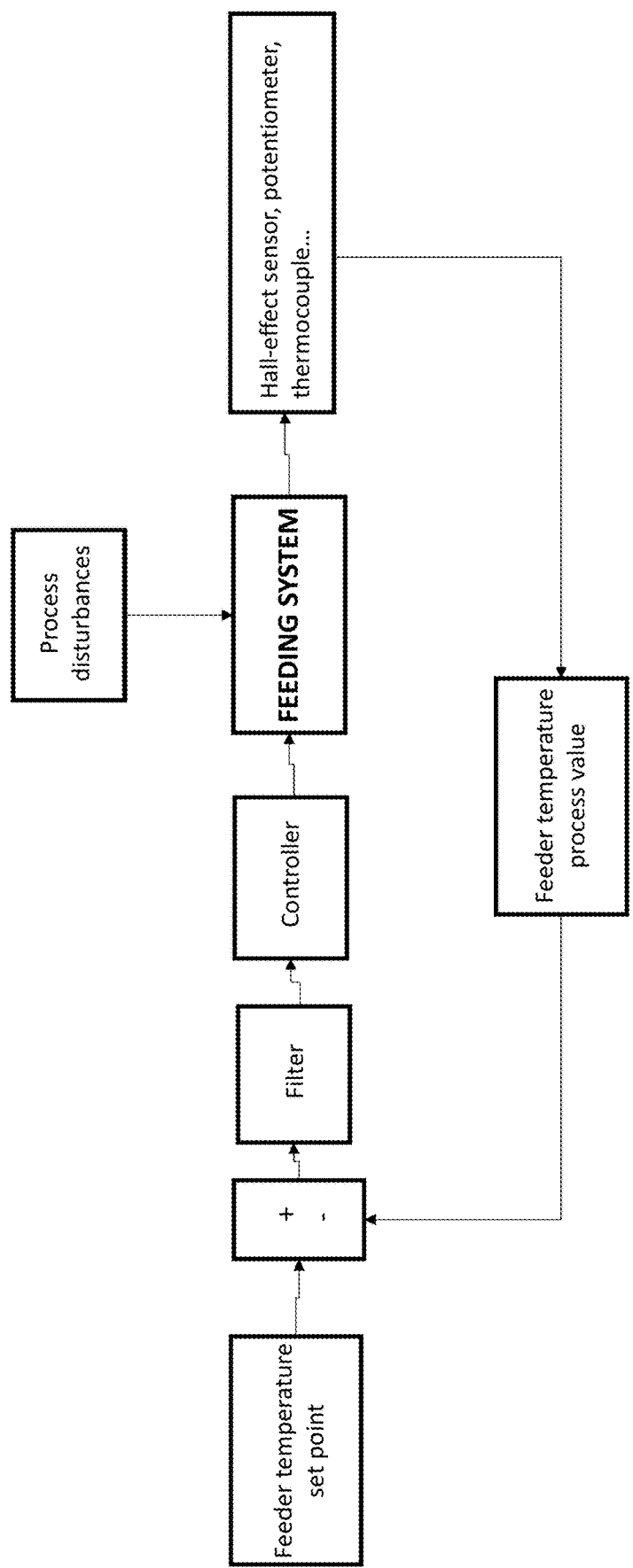
FIG. 6 is a block diagram of a feedback control system for the feeder temperature variable in the solid-state additive manufacturing process according to an embodiment of the invention.
Figure 7:
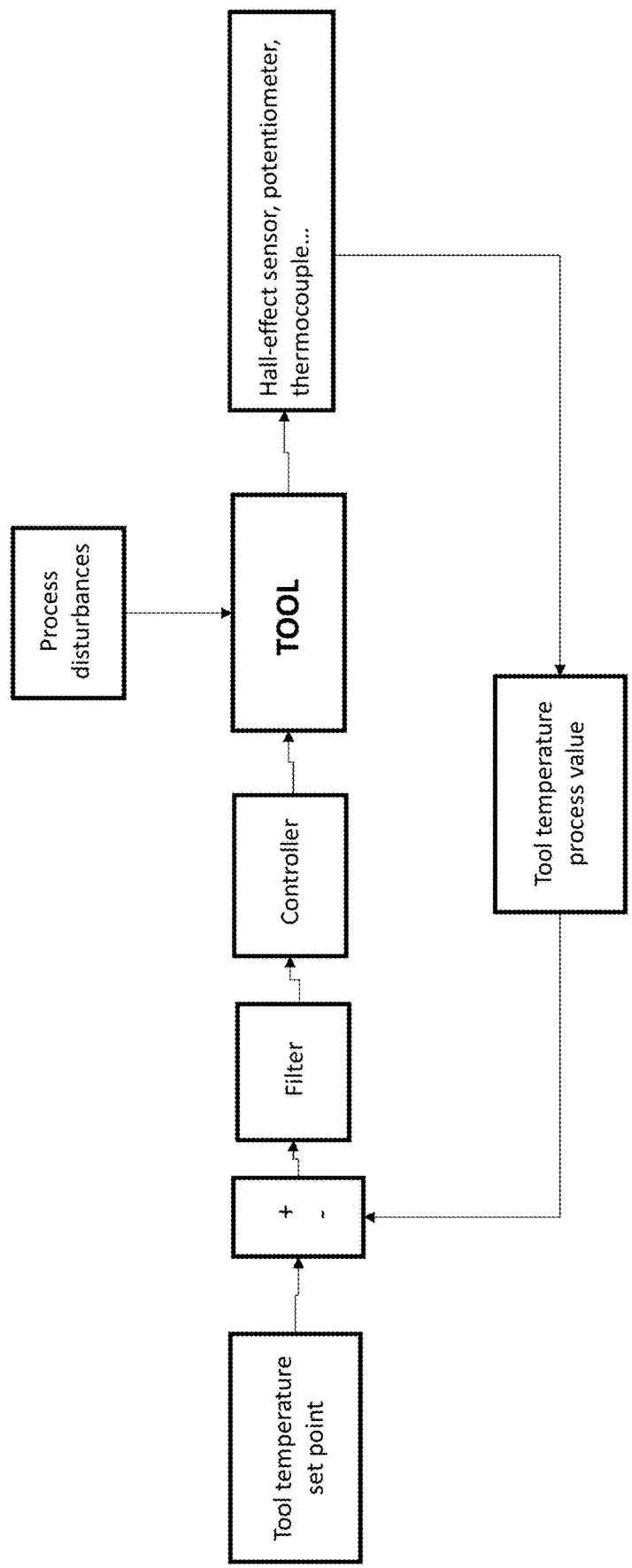
FIG. 7 is a block diagram of a feedback control system for the tool temperature variable in the solid-state additive manufacturing process according to an embodiment of the invention.
Figure 8:
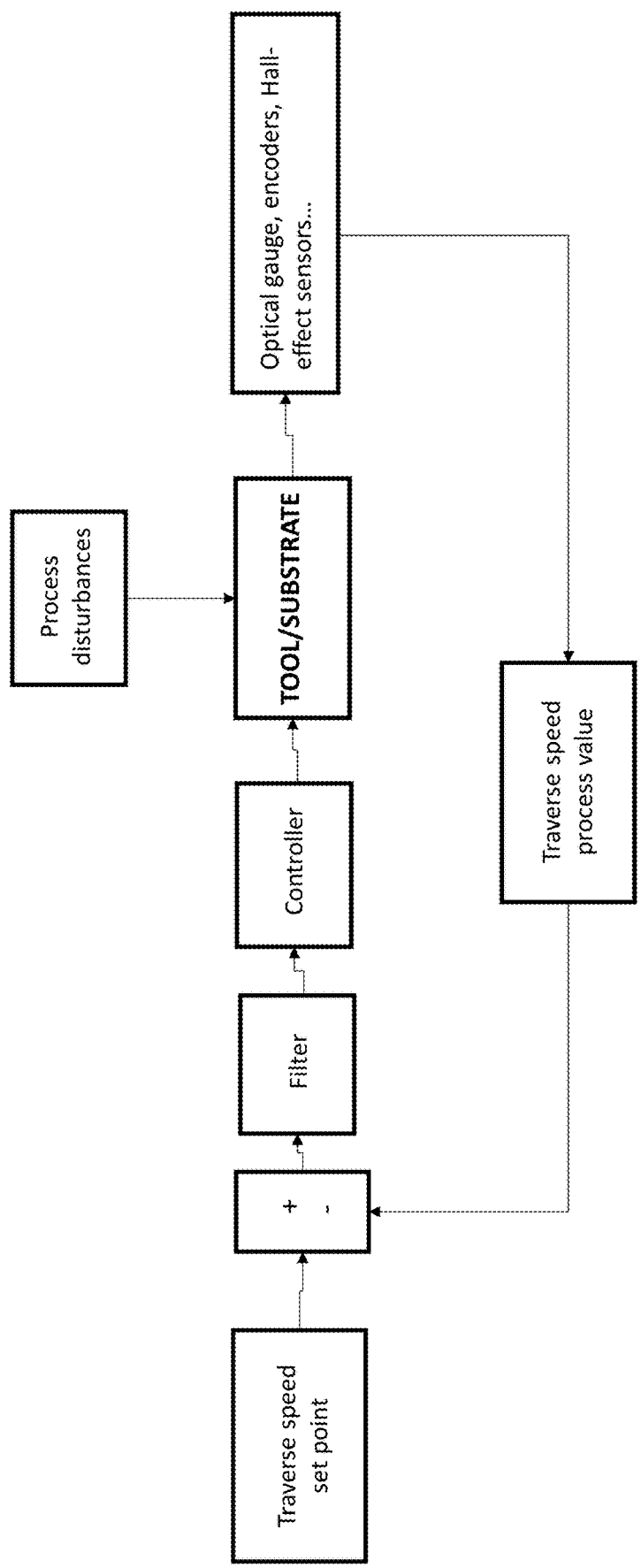
FIG. 8 is a block diagram of a feedback control system for the tool temperature variable in the solid-state additive manufacturing process according to an embodiment of the invention.

In yet another embodiment, the friction coefficient is controlled in a closed loop based on a flow diagram very similar to the flow diagram for the friction force, $F_f$ control presented in FIG. 3C.

Figure 9A:
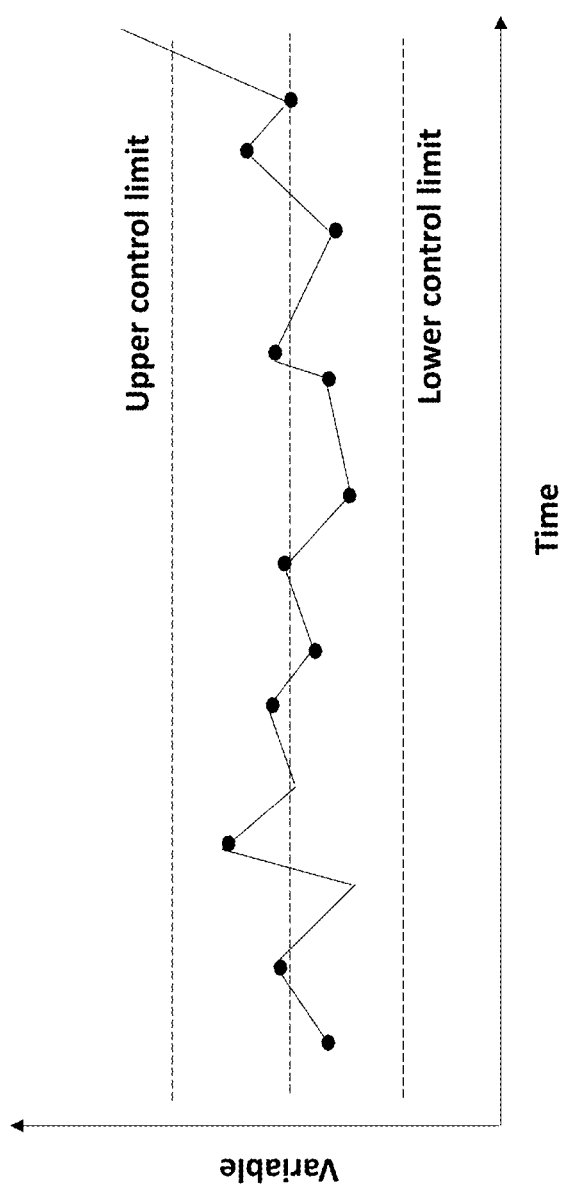
FIG. 9A is a graph showing upper and lower limits which are imposed for monitoring variables that are not controlled in a closed-loop control system, but which might be critical for the solid-state additive manufacturing process under certain circumstances. The process control system is capable of imposing known strategies to bring the variable value within the limits when it is outside the range.

In another embodiment, the disclosed process control system for a solid-state additive manufacturing machine is capable of executing one or more known strategies for dealing with a monitored process variable in an open-loop control system, when it is outside of the desired range (FIG. 9A).

Figure 9B:
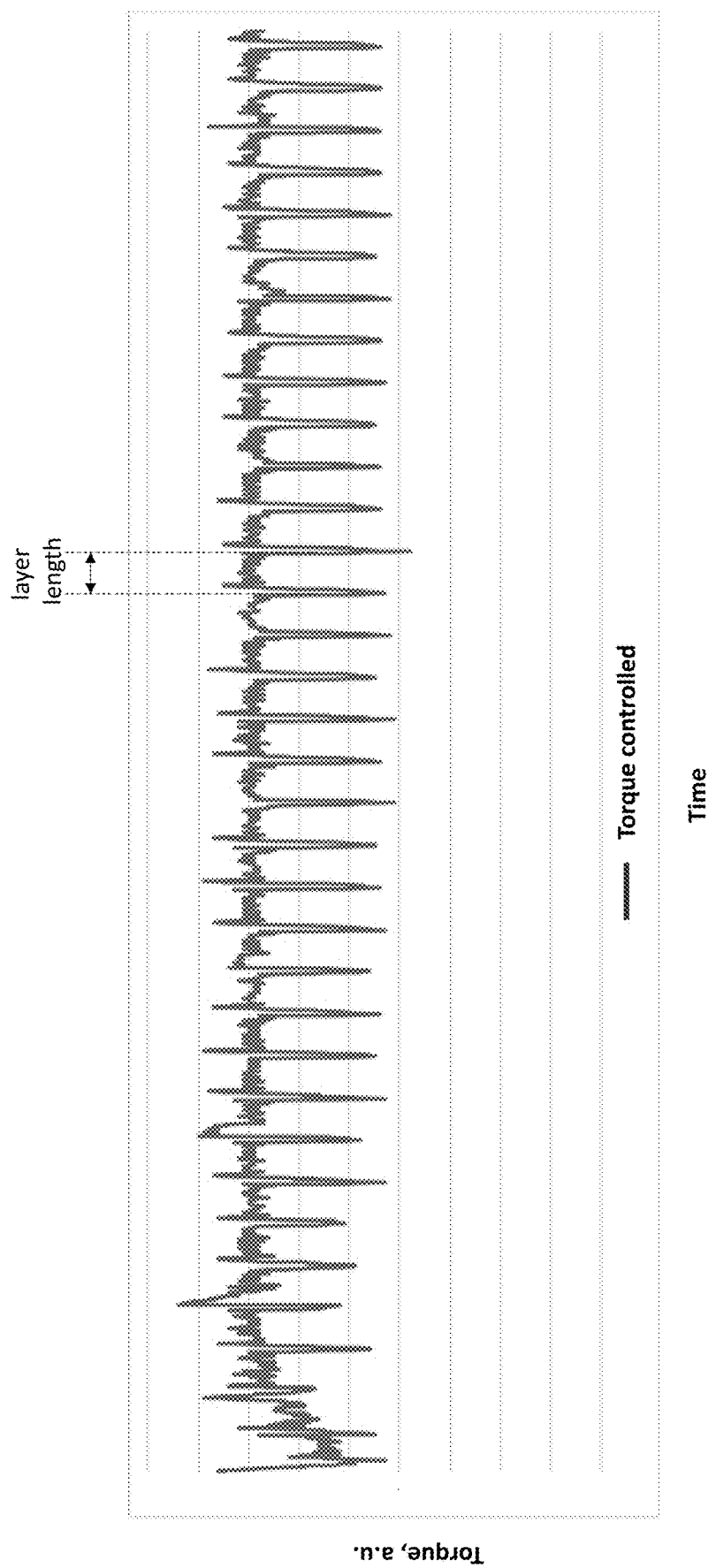
FIG. 9B is a graph of torque changes with time during deposition of multiple layers of Aluminum. Results of a software-controlled solid-state deposition process are presented when the torque is controlled and maintained to be constant during the layer deposition.

In one embodiment, as an example only, the torque applied to the deposited material can be controlled and maintained constant or kept within a narrow range during each layer deposition (FIG. 9B). Multiple layers can be deposited on top of each other by tool forward-backward translational movements. Except for the beginning of the solid-state deposition process, the torque in each layer of deposited material (aluminum in this case), which are deposited on top of each other by forward-backward deposition, is maintained constant via adjusting the spindle speed which itself is controlled by adjusting the driving current to the spindle.

In another embodiment, during deposition of multiple layers (of aluminum) on top of each other by tool forward-backward translational movements, the spindle speed is kept constant during each layer deposition. In this case, the torque applied to the deposited material varies during the deposition of the layers (FIG. 9C).

In a different example, the torque is maintained constant (or varies in a narrow range) during multi-layer deposition. The torque map shown in FIG. 9D in such a torque-controlled solid-state additive manufacturing process shows the narrow range of torque values achieved during multiple layer deposition. In contrast, in a no-torque-controlled process for a multi-layer deposition process, where the spindle speed is kept constant, torque variations during a single layer deposition, as well as variations across different layers are expected (FIG. 9E). Due to the difference in the torque values between a torque-controlled process and a no-torque controlled solid-state additive manufacturing process, the resulting microstructures in the deposited layers are different because of the different material temperatures achieved during the deposition, which temperatures are directly related to the applied torque.

Process independent and dependent variables can be controlled. Control is useful for influencing material properties and deposition rate of deposited material. Properties such as surface roughness, mechanical properties, wear resistance, fatigue resistance, etc. can be modified for a given material by varying or holding constant one or more process variables. In FIG. 9B the control system is holding torque at a constant level across the length of each layer and from layer to layer. The control system adjusts other parameters to create torque stability. Other parameters that may be adjusted include rotational speed of the tool, filler feed rate, traverse rate, temperature of added material, temperature of substrate, ambient temperature, etc.

Figure 9C:
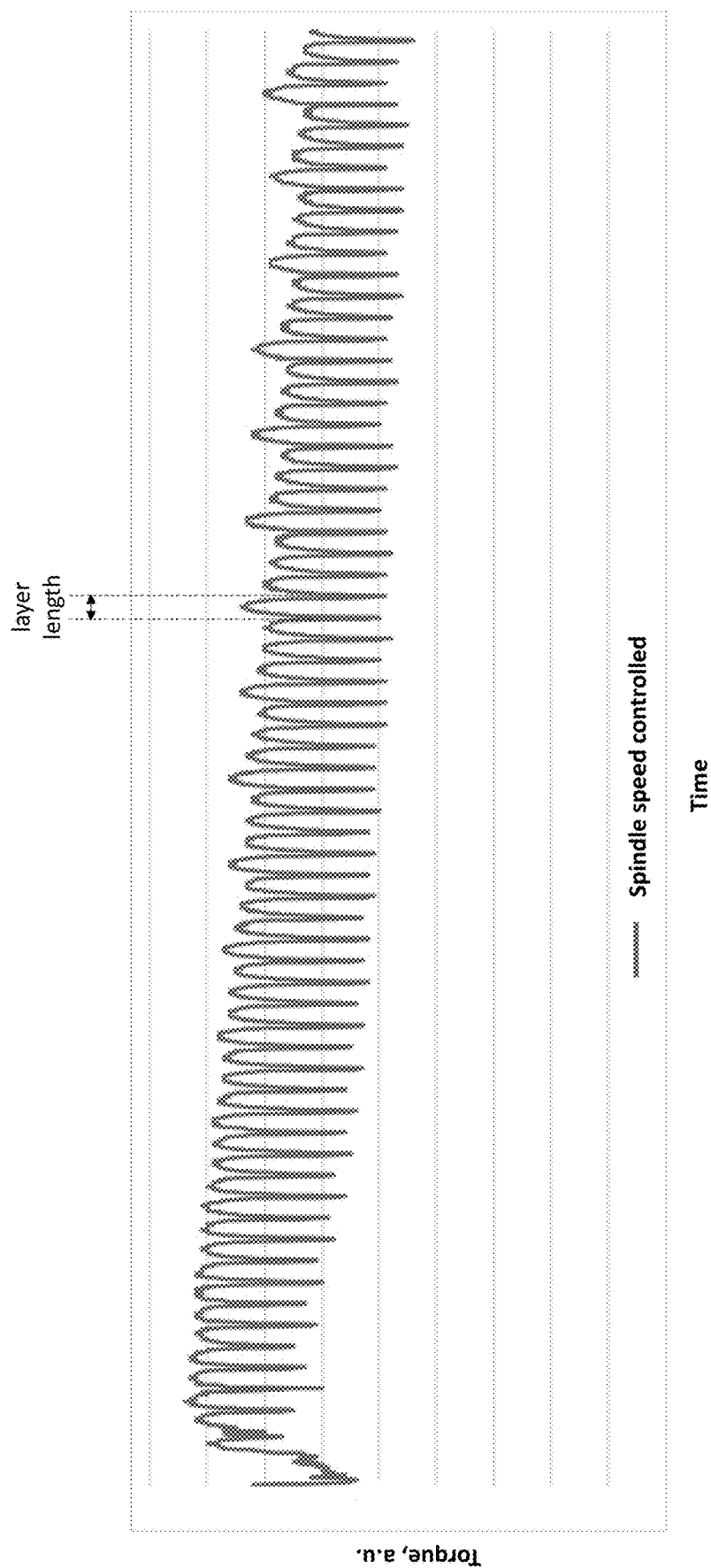
FIG. 9C is a graph of torque changes with time during deposition of multiple layers of Aluminum. Results of a software-controlled solid-state deposition process are presented when the spindle speed is controlled and maintained to be constant during the layer deposition.

It can be seen in FIG. 9C that without choosing torque as the parameter to hold constant, it will not be constant. In FIG. 9C, the spindle speed (rotational speed of the tool) is held constant. As a result, the torque required for successful operation over many layers decreases. Both of these figures show data for a multilayer deposit and sharp decreases in torque indicate where the tool is being moved upward in the vertical axis to begin a new layer.

Figure 9D:
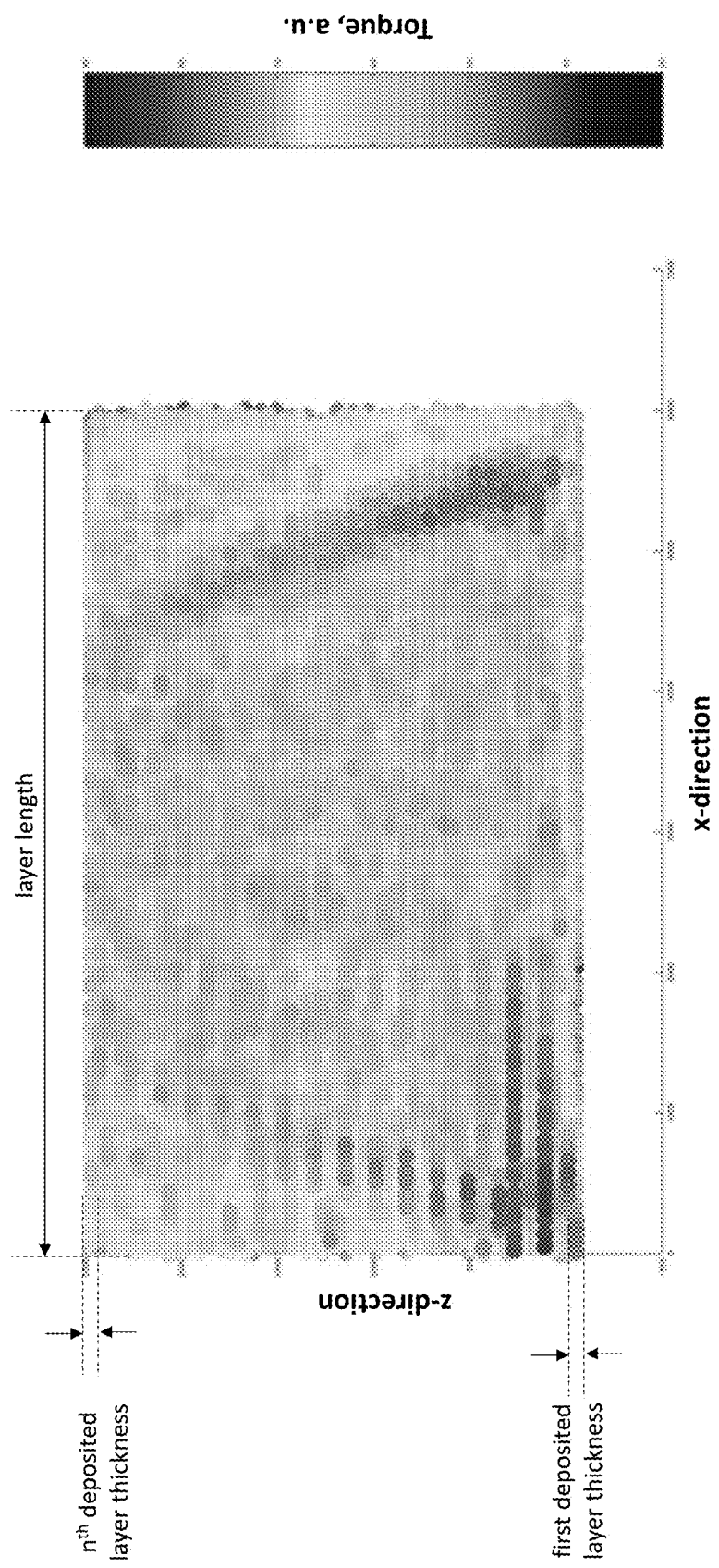
FIG. 9D is a torque map (in the x-z plane) during deposition of multiple layers of Aluminum (layers are being deposited on top of each other by tool's forward-backward translational movements), where the torque is controlled during the deposition.
Figure 9E:
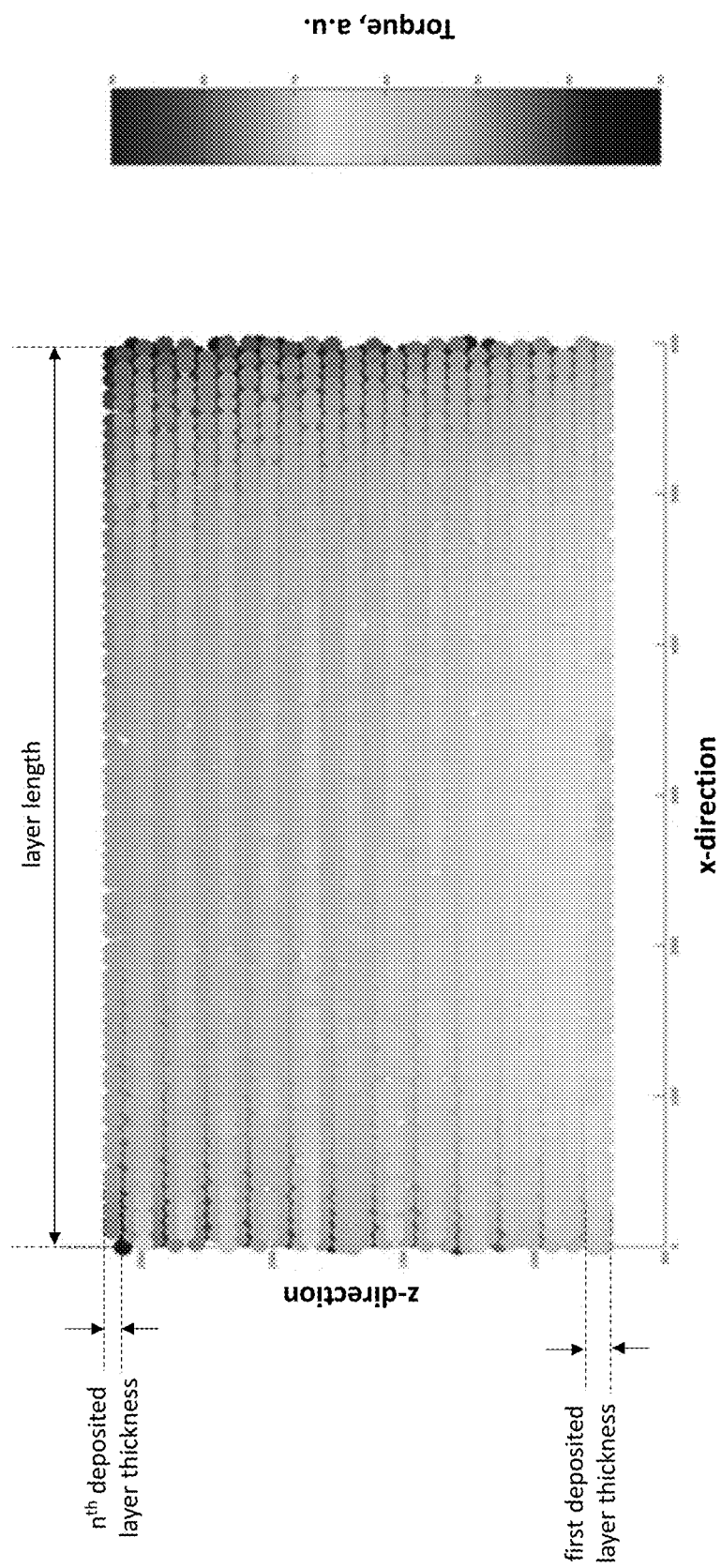
FIG. 9E is a torque map (in the x-z plane) during deposition of multiple layers of Aluminum (layers are being deposited on top of each other by tool's forward-backward translational movements), where the spindle speed is controlled during the deposition.

FIG. 9D shows process data for Torque control where the control system is instructed to maintain a torque value across layer lengths. This data shows the ability for the control system to successfully maintain a value, similar to FIG. 9B.

FIG. 9E shows the impact on Torque if it is not selected for control. Similar to FIG. C, this shows that choosing spindle speed as the variable to hold constant will create a fluctuation in torque.

Hypothetically, the impact of change in control variables can result in following for a 6xxx series aluminum alloy:

| Variable/Parameter | Range of Values | Control Value | Impact | Relationship |
|---|---|---|---|---|
| Spindle speed | 100-600 RPM | 500 | Increased wear resistance, increased UTS | Influences torque |
| Translation rate | .5-30 IPM | 21 IPM | Reduced surface finish roughness | Increases with Increased feed rate |
| Feed rate | 1-25 IPM | 20 IPM | Increased fatigue resistance | Increases with increased translation rate |
| Ambient temperature | 45-300 F. | 70 F. | Decrease residual stress | Influences torque |
| Torque | 60-100 ft-lb | 90 ft-lb | Increased YS | Decreases with increased spindle speed |
| Build temperature | | | Increased UTS, YS, ductility | Decreases with increased temperature |
| Layer height | 0.01-0.06" | 0.04" | Process efficiency | Influences torque |
| Track width | 0.35-2.10" | 1.70" | Process efficiency | Influences torque |
| Temperature control | 0-400 F. | 200 F. | Increased UTS | Influences torque |
| Track overlap | 0-100% | 25% | Full density | Influences torque |

The control system allows for automated quality control due to the repeatability and predictability of process variables to outcomes. Trials indicate that changes in the variables in the chart impact the properties and condition of the deposited material.

| Trial | Yield Stress (MPa) | U.T.S. (MPa) | Elongation % |
|---|---|---|---|
| 1 | 74.3 | 133 | 24% |
| 2 | 72.9 | 137.2 | 23% |
| 3 | 73 | 137.5 | 22% |
| 4 | 76.1 | 134.7 | 23% |
| 5 | 77.9 | 136.3 | 24% |
| 6 | 76 | 130.8 | 22% |
| 7 | 77 | 120.4 | 11% |
| 8 | 77.5 | 135.9 | 17% |
| 9 | 73.6 | 133 | 25% |
| 10 | 77.2 | 131.2 | 17% |
| 11 | 77.3 | 127.3 | 14% |

Figure 9F:
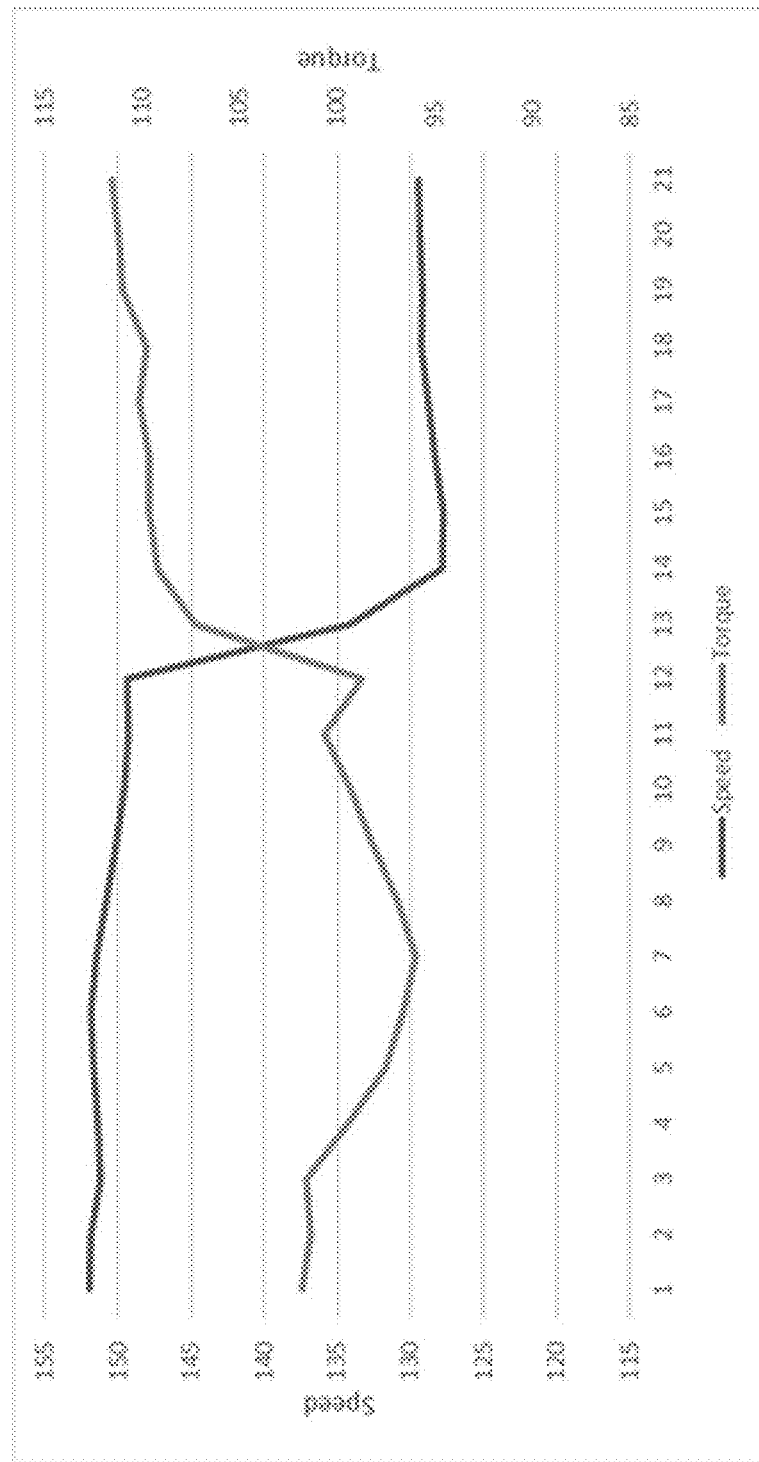
FIG. 9F is a graphical presentation showing a reduction in spindle speed leading to an increase in the spindle torque.

FIG. 9F is a graphical presentation of the reduction in spindle speed leading to an increase in the spindle torque.

Figure 9G:
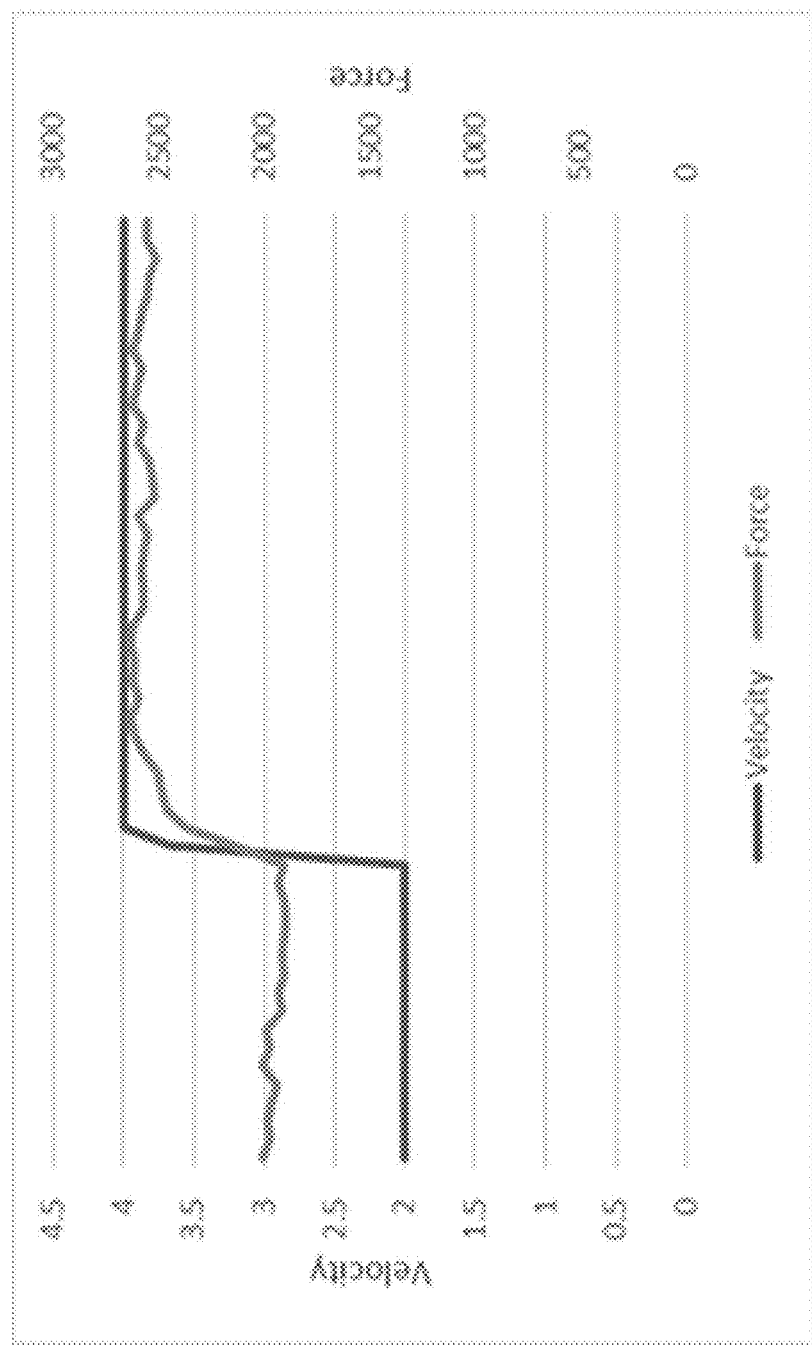
FIG. 9G is a graphical presentation showing an increase in actuator velocity leading to an increase in the actuator force.

FIG. 9G is a graphical presentation of the increase in actuator velocity leading to an increase in the actuator force.

In some embodiments, process control algorithms are based on the flow diagrams created for each controllable process variable. Two of the many flow diagrams constructed for the process control system are provided in FIGS. 3B and 3C.

Figure 10:
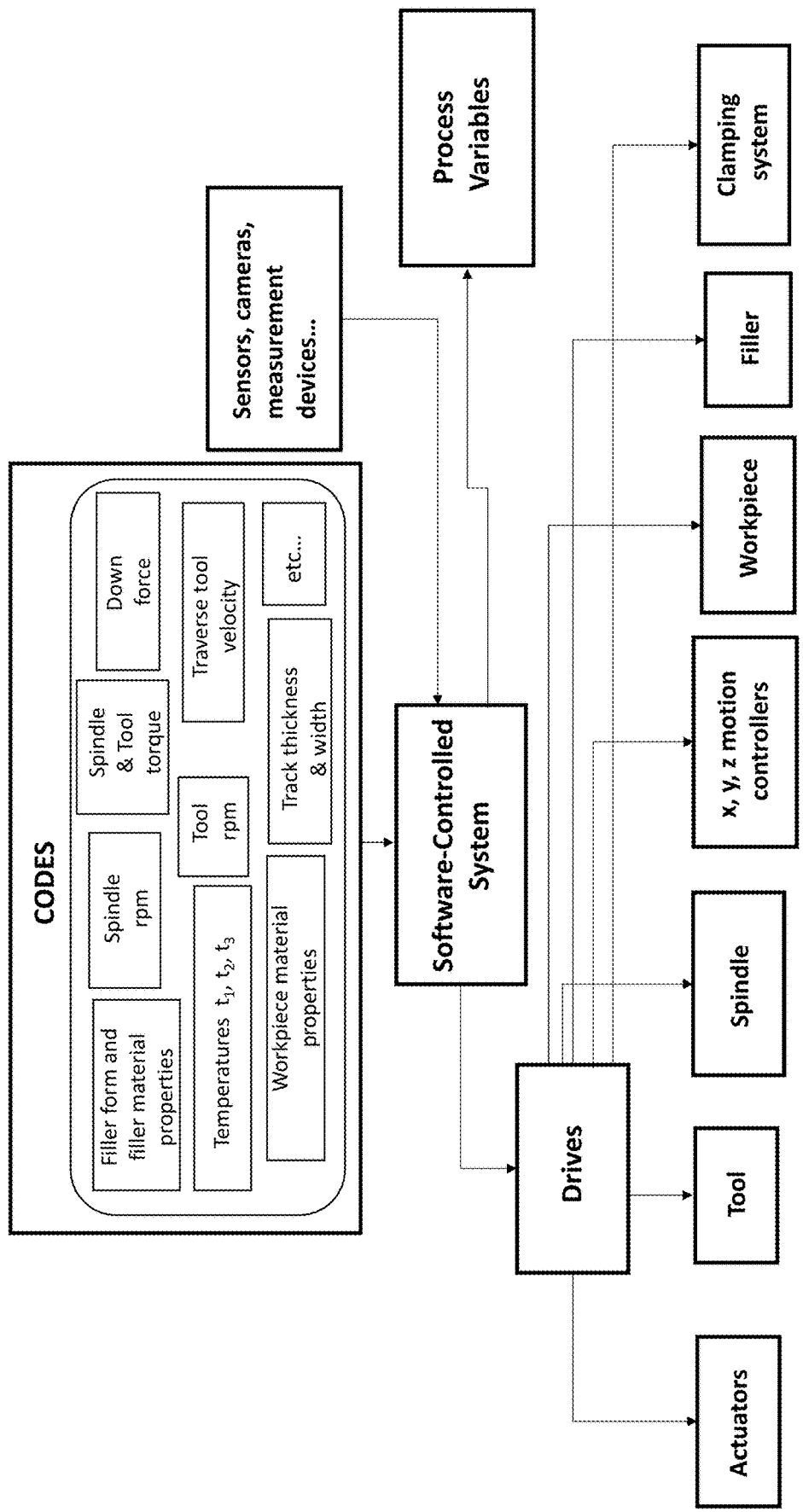
FIG. 10 is a block diagram of a computer-controlled solid-state additive manufacturing system for executing different additive manufacturing operations and monitoring and controlling their process variables according to an embodiment of the invention.

In some embodiments, the algorithms are transformed into computer-readable code and are compiled into executable software that is capable of imposing different control strategies for each of the controlled process variables in a particular solid-state additive manufacturing process (FIG. 10). The software including multiple computer-readable codes which take into account various material properties, process parameters, etc. As an example only, the filler material properties (e.g. melting point Tm, friction coefficient, compressive strength), the filler form (e.g. powder, granules, rod, flakes, sheets), the workpiece material properties (e.g. Tm, strength, friction coefficient), the workpiece shape and size, the tool material strength and shape, and the desired track thickness and track width are taken into account in the software-controlled system to calculate the required angular velocity of the spindle and that of the tool (if different), the traverse velocity of the tool relative to the workpiece, the number of tool passes over the workpiece surface and the down force required to execute a given solid-state additive manufacturing process. The software-controlled system further receives input from one or more sensors, cameras, and measurement devices, and affects one or more process variable by providing output to various drives controlling machine components such as actuators, the tool, the spindle, x,y,z motion controllers, the workpiece, the filer, and the clamping system.

Furthermore, in some embodiments, each computer-readable code is written in a such way that it can be easily combined with other code to generate an executable software specific for a given process; for instance, software for joining, software for coating, software for repair, etc.

In some embodiments, the solid-state additive manufacturing software allows for the machine operator to change the process variable process value manually, if needed. For example, the variable process values can be presented on a screen or other computer display in real-time, and the software can allow the operator to manually enter the variable process value, manipulate various machine tools associated with a particular process variable, and so on.

In another embodiment, in the case of certain filler material types, such as metals, MMCs and metal alloys, an algorithm or code predicts the process variables' SP that can yield a given micro-structure(s) in the deposited layer; very often, refined grain structures compared to the incoming material grain structures are desirable when dealing with these materials in the solid-state additive manufacturing process.

In another embodiment, the code that controls the tool rotation is in close interaction with the code controlling the spindle rotation, and these two parts, the spindle and the tool, can rotate with the same or different angular velocities, but need to be well-synchronized for a successful process execution.

In another embodiment, a code is used to control the temperature of the spindle, which is dependent on the spindle torque, which in turn is dependent on the spindle angular velocity. The process control system includes a closed control loop of the spindle angular velocity, while the spindle temperature is treated as a nested variable dependent on the spindle angular velocity and spindle torque.

In yet another embodiment, a code is used in the process control system that regulates the filler material temperature. This code is dependent on the code for regulating the feeder temperature, spindle temperature and tool temperature, the latter two variables being dependent on the corresponding angular velocities and torques of the spindle and the tool.

In other embodiments, the process-controlled solid-state additive manufacturing system is capable of fabricating complex contour parts and structures, periodic and non-periodic structures, viz. honeycomb structures, hierarchical structures, super-imposed structures, gradient structures and other structures using a platform capable of multi-axis motion.

In one embodiment, the code controls the density and/or porosity of the deposited material by controlling the filler material flow rate and the inert gas flow rate that is blown during the deposition process.

In one embodiment, the computer-controlled solid-state additive manufacturing machine is capable of generating periodic cell structures, such as honeycomb structures. Honeycomb structures in a sandwiched geometry have been known to be superior to many other cellular structures as such structures offer a light-weight structure for various load-bearing and energy-absorbing applications. However, most of the traditional processes for making sandwiched structures with honeycomb cores involve multiple steps, and most of the times, require application of adhesive layers to adhere the honeycomb core to the outer sheets of the sandwiched structure. Embodiments of the solid-state additive manufacturing processes and systems of the invention are capable of manufacturing complex honeycomb structures without an adhesive layer.

A variety of honeycomb structures for enhanced mechanical and particularly compressive performance which still provide an excellent strength-to-weight ratio are possible with the computer-controlled solid-state additive manufacturing system. Furthermore, the computer-controlled solid-state additive manufacturing machine is capable of building up any complex cell structures involving cell sub-structures for tailored mechanical performance in any direction (in x, y or z-direction) or tailored isotropic mechanical performance.

Figure 11A:
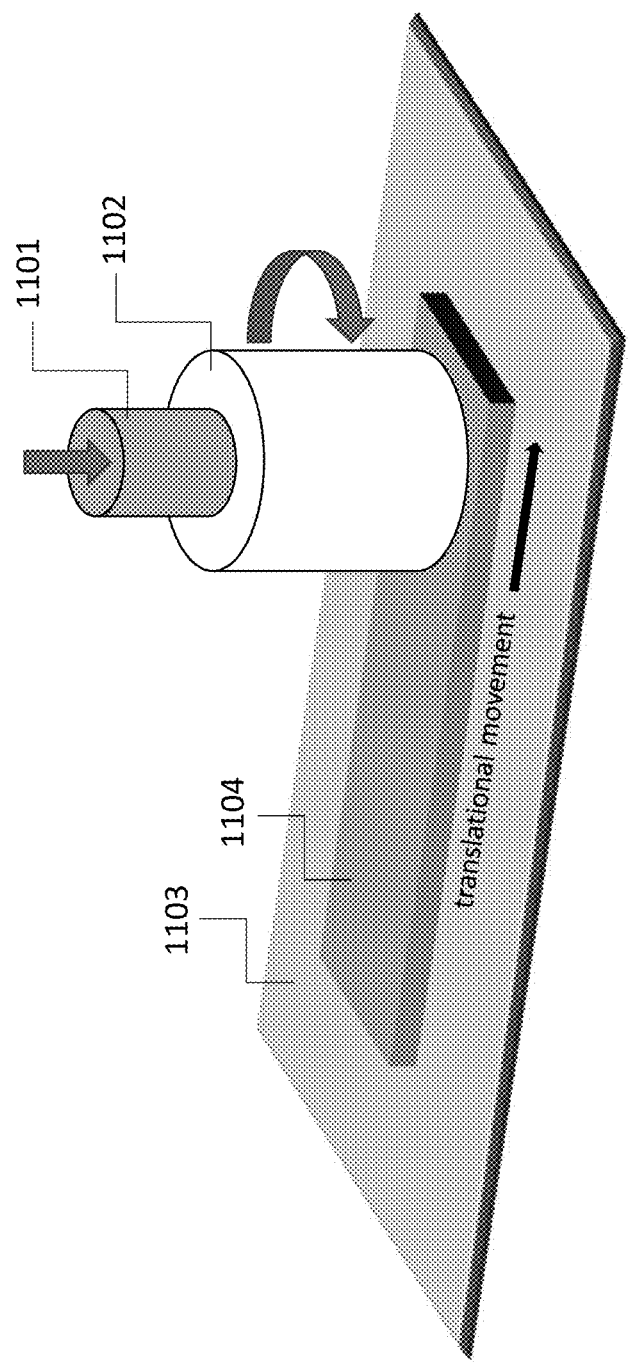
FIGS. 11A, 11B, 11C and 11D are schematic diagrams showing a code-controlled solid-state additive manufacturing process of generating 3D structures (FIG. 11A) and generated triangular, square and hexagonal honeycomb structures (FIGS. 11B-D) according to embodiments of the invention.

In one embodiment, the computer-controlled solid-state additive manufacturing process governs the predetermined x-y movements of the tool relative to the surface of the workpiece while building the non-periodic or periodic, e.g. honeycomb structure in addition to governing the rotational movement of the tool (FIG. 11A). The software-controlled solid-state additive manufacturing system is capable of building the cell structure with any material of choice, e.g. metal, MMC, metal alloy, plastic, ceramic, polymer, composite material comprising reinforcing fibers or particles, etc. The additive material (i.e. the filler material) 1101 passes through the hollow rotating tool 1102 on the substrate (or backing plate) 1103. Depending on both the tool rotational and translational movements, a deposit 1104 with particular track width and thickness is formed on the substrate or backing plate 1103.

Figure 11B:
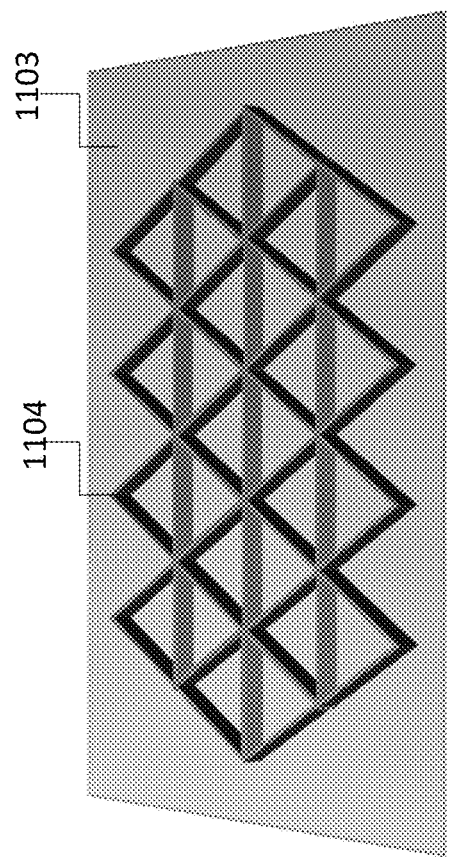
Figure 11C:
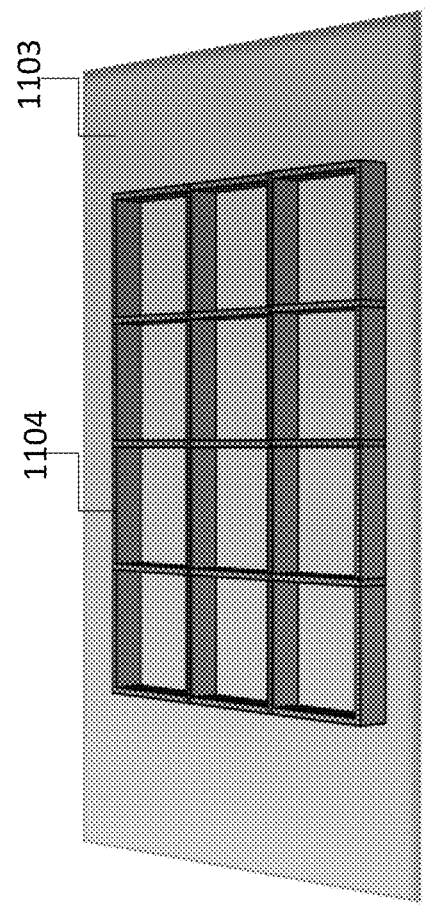
Figure 11D:
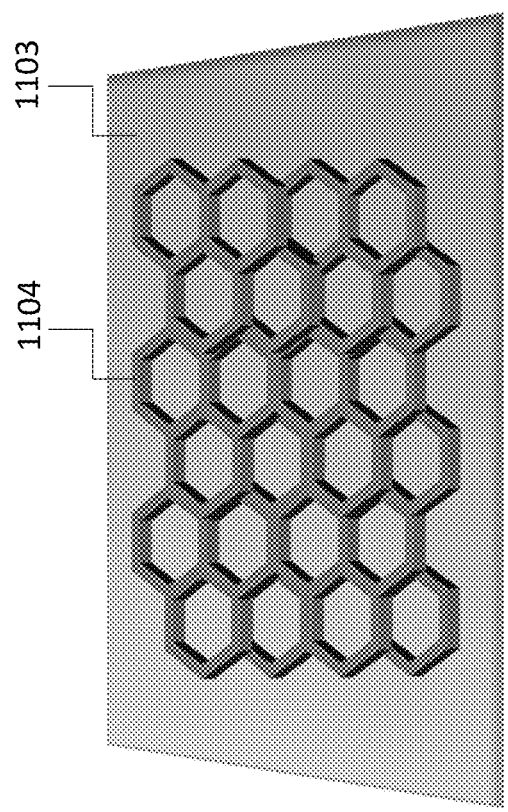

In some embodiments, the solid-state additive manufacturing process-controlled system is capable of building any cell structure 1104 on the substrate 1103, such as but not limited to triangular cell strictures (FIG. 11B), square-like cell structures (FIG. 11C), hexagonal honeycomb structures (FIG. 11D), and others, or any combination of them.

In yet another embodiment, gradient (graded) honeycomb structures can be produced yielding a gradient having a particular characteristic or functionality within the final deposited structure. For instance, it has been shown that enhancement in stiffness, strength and energy absorption is possible in the direction of a positive in-plane cell gradient.

Figure 12A:
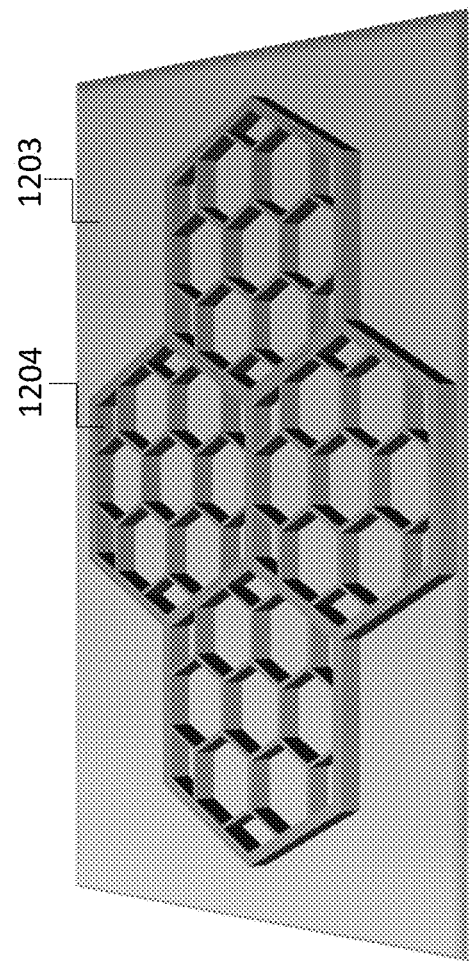
FIG. 12A is a schematic diagram of dual super-imposed hexagonal honeycomb structures on a single substrate generated by a computer-controlled solid-state additive manufacturing process according to an embodiment of the invention.
Figure 12B:
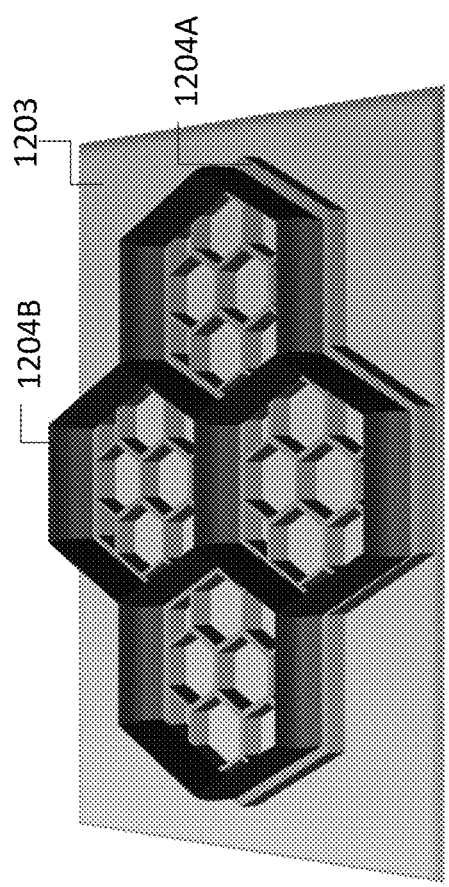
FIG. 12B is a schematic diagram of hierarchical hexagonal honeycomb structures built-up on a single substrate generated by a computer-controlled solid-state additive manufacturing process according to an embodiment of the invention.

In yet another embodiment, the software-controlled solid-state additive manufacturing process control system is capable of producing periodic, non-periodic cell structures, gradient cell structures, super-imposed structures (double-, triple-structures), hierarchical, composite and other complex cell structures or any of their combinations; some of them presented in FIGS. 12A and B. FIG. 12A is a schematic diagram of super-imposed hexagonal honeycomb structures 1204 on a single substrate 1203 generated by a computer-governed solid-state additive manufacturing process. Such structures have been suggested for improved strength and stiffness of the final part. FIG. 12B is a schematic diagram of a combined dual super-imposed honeycomb structure 1204A and a hierarchical honeycomb structure 1204B, matching with one of the underlaying honeycomb structures 1204A, added on top of the dual super-imposed structure, all built-up on a single substrate 1203.

Figure 13A:
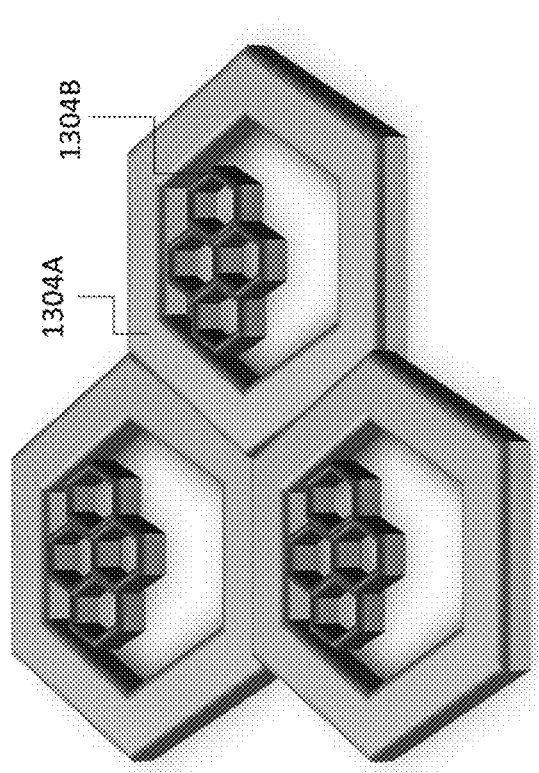
FIGS. 13A and 13B are schematic diagrams of dual super-imposed honeycomb structures where the structures have the same cell heights (FIG. 13A) and different cell heights (FIG. 13B) according to embodiments of the invention. The cell wall thickness can be the same or different for the two honeycomb structures.
Figure 13B:
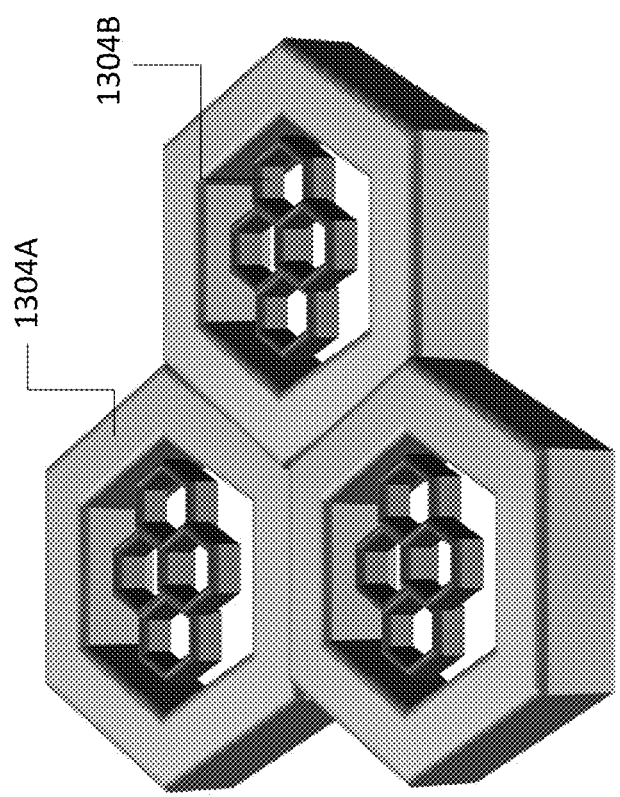

In some embodiments, the periodic and non-periodic structures (e.g. honeycomb structures) made with the software-controlled solid-state additive manufacturing process can be generated with well-defined or random cell structures, and the cells' wall thickness and height can be made to be the same or different (FIGS. 13A and 13B). FIG. 13A is a schematic diagram of cell structures 1304A and 1304B generated by the solid-state additive manufacturing process, where the different cells are of the same height, while the generated cells 1304A and 1304B in FIG. 13B are of different heights.

Figure 14A:
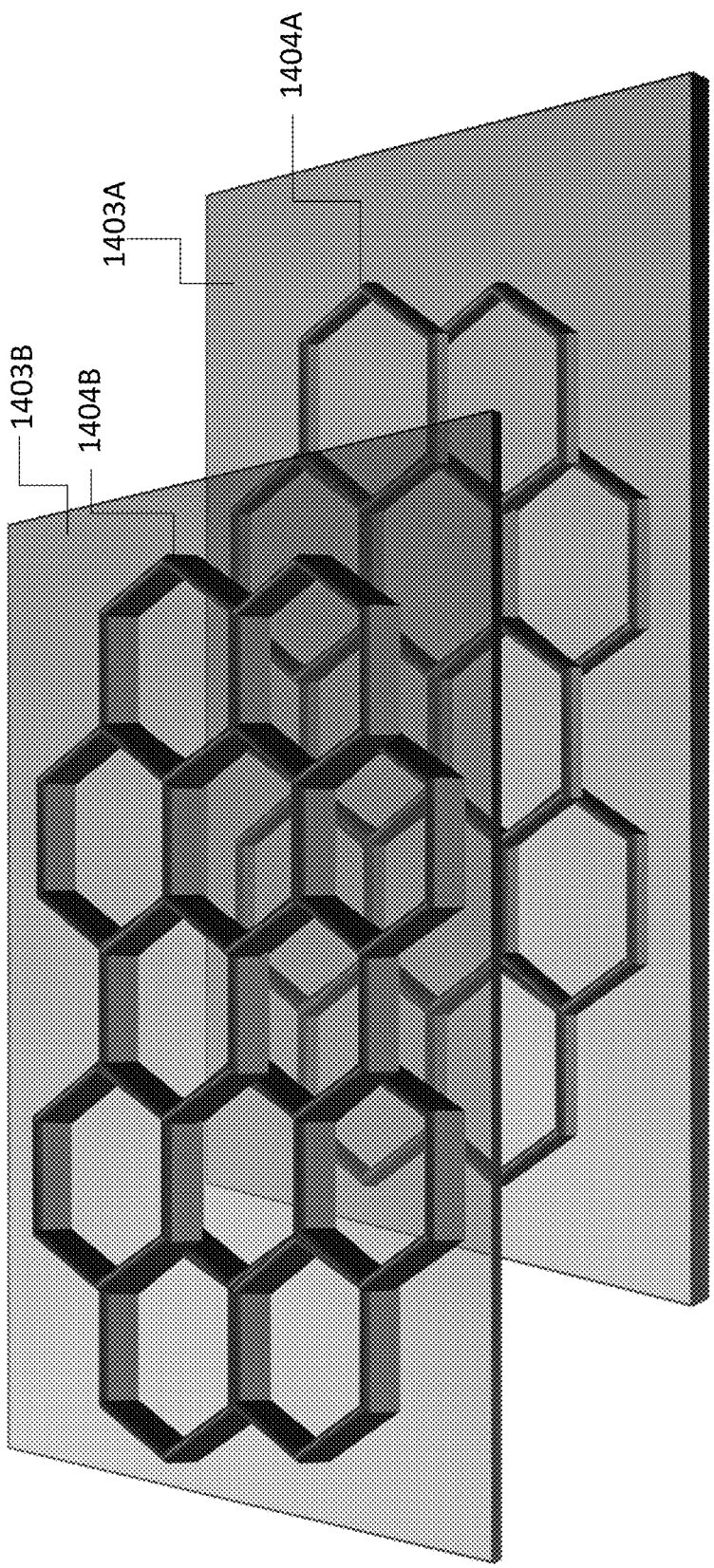
FIG. 14A is a schematic diagram of a laminate structure built-up by depositing a honeycomb structure on each substrate according to an embodiment of the invention. Each subsequent honeycomb structure may overlap the honeycomb structure underneath or may be displaced with regard to the underlying honeycomb structure. The substrate material and the honeycomb structure material can differ from each other or can be the same. Also, each subsequent substrate/honeycomb structure can be made of the same material or a different material from the previous layer. No adhesive layers are used between the honeycomb layer and the substrates.
Figure 14B:
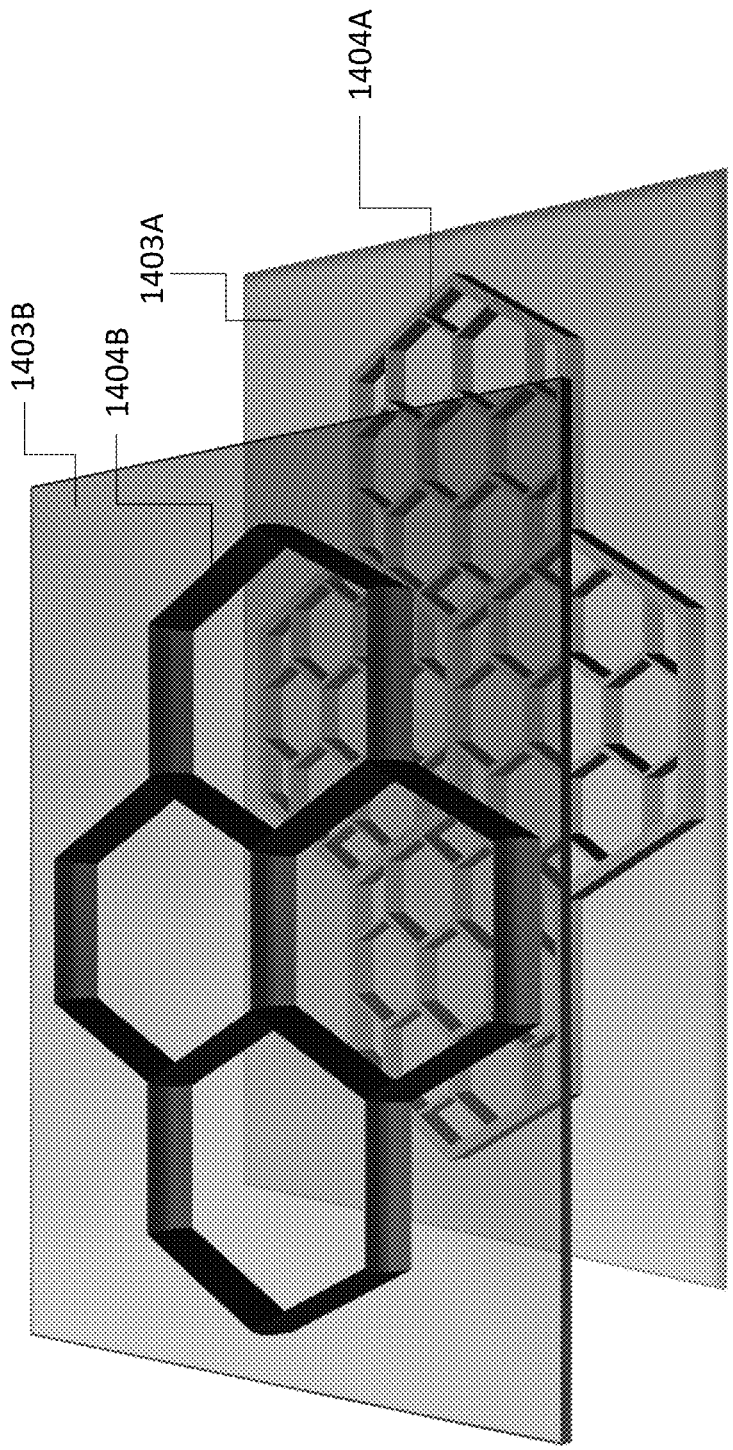
FIG. 14B is a schematic diagram of a multi-layer structure comprising multiple honeycomb structures on different substrates according to an embodiment of the invention. The first substrate with double inter-imposed hexagonal honeycomb structures is covered with a second substrate over which the second honeycomb structure, overlapping the larger honeycomb structure on the underlying substrate, is deposited. The second honeycomb structure can also be displaced with regard to the underlying honeycomb structure. Additional substrates can be added with build-up honeycomb structures on their surface yielding multi-layer honeycomb structures.
Figure 14C:
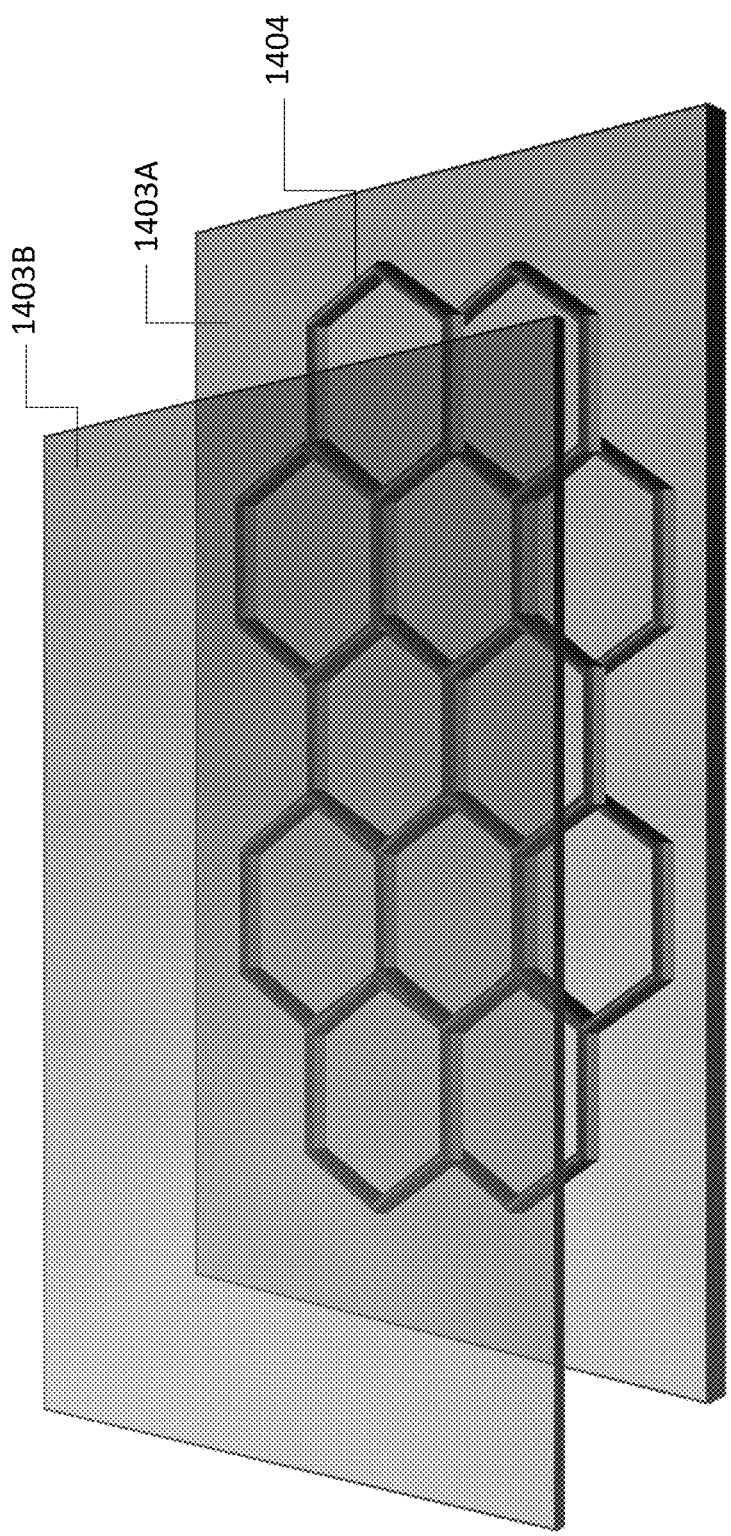
FIG. 14C is a schematic diagram of a sandwich structure built-up by depositing a honeycomb structure between two substrates according to an embodiment of the invention. The substrate material and the honeycomb structure material can differ from each other or can be the same. No adhesive layers are used between the honeycomb layer and the substrates. Stacks of multiple sandwiched structures are possible as well.

In another embodiment, the computer-controlled additive manufacturing system is capable of making a simple, composite, super-imposed and hierarchical cell structure on multiple substrates for applications where tailored elastic/stiffness performance, energy absorption, damage tolerance, and/or acoustic and heat control are required (FIGS. 14A-14C).

Specifically, in one embodiment, periodic structures 1404A and 1404B are generated on two or more substrates (1403A, 1403B), as presented in FIG. 14A. The cells' material in each layer can be the same or different. The major difference which distinguishes this structure from other honeycomb structures made with other types of processes is that this one does not include any adhesive layer or layers. The honeycomb structured layer(s) is directly deposited on the substrate with the solid-state additive manufacturing process, yielding a stronger final structure compared to conventional honeycomb structures where adhesive layers are used and usually provide the weakest points in the whole structure.

Another embodiment related to a dual super-imposed honeycomb cell structure 1404A deposited on a substrate 1403A followed by another honeycomb structure 1404B deposited on a subsequent substrate 1403B and matching one of the superimposed structure underneath is presented in FIG. 14B. Again, there is no use of any adhesive layer, which distinguishes the shown structures from conventional simple and super-imposed honeycomb structures.

In yet another embodiment, a sandwich structure of two substrates 1403A and 1403B with a honeycomb structured interlayer 1404 is shown in FIG. 14C. This structure does not comprise any adhesive layer or layers between the honeycomb cells and the substrates, which makes it intrinsically stronger than similar structures produced by conventional methods that use adhesive layers.

In another embodiment, a stack of two or more sandwiched structures with honeycomb structured interlayers can be made by the computer-controlled solid-state additive manufacturing system.

Figure 15A:
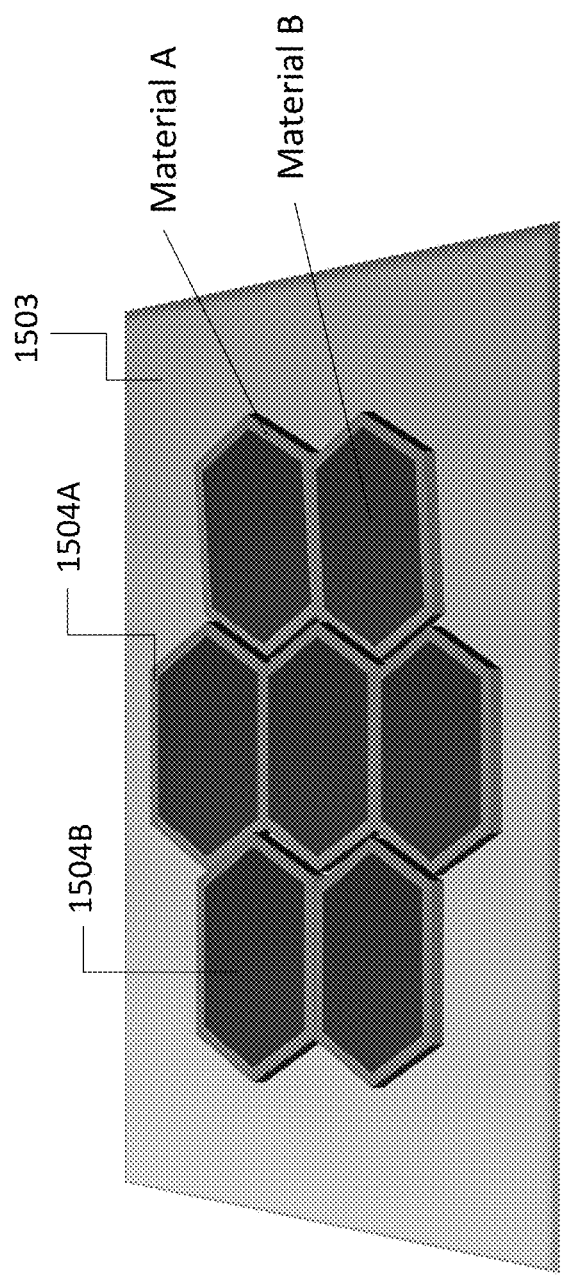
FIG. 15A is a schematic diagram of a hexagonal honeycomb structure made of material A with individual cells filled with material B generated by a computer-controlled solid-state additive manufacturing process according to an embodiment of the invention.

In another embodiment, the computer-controlled solid-state additive manufacturing process is capable of manufacturing cell structures utilizing two or more materials, e.g. a cell structure 1504A made with material A, which cells can be filled 1504B with a different material B, all deposited on a substrate 1503, as shown in FIG. 15A. In this way, a solid layer can be deposited with the additive manufacturing process which includes an embedded honeycomb structure for additional stiffness, strength and/or acoustic control.

Figure 15B:
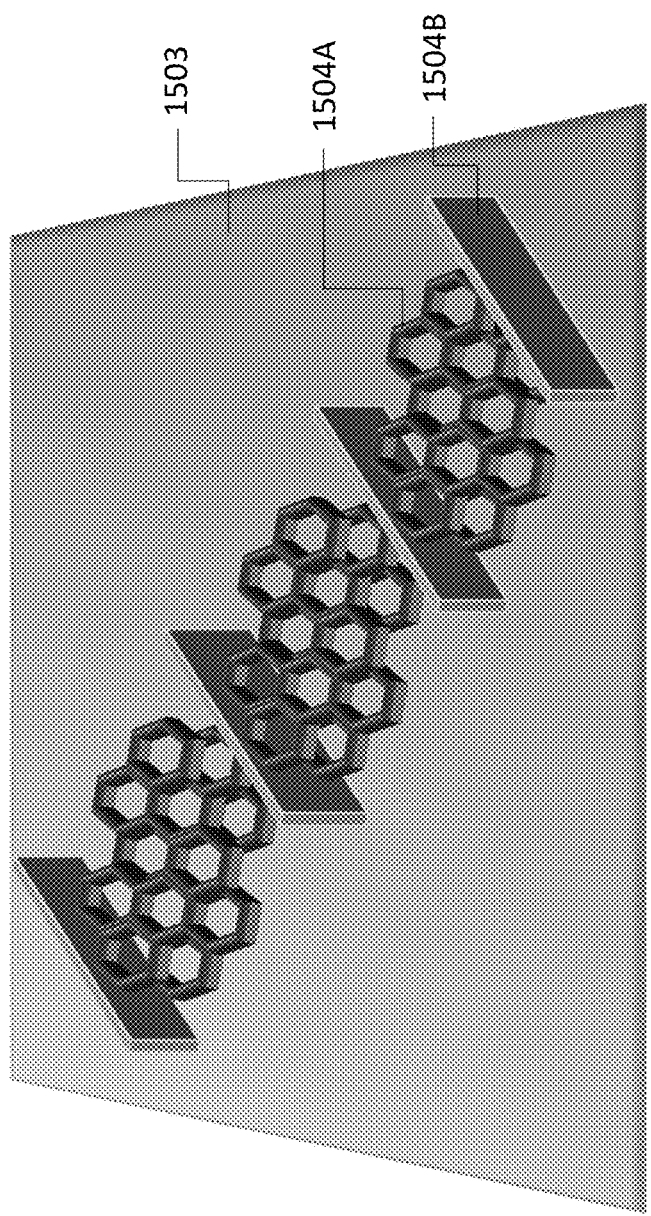
FIG. 15B is a schematic presentation of generated honeycomb structures additionally reinforced with stiffening ribs all generated by a computer-controlled solid-state additive manufacturing process according to an embodiment of the invention.

In another embodiment, the cell structure 1504A deposited on a substrate 1503 is additionally reinforced by stiffening ribs 1504B that can be simultaneously added along with the cell structures with the software-controlled solid-state additive manufacturing system as shown in FIG. 15B. The stiffening ribs 1504B can be made of the same material as the cells 1504A or with a different material.

In yet another embodiment, the generated periodic or non-periodic structures on a first substrate are deformed (subjected to a controlled shape change) by the subsequent step of depositing the next layer or structures.

In another embodiment, the computer-controlled additive manufacturing system is capable of fabricating the whole sandwiched structure (the outer bottom layer on a backing panel, the core cellular structure and the top layer) without using adhesive layers.

In some of the embodiments, the disclosed process-controlled solid-state additive manufacturing system is capable of repairing a variety of substrates, parts and complex structures. Sometimes, when the damaged structures and parts are made of metals, MMCs, composites or sandwiched and laminated structures, the choice of conventional repair methods is very limited, and are often time-consuming and/or cost-ineffective. The flexibility of the solid-state additive technology offers unique ways for repairing complex geometries that are not possible by conventional methods.

In another embodiment, the predefined additive structure fabricated by the computer-controlled additive manufacturing system is generated via 3D-printing-like processes.

In another embodiment, the predefined additive structure fabricated by the computer-controlled additive manufacturing system is generated via 4D-printing-like processes, which are actually a combination of 3D printing and time as the fourth dimension. Specifically, the computer-controlled additive manufacturing machine deposits a predefined 3D structure made with a shape memory material (also known as a "smart" material). The deposited 3D structure made of shape memory material can change its shape (dimensions) over time while adapting to its surroundings and/or when subjected to certain external stimuli (e.g. electric field, magnetic field, load, light, heat, etc.)

In yet another embodiment, the 3D structure made from shape memory material and deposited with the disclosed computer-controlled solid-state additive manufacturing machine is capable of reversible changes in its shape (and dimensions).

In some embodiments, the solid-state additive manufacturing system is capable of depositing materials known to be antimicrobial and antifungal, such as copper, bronze, brass, Ag-containing alloys and stainless steel enriched with Ag- and Cu-ions. Such materials are very useful for applications, such as ship structures, which are in a continuous contact with sea water, where coatings that have anti-biofilm/anti-slime functionality are preferred.

Figures 16A, 16B:
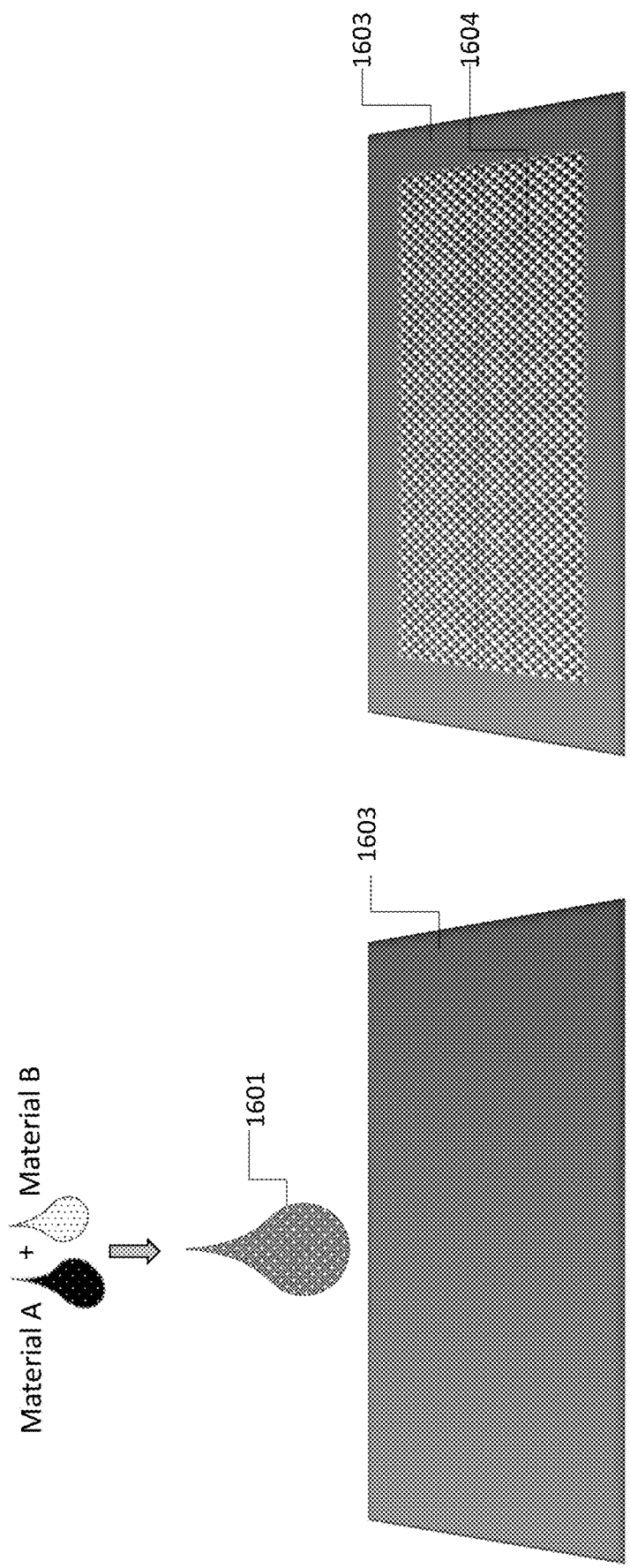
FIG. 16A is a schematic diagram showing the mixing of two materials A and B with a code-controlled system according to an embodiment of the invention.
FIG. 16B is a schematic diagram showing a deposited layer with a well-controlled material A/B ratio according to an embodiment of the invention.

Moreover, in one embodiment, the software-controlled solid-state additive manufacturing system includes computer-readable code for regulating the concentrations (or volume ratio) of the incoming filler materials, when two or more materials are being added to the feeding unit of the solid-state additive manufacturing system. For instance, two powder or granular materials, material A and material B are brought independently into the feeder and mixed well. Their volume ratio or concentration of material B in material A in the final filler material 1601 can be regulated by a code for controlling the feeding streams of material A and material B in the feeder, and then the well-mixed filler can be deposited on the substrate 1603 (FIG. 16A). As an example only, aluminum (Al) powder and steel powder can be introduced into the feeder independently and mixed in a certain ratio (regulated by the code) to provide the required steel-concentration in the final deposited layer 1604 on a substrate 1603 (FIG. 16B). Furthermore, in another embodiment, such deposited layer (e.g. Al with incorporated steel) can be further subjected to post-processing treatment to generate desirable surface micro- and/or nano-structures that can provide an additional functionality to the deposit 1604, viz. wear-resistant, self-cleaning, anti-biofilm or anti-microbial functionality.

Figure 16E:
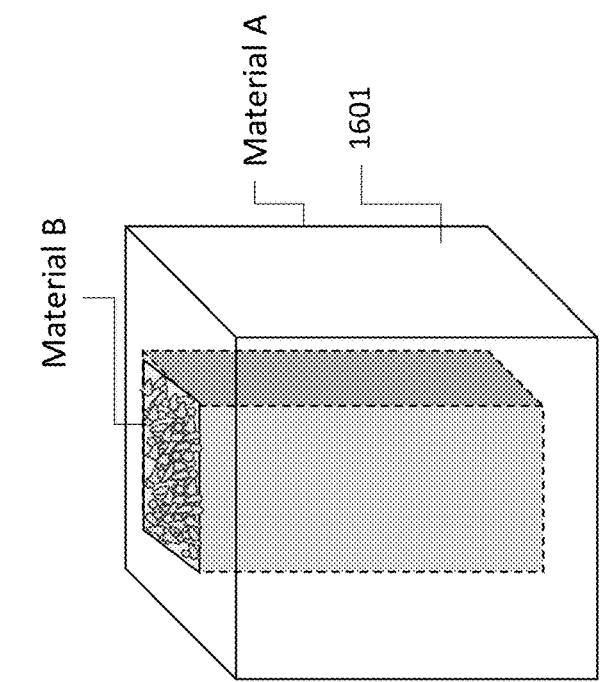
FIG. 16E is a schematic diagram of a filler material in a form of a hollow bar (or rod) made of material A and filled with flakes of material B according to an embodiment of the invention.
Figure 16D:
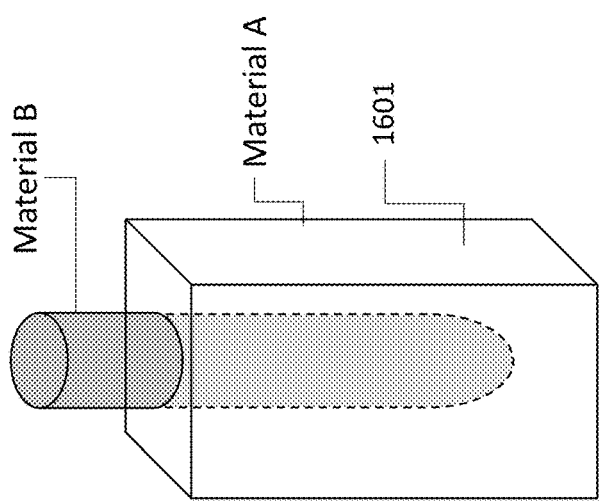
FIGS. 16C and 16D are schematic diagrams of a filler material in a form of a hollow bar (or rod) made of material A filled with material B according to an embodiment of the invention.
Figure 16C:
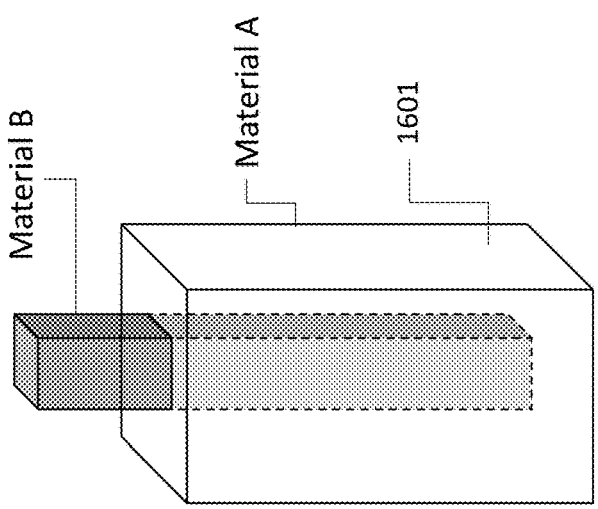

In another embodiment, the filler material 1601 can be made in a form of a hollow tube or hollow rod (made of material A) filled with another material (material B), as presented in FIGS. 16C, 16D and 16E.

Figure 16F:
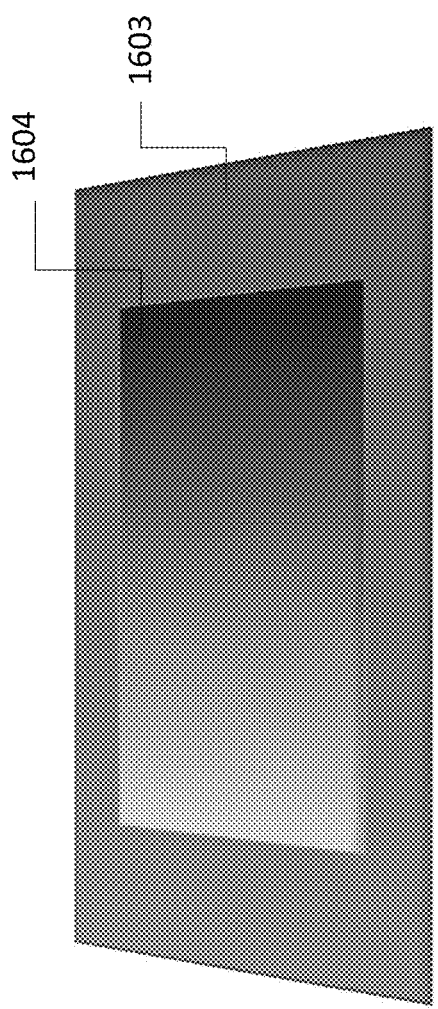
FIGS. 16F and 16G are schematic diagrams of a concentration gradient along the deposition length (FIG. 16F) and along the layer thickness (FIG. 16G) generated by a code-controlled solid-state additive manufacturing system according to embodiments of the invention.
Figure 16G:
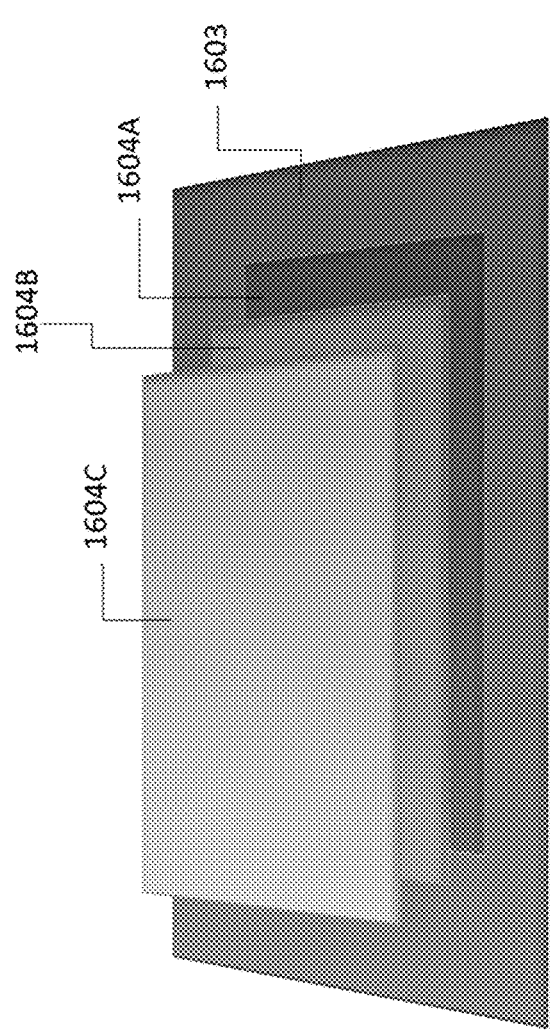

In some embodiments, the code can change the ratio (concentration or composition) of the filler materials with time, i.e. with the number of deposited layers, and thus, can enable a material concentration gradient in the deposited layers. In one embodiment, the material composition gradient can be achieved along the layer length 1604 deposited on a substrate 1603 as presented in FIG. 16F. In another embodiment, the material composition gradient can be achieved along the layers' thickness (deposit thickness), as presented in FIG. 16G, where the deposited layers 1604A, 1604B and 1604C gradually change in their composition. In yet another embodiment, composition (concentration) gradients are possible in both directions, along the deposition length and the deposit thickness.

Figures 17C, 17D:
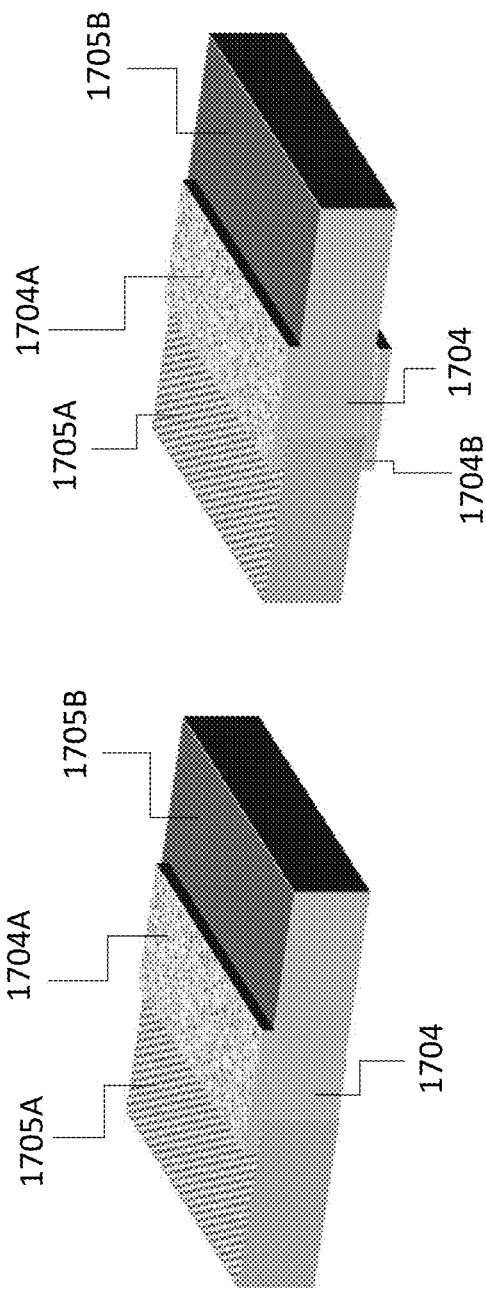

In some embodiments the computer-controlled solid-state additive manufacturing machine is used to join parts 1705A and 1705B placed on a backing plate 1703 in a manner in which a filler material 1701 can be introduced into the joint between the two parts (FIG. 17A) yielding the final structure presented in FIG. 17B, where the joint between the two parts 1705A and 1705B is filled with the deposit 1704. The filler material 1701 in FIG. 17A can contain reinforcing particles, fibers, CNTs and others to reinforce the final joint 1704 in FIG. 17B. In yet other embodiments, beside the joint 1704 between the two parts 1705A and 1705B, additional stiffening (strengthening) structures, such as 1704A and/or 1704B can be deposited (FIGS. 17C and 17D).

Figure 18C:
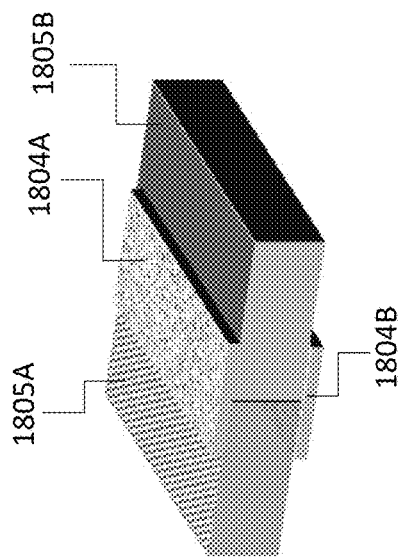
FIGS. 18A, 18B and 18C are schematic diagrams showing a process of joining two parts made of same, similar or dissimilar materials according to embodiments of the invention, where
Figure 18B:
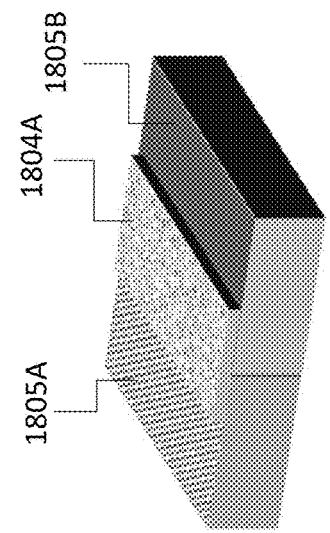
Figure 18A:
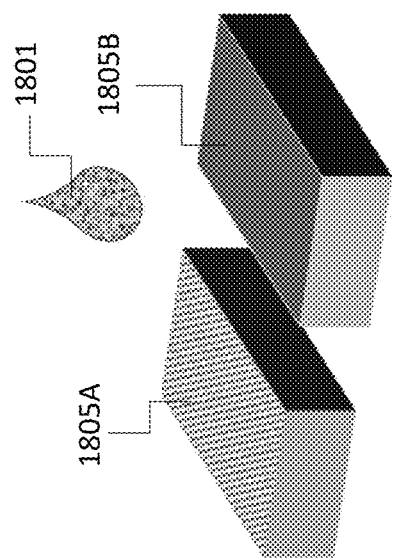

In some embodiments, two parts 1805A and 1805B can be joined together without introducing the filler material 1801 into the space (in the joint) between the two parts by placing the parts in sufficiently close proximity and depositing the filler as stiffening structures 1804A and/or 1804B (FIGS. 18A-C). The filler material used for the joining process can be reinforced with carbon or glass fibers, carbon nanotubes (CNTs), metal particles and other reinforcing particles for adding strength to the joint.

Figure 19B:
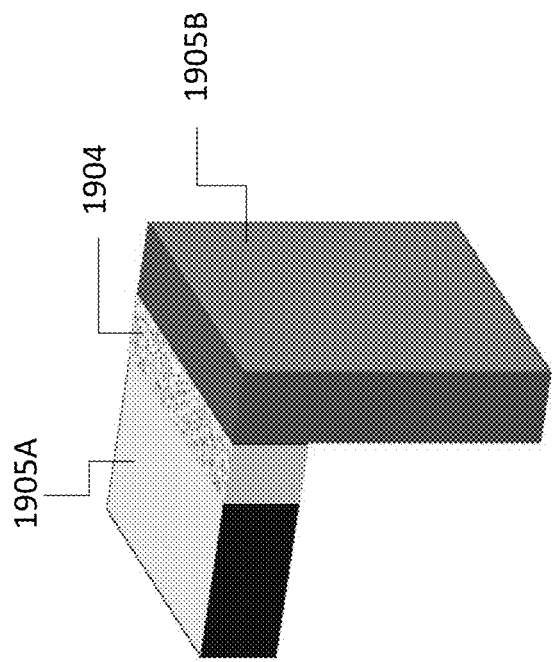
Figure 19A:
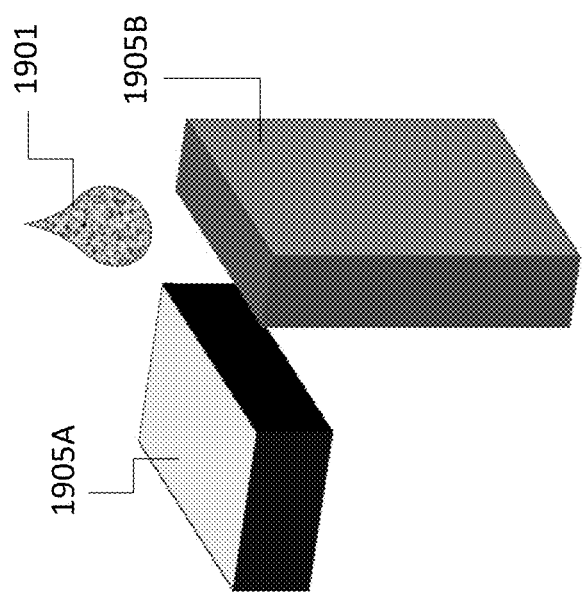
Figures 20B, 20C, 20D, 20E:
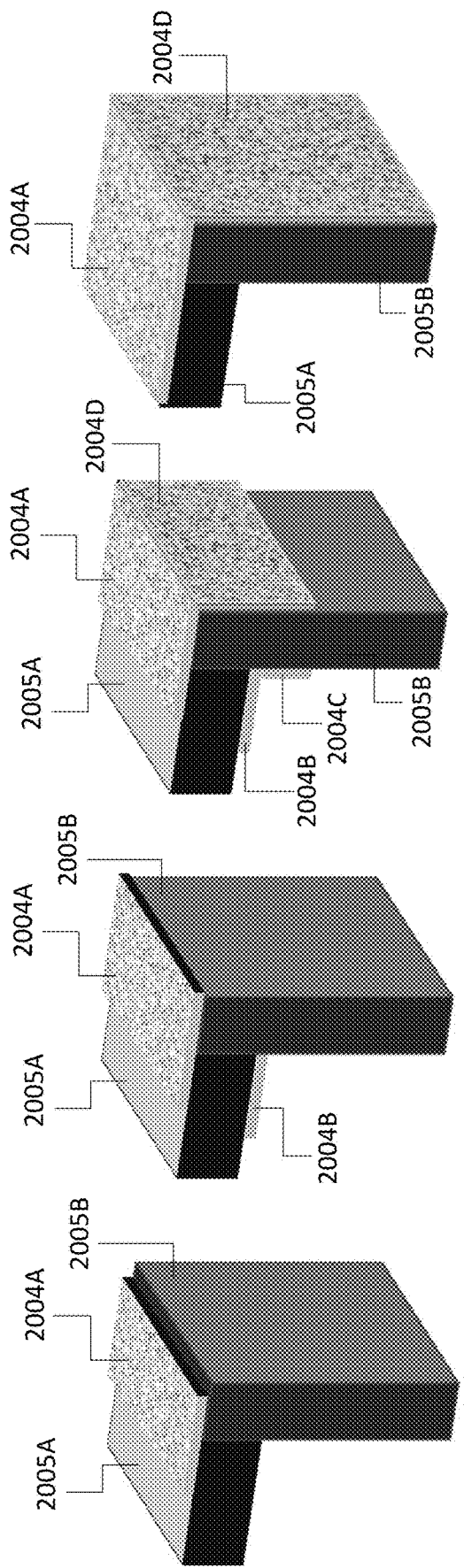

In some embodiments, corner joining of two parts 1905A and 1905B with filler 1901 by introducing filler in the space (joint) between the two parts is presented in FIG. 19A, yielding the joint parts with deposit 1904 as presented in FIG. 19B. In other embodiments, the corner joint can be further reinforced (strengthen) by depositing stiffening structures 1904A, 1904B and/or 1904C as presented in FIGS. 19C and 19D.

In other embodiments, the corner joint is made by the solid-state additive manufacturing system without introducing filler 2001 into the space between the two parts to be joined 2005A and 2005B, but instead only stiffening structures 2004A, 2004B, 2004C and/or 2004D are added (FIGS. 20A-E).

Figures 21A, 21B:
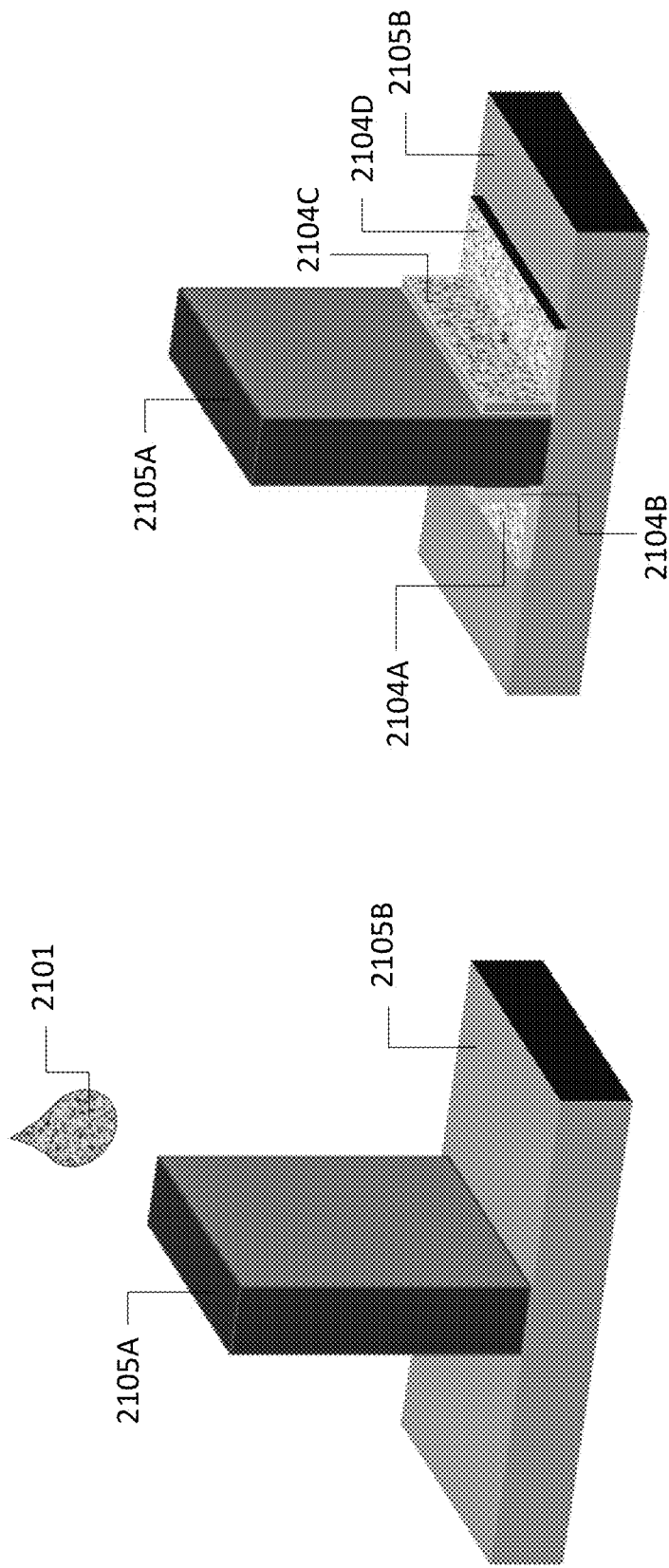
FIGS. 21A and B are schematic diagrams of a process of joining two parts made of same, similar or dissimilar materials according to embodiments of the invention, where
FIG. 21B shows two parts joined together with stiffening structures.

In another embodiment, a T-joint of two parts 2105A and 2105B is made by adding a filler 2101 yielding the final structure with deposited stiffening structures 2104A, 2104B, 2104C and/or 2104D as presented in FIGS. 21A and 21B. In yet another embodiment, the filler material can be deposited in the space between the two parts to be joined via the T-joint and then strengthen with the stiffening structures.

In other embodiments, the solid-state additive manufacturing system is used for joining two parts or structures with simple or complex geometries. The parts can be made of the same, similar or dissimilar materials. It is worth noting that in the case of joining dissimilar materials, the number of available traditional joining processes is limited and/or these traditional joining processes have severe limitations.

Figure 22C:
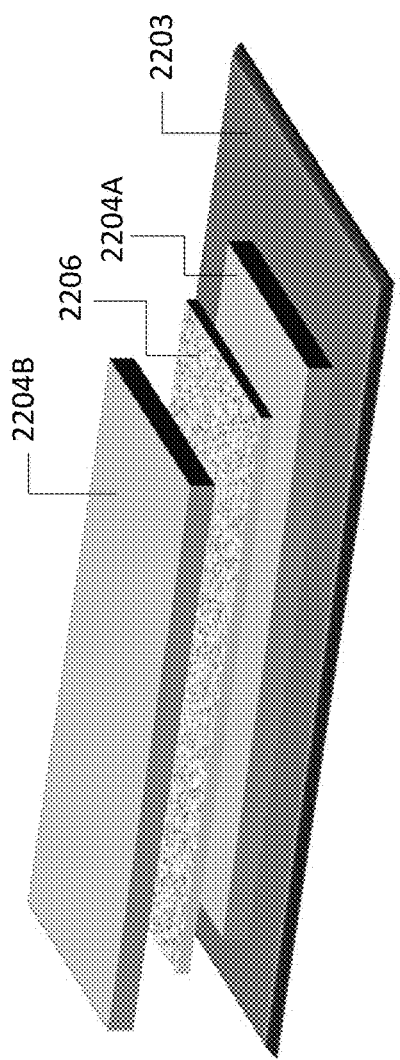

In one embodiment, a prepreg inter-layer 2206 is incorporated in the laminate structure between two thermoplastic plates 2204A and 2204B, as presented in FIGS. 22A-C. The plates 2204A and 2204B can be previously fabricated plates, where the machine joins the prepreg layer between the two plates by severe thermo-mechanical (friction) action provided by the tool 2202. In another embodiment, the thermoplastic plates can be deposited with the machine via supplying the filler material 2201 via the hollow tool 2202 in addition to their bonding to the prepreg interlayer by the severe thermo-mechanical action provided by the tool.

The prepreg inter-layer can be a single layer prepreg impregnated with thermoplastic or thermoset polymer or can be a multi-layer prepreg (so-called prepreg laminate). The prepreg usually includes uniaxially-oriented fibers or biaxially-oriented fibers or multi-axis-oriented fibers, where the fibers can be carbon fibers, glass fibers, metal wires, and so on.

Figure 23A:
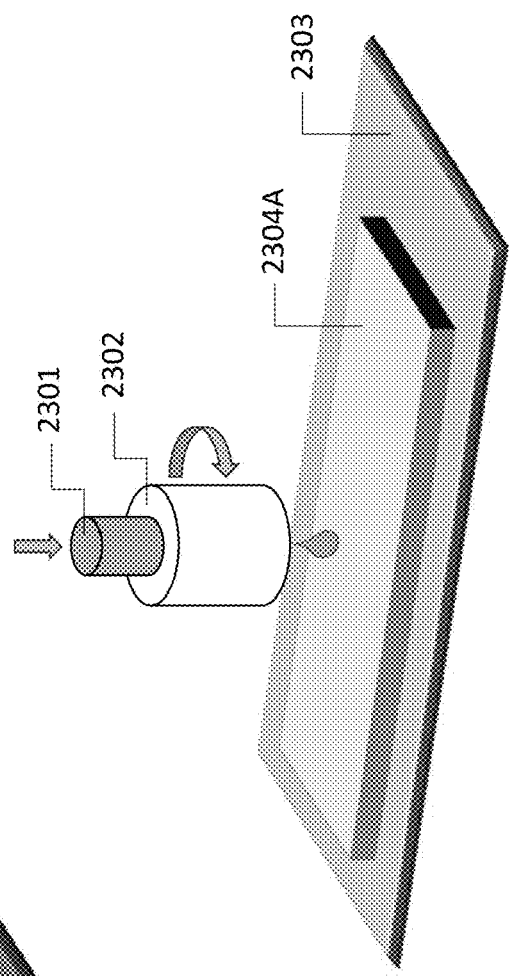
FIGS. 23A, 23B, 23C and 23D are schematic diagrams of a process of making sandwiched metal structures comprising a prepreg inter-layer according to embodiments of the invention, where
Figure 23B:
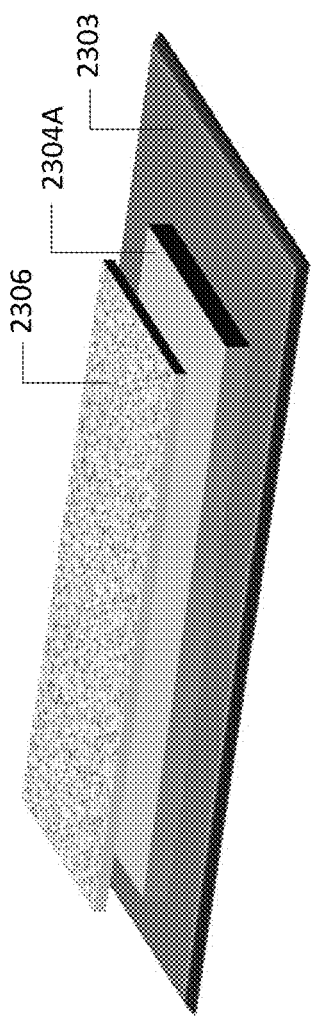
Figure 23C:
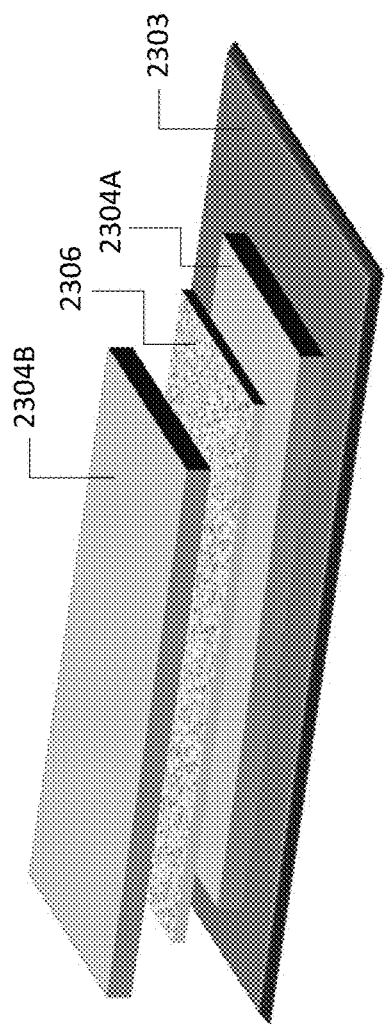
Figure 23D:
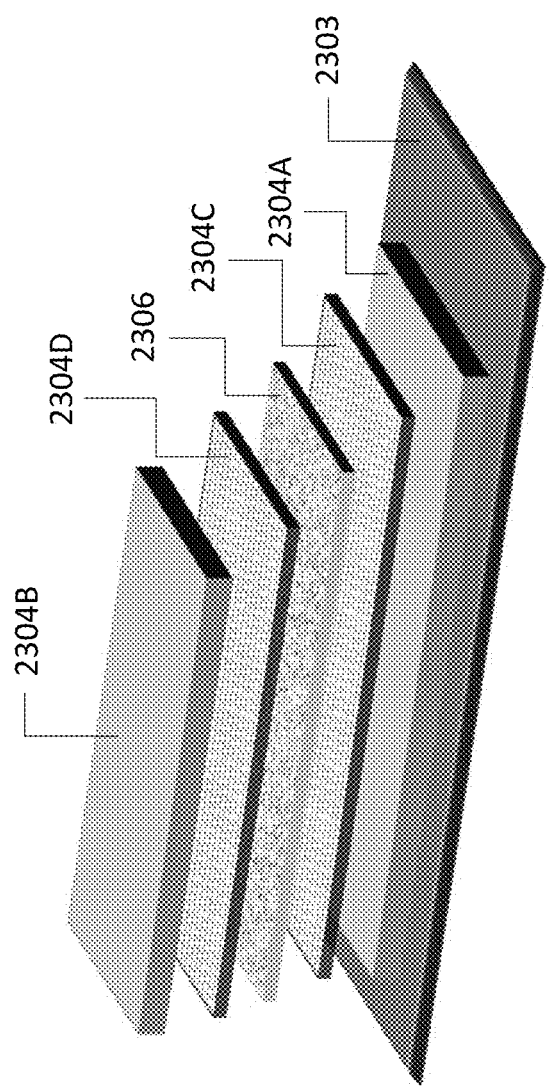

In another embodiment, the plates 2304A and 2304B are made of metal, metal alloy or metal-matrix-composite (MMC) or any other composite and the prepreg inter-layer 2306 is added without using adhesive layers as presented in FIGS. 23A-C. For good bonding to the metal plates, thin thermoplastic interlayers 2304C and 2304D around the prepreg layer can be added (FIG. 23D). Already manufactured metal plates 2304A and 2304B can be used or they can be simultaneously deposited via the tool 2302.

Figure 24A:
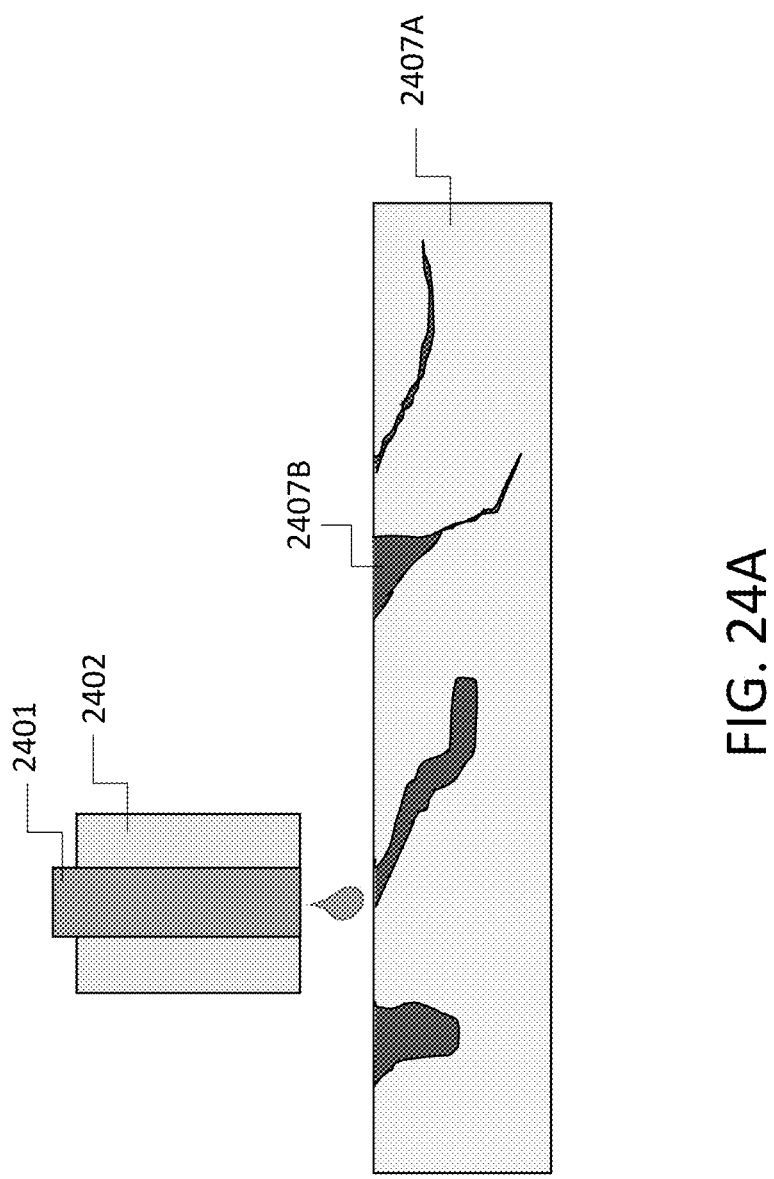
FIG. 24A is a schematic diagram of a solid-state additive process of repairing a blind hole and a variety of surface cracks/defects according to an embodiment of the invention.
Figure 24B:
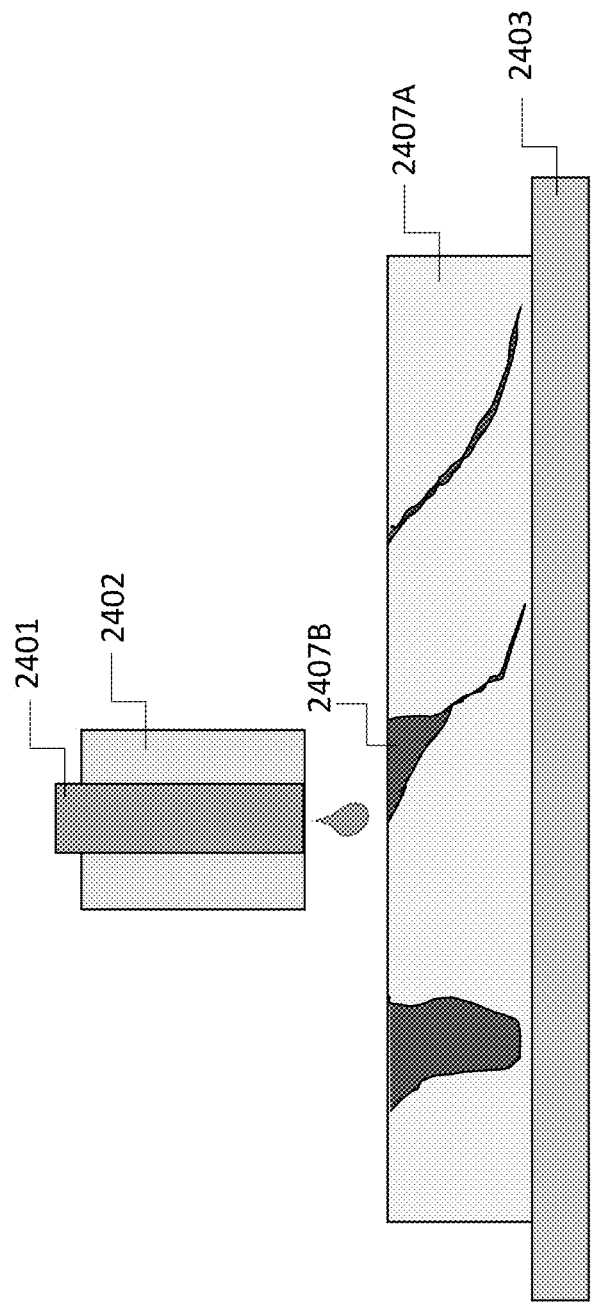
FIG. 24B is a schematic diagram of a process of repairing holes and cracks/defects using a backing plate according to an embodiment of the invention.

In other embodiments, the software-controlled solid-state additive manufacturing system is capable of repairing a defective substrate or a part 2407A having blind holes, surface cracks and other defects 2407B, as presented in FIG. 24A. The defects are filled with a filler material 2401 supplied via hollow rotating tool 2402. In another embodiment, when the holes and cracks 2407B are deeper in the defective substrate or structure 2407A, a backing plate 2403 is used during the repair process (FIG. 24B).

Furthermore, embodiments include various designs of the feeding system and associated parts for continuous supply of the filler material to the solid-state additive manufacturing system.

Figure 25C:
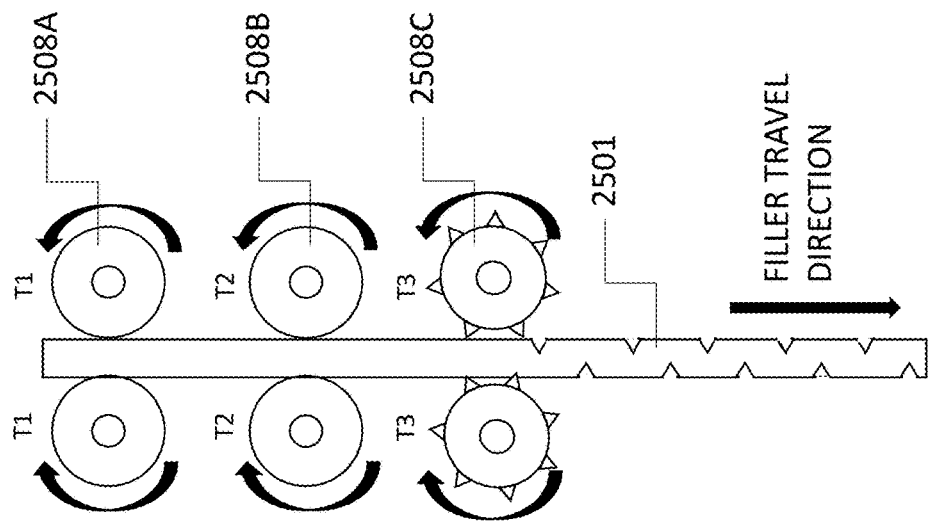
FIGS. 25C, 25D and 25E are schematic diagrams of a drive wheel system for continuous supply of rod-like filler material to a solid-state additive manufacturing machine according to embodiments, where
Figure 25B:
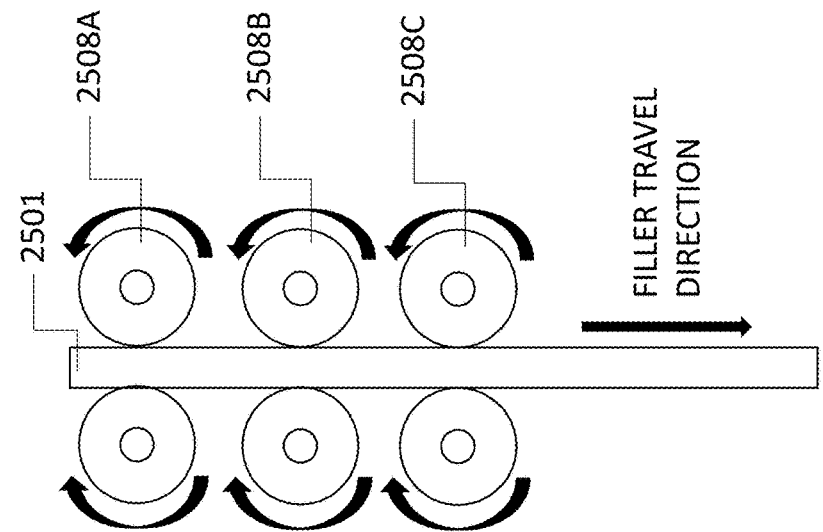
FIGS. 25A and 25B are schematic diagrams of a drive wheel system for a continuous supply of rod-like filler material to a solid-state additive manufacturing machine according to embodiments, where
Figure 25A:
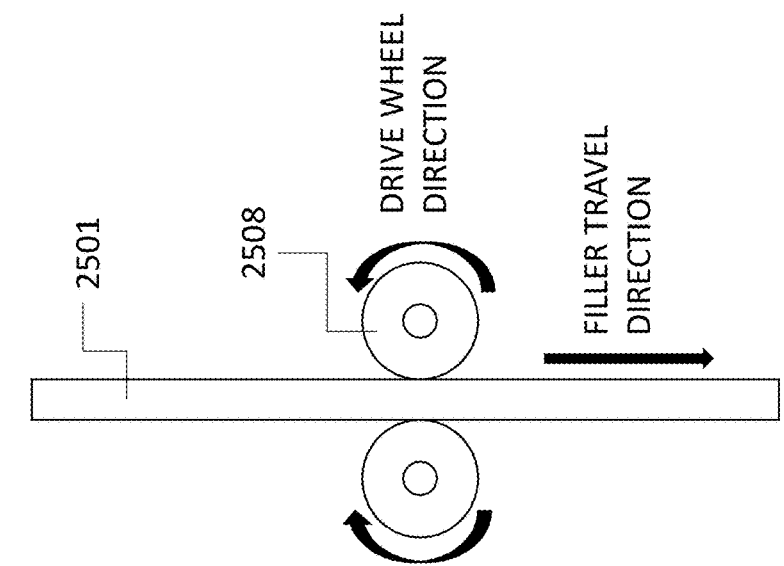

In an embodiment, one pair of drive rollers 2508 (or drive wheels) is used for a continuous supply of the filler rod material 2501 to the solid-state additive manufacturing system, as presented in FIG. 25A.

In other embodiments, two-, three- or multiple-pairs of drive wheels 2508A, 2508B, 2508C, etc. (also called feeding or feed rollers) are employed for a continuous supply of the filler material 2501, such as a rod of filler material, to the solid-state additive manufacturing system, as presented in FIG. 25B.

In some embodiments, the drive wheels have a smooth surface finish, while in other embodiments, one or more of the rollers can have a surface that is textured or includes one or more groves and/or channels, and/or a surface with roughness or special features. As an example only, FIG. 25C presents a feeding system with three pairs of rollers 2508A, 2508B and 2508C, where one pair rollers 2508C has surface features that would impact the shape of the incoming filler material 2501 for its subsequent easier friction stirring on the workpiece surface.

In some embodiments, the rollers can have different shapes. In other embodiments, the rollers can have the same shape.

In another embodiment, one or more of the rollers are held at ambient temperature or are heated to different temperatures (T1, T2, T3) to enable softening and/or reduction of the density of the filler material, and thus, enabling easier stirring on the workpiece surface (FIG. 25C).

In some embodiment, the compartments where the sets of rollers are located, are heated to different temperatures. Temperatures T1, T2 and T3 in FIG. 25C can be different or the same depending upon the feeding material used. Usually T1<T2<T3, but any other temperature profile can be employed.

Figure 25E:
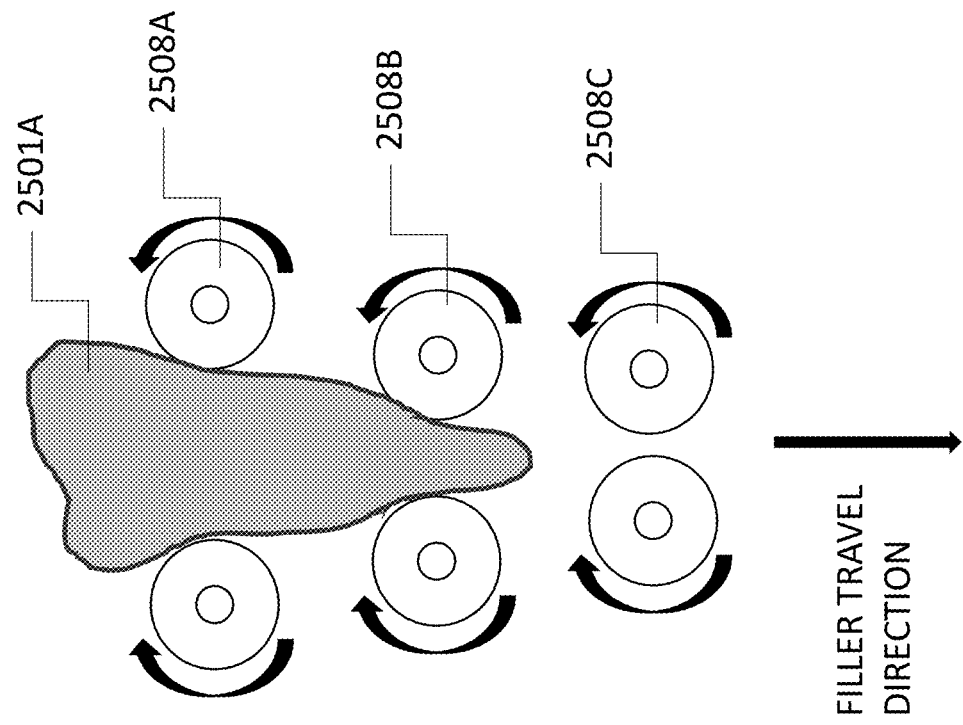
Figure 25D:
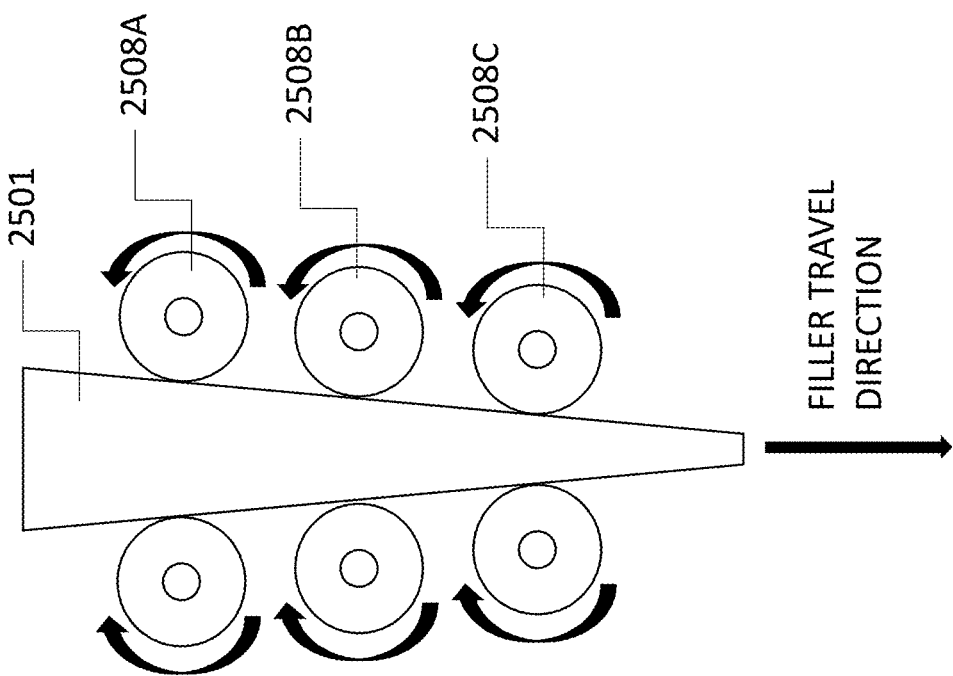

In another embodiment, the gap between the rollers is variable as presented in FIGS. 25D and 25E, which is especially useful when handling filler materials such as large plastic blocks 2501 or a large pile of material 2501A that is squeezed between the rollers 2508A, 2508B and 2508C and introduced as a narrow material stream for making additive structures on a workpiece or a flat substrate.

In some embodiments, the variable gap between the rollers 2508 is provided by springs 2509 (FIG. 25F) which push the rollers towards each other, and thus, provide "squeezing" or compression of the material, while pushing the material down towards the workpiece. The material compression depends on the elasticity of the spring from one side, as well as the elasticity and compression strength of the filler material being compressed on the other side.

In another embodiment, the variable gap between the rollers is adjusted manually by way of screws or other means. In embodiments, the variable gap can be adjusted manually and/or automatically, for example, by way of springs.

In yet another embodiment, the force on the filler bar is easily adjusted in situ by adjusting the gap between the rollers.

In some embodiments, the rollers are capable of providing one or more measurements of filler bar dimensions, which measurements are valuable for estimating the volume of the material being deposited through the precise displacement of the rollers.

In particular embodiments, different sets of rollers can be operated at different rates, which is helpful with re-load timing delays.

Figure 25G:
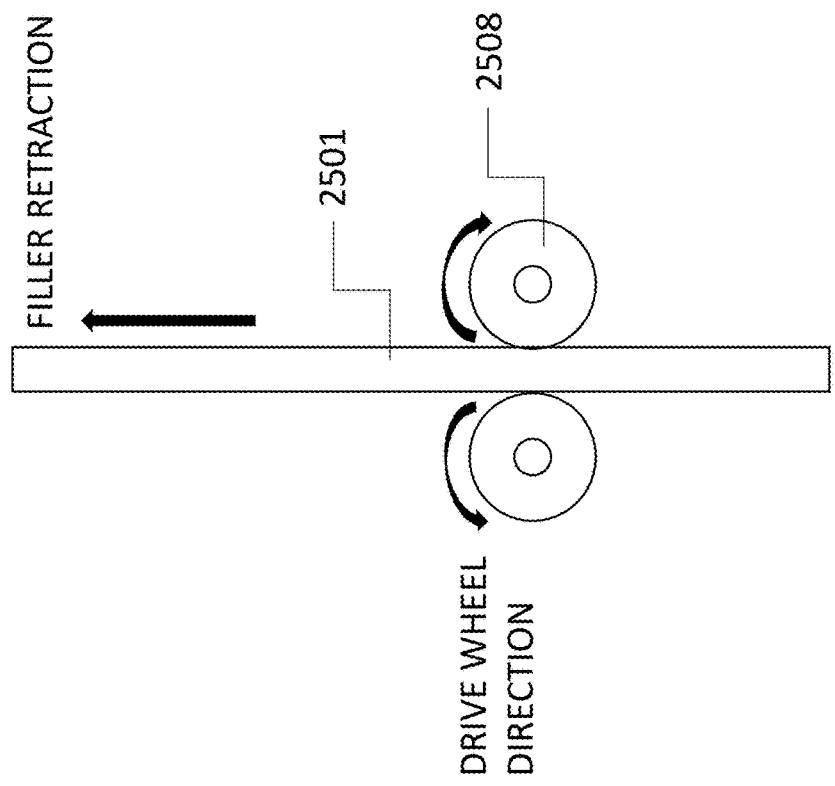
FIG. 25G is a schematic diagram of a drive wheel system for continuous supply of rod-like filler material to a solid-state additive manufacturing machine according to an embodiment. The drive wheel system shown has a set of rollers presented to re-track (pull-away) the filler rod from the workpiece surface.
Figure 25F:
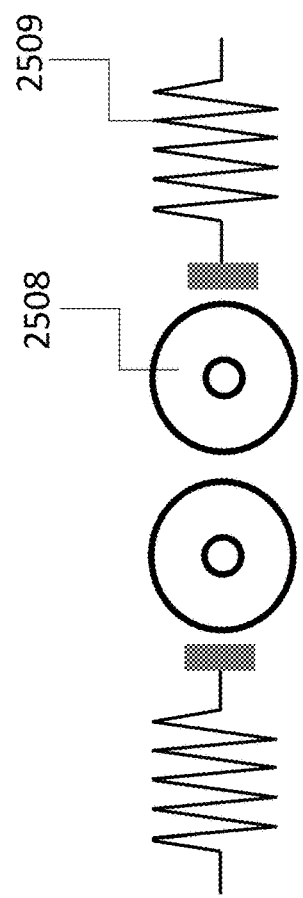
FIG. 25F shows a set of rollers where the gap between them is defined by springs.
Figure 26E:
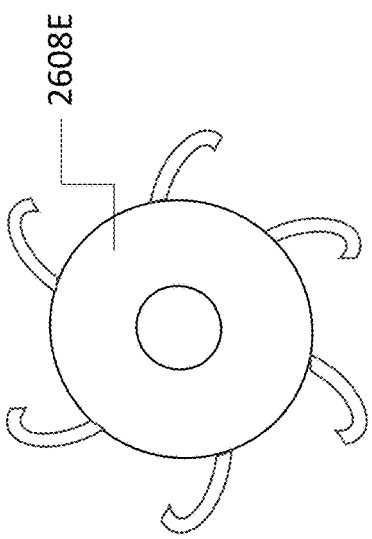
FIGS. 26A-26E are schematic diagrams showing cross-sectional views of different types of feeding rollers according to embodiments.
Figure 26C:
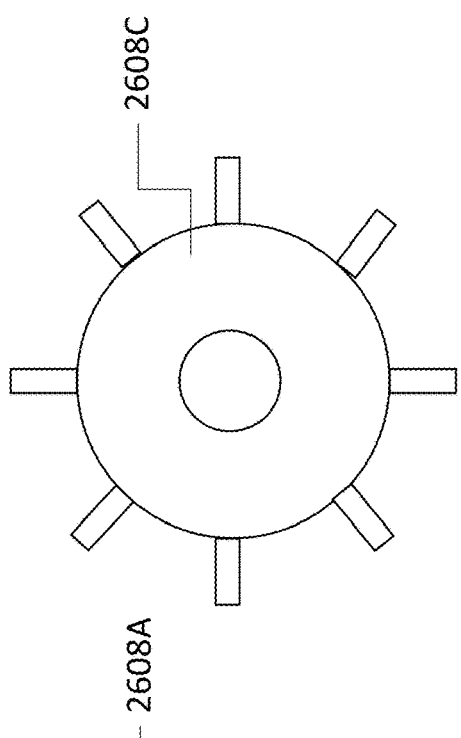
Figure 26D:
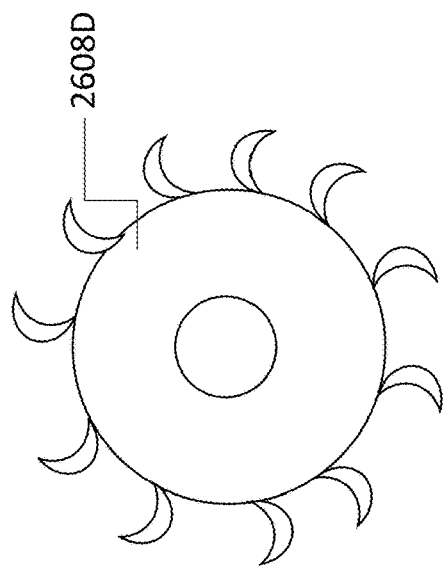
Figure 26A:
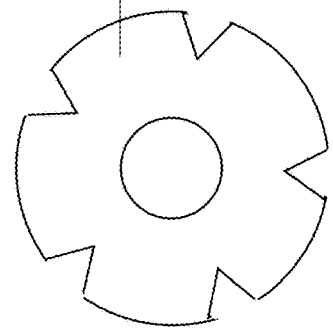
Figure 26B:
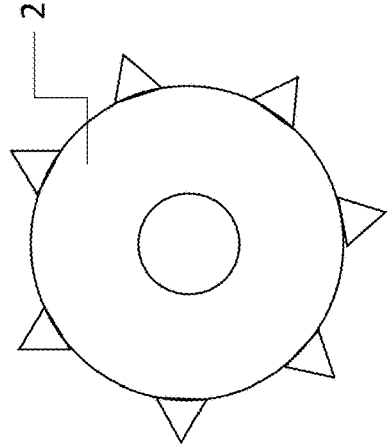

In some embodiments, the filler rod material 2501 can be engaged (pushed down as presented in FIG. 25A) or disengaged between the rollers 2508, as presented in FIG. 25G. By controlling the direction of roller rotation and roller speeds, the filler material or rod is pushed towards the workpiece or is retracted (pulled away) from the workpiece.

In some embodiments, the rollers 2608 have different surface structures as presented in FIGS. 26A-E. Some of the surface structures are embedded within the roller surface, e.g. groves of different cross-sectional shapes (triangular, square, rectangular) as presented in FIG. 26A. Some of these surface features are especially useful for providing stability to rod-like filler materials during feeding.

Figure 27D:
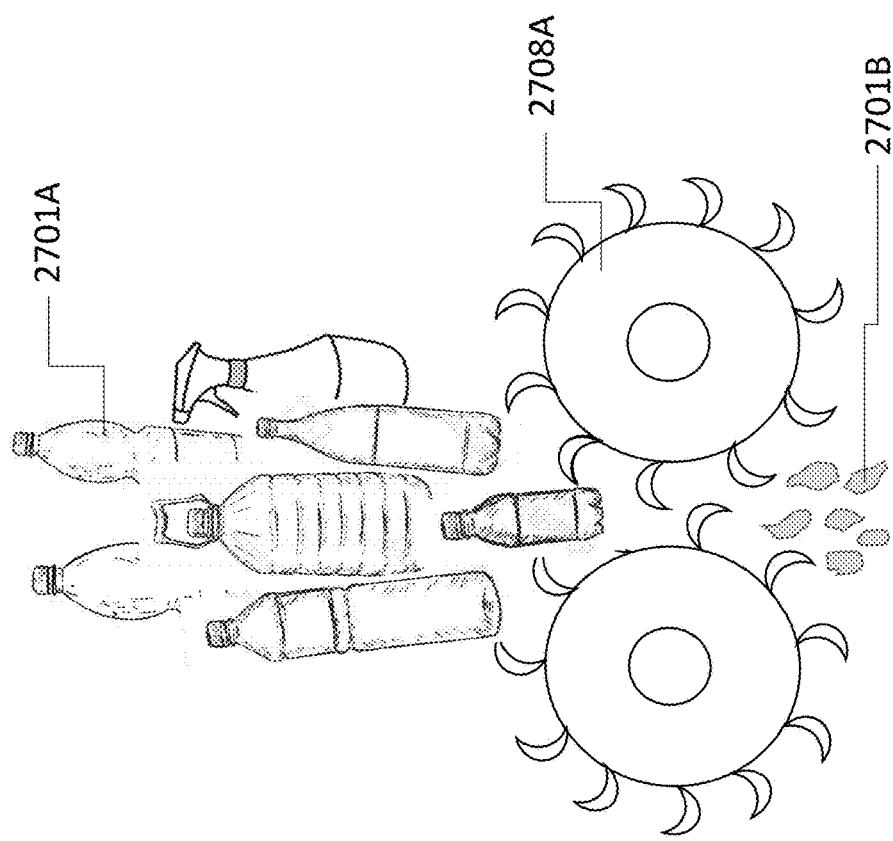
FIG. 27D is a schematic showing plastic bottles that can be introduced in the feeding system of the solid-state additive manufacturing system and used as filler material.

In other embodiments, surface features are provided above the roller surface, e.g. crescent blades (knife-type), paddle-type blades, and so on, as presented in FIGS. 26B-E. These types of rollers can have one or more effects on the filler material, depending on the type of filler and its form. For instance, crescent-like/knife-like blades on the rollers 2708A can be used to chop filler material from a large block of material 2701A into small pieces of filler material 2701B, as presented in FIG. 27A. Paddle-type extensions on the rollers 2708B can be used to supply granular material, powder, briquettes, chopped material or any other shape of filler material 2701C to the solid-state additive manufacturing machine, as presented in FIG. 27B.

In some embodiments, the feeding rollers are located inside the spindle of the solid-state additive manufacturing system, while in other embodiments, the rollers are located outside the spindle housing.

In one embodiment, the solid-state additive manufacturing machine is used to recycle waste metal pieces, e.g. machine chips, shavings, scrap metal, plastic scrap pieces or flakes and so on, and deposit them for example as a continuous layer on the workpiece surface (FIG. 27B).

In another embodiment, the scrap metal pieces are first pressed into a solid bar and such bar is supplied as a filler to the solid-state additive manufacturing machine.

In yet another embodiment, the scrap metal pieces are first made into powder, granules or compacted into briquettes and then supplied as a filler to the solid-state additive manufacturing machine.

Furthermore, any used metal pieces, such as bullet casings and shotgun shells and/or other bullet casings can be used as a filler material in the feeding system of the present invention. The used metal pieces can be first chopped into smaller pieces and then supplied to the feeding system, or the feeding system can have a section for chopping or shredding large pieces into smaller pieces.

Figure 27C:
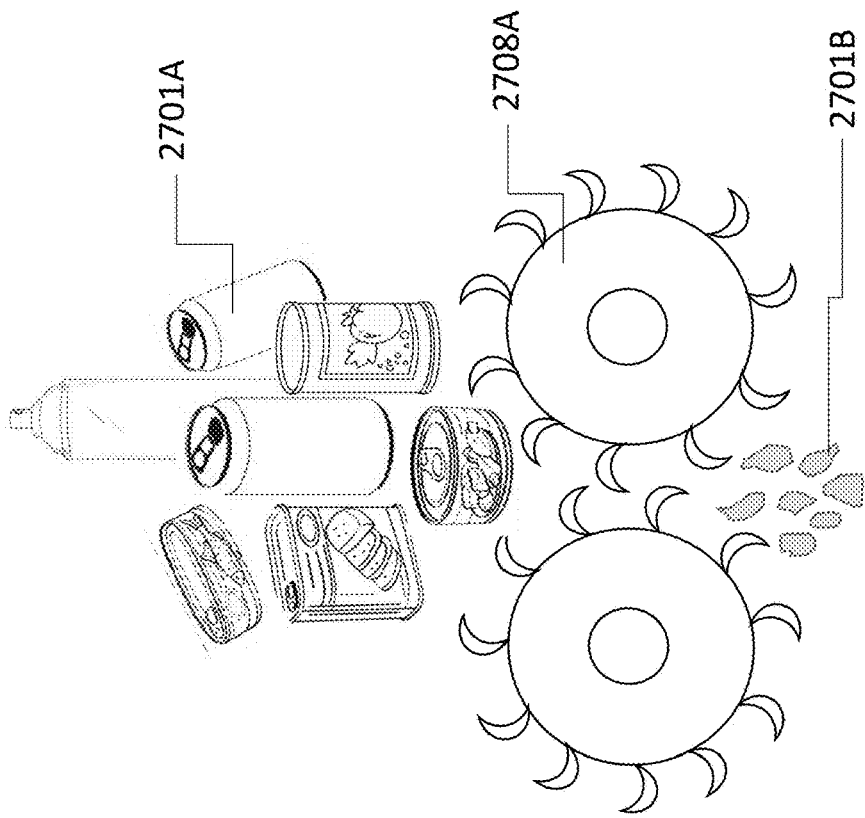
FIG. 27C is a schematic showing metal cans that can be introduced in the feeding system of the solid-state additive manufacturing system and used as filler material.

In one embodiment, the waste metal pieces are used cans 2701A (FIG. 27C) that can be shredded or chopped with rollers with crescent blades 2708A in the feeding section of the solid-state additive manufacturing system and consequently used as a filler material 2701B.

In another embodiment, the feeding system is capable of shredding used plastic objects, e.g. bottles 2701A (FIG. 27D) by way of feeding rollers with crescent blades 2708A, and such shredded material 2701B can then be used as a filler material in the solid-state additive manufacturing process.

Figure 28D:
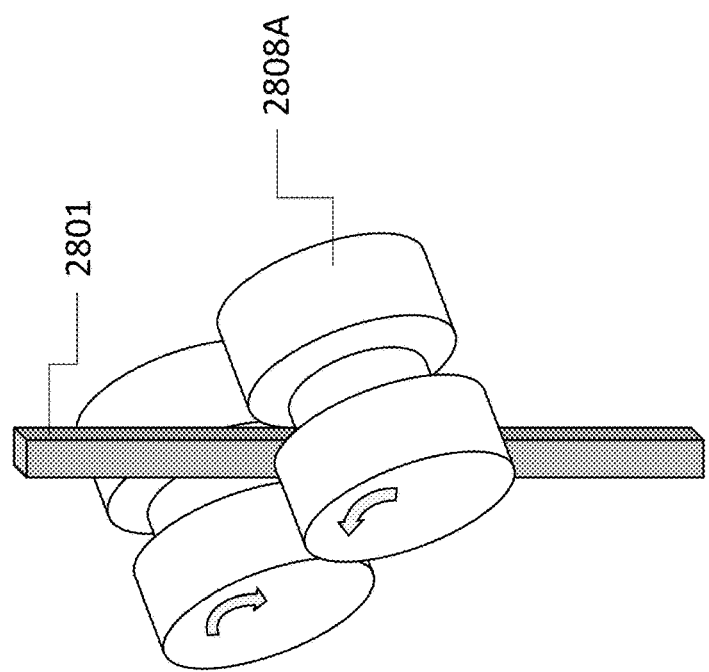
FIG. 28D is a schematic diagram showing feeding rollers with a groove (channel) for stabilizing the rod supply to the solid-state additive manufacturing machine according to an embodiment.
Figure 28C:
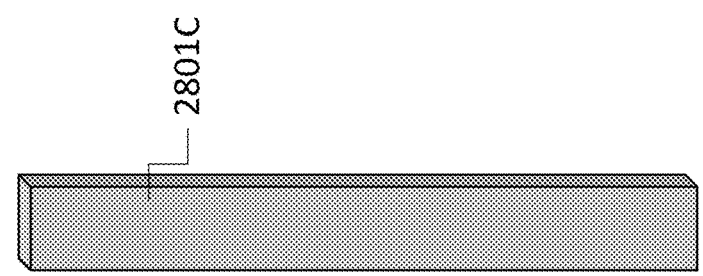
FIGS. 28A, 28B and 28C are schematic diagrams showing filler material rods with different cross-sections according to embodiments.

In some embodiments the filler material to be supplied to the solid-state additive manufacturing machine is a rod-like material. The rods can be of different shapes, e.g. with square, round, triangular or rectangular cross-sections, examples shown as 2801A, 2801B and 2801C in FIGS. 28A, 28B and 28C, respectively.

Figure 28B:
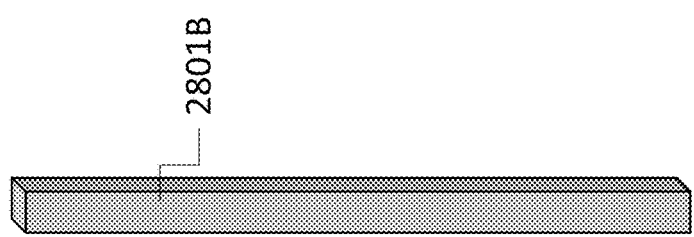
Figure 28A:
Figure 28F:
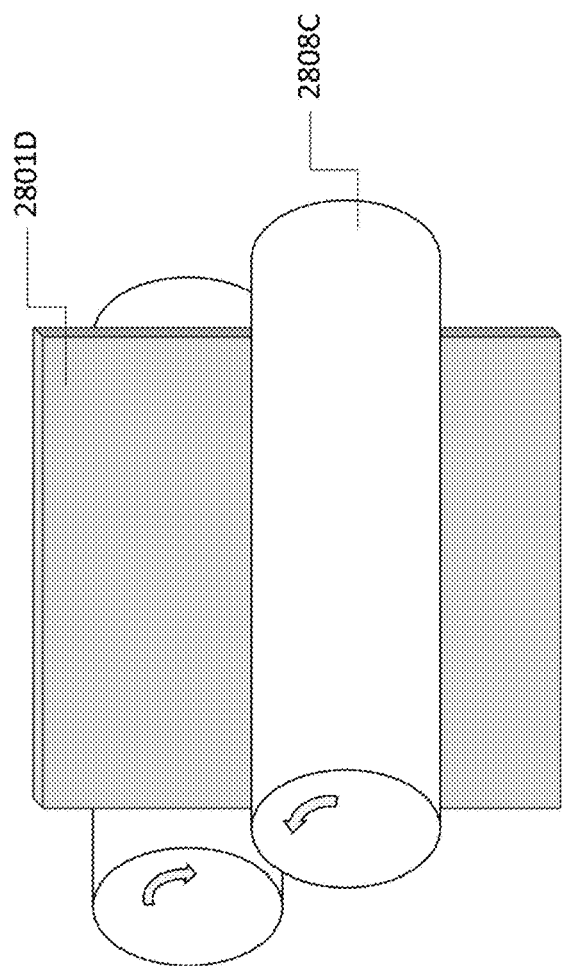
FIG. 28F is a schematic diagram of a drive wheel system for continuous supply of fillers in the form of plates, sheets and/or films according to an embodiment.

In one embodiment, the feeding rollers have one grove (channel) 2808A for a continuous and stable supply of a rod filler material with a square cross-sectional shape 2801 (FIG. 28B).

In yet another embodiment, the rollers have two or more channels (grooves) on their surface 2808B, which are capable of providing a continuous and stable supply of two or more rods of filler materials 2801A, 2801B and 2801C (FIG. 28C). The rods can be made of same material or different materials, which upon passing through heated rollers consolidate and yield in situ MMC, alloy, blend, or composite materials, and as such multicomponent materials can then be deposited onto the workpiece.

In some embodiments, the sets of rollers 2808C are capable of continuously accepting and pushing down plates, films and sheets of the filler material 2801D (FIG. 28D). For instance, many plastics come in the form of plates, sheets or films. Without any prior preparation, such as making pellets or granules, or cutting the sheets into rods, the gap between the rollers can be adjusted to accept and push down the particular plate/sheet/film according to the thickness that the filler material is available in.

Figure 28E:
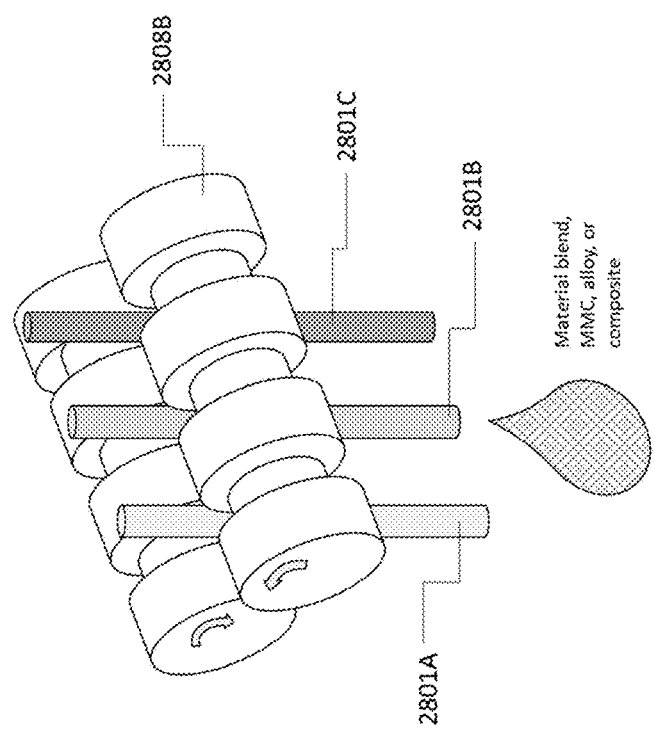
FIG. 28E is a schematic diagram showing feeding rollers with multiple groves for supplying multiple filler rods to the solid-state additive manufacturing machine according to an embodiment. The rods can be made of different materials enabling in situ formation of MMC, alloy, blends and composites before the filler material reaches the workpiece.
Figure 28G:
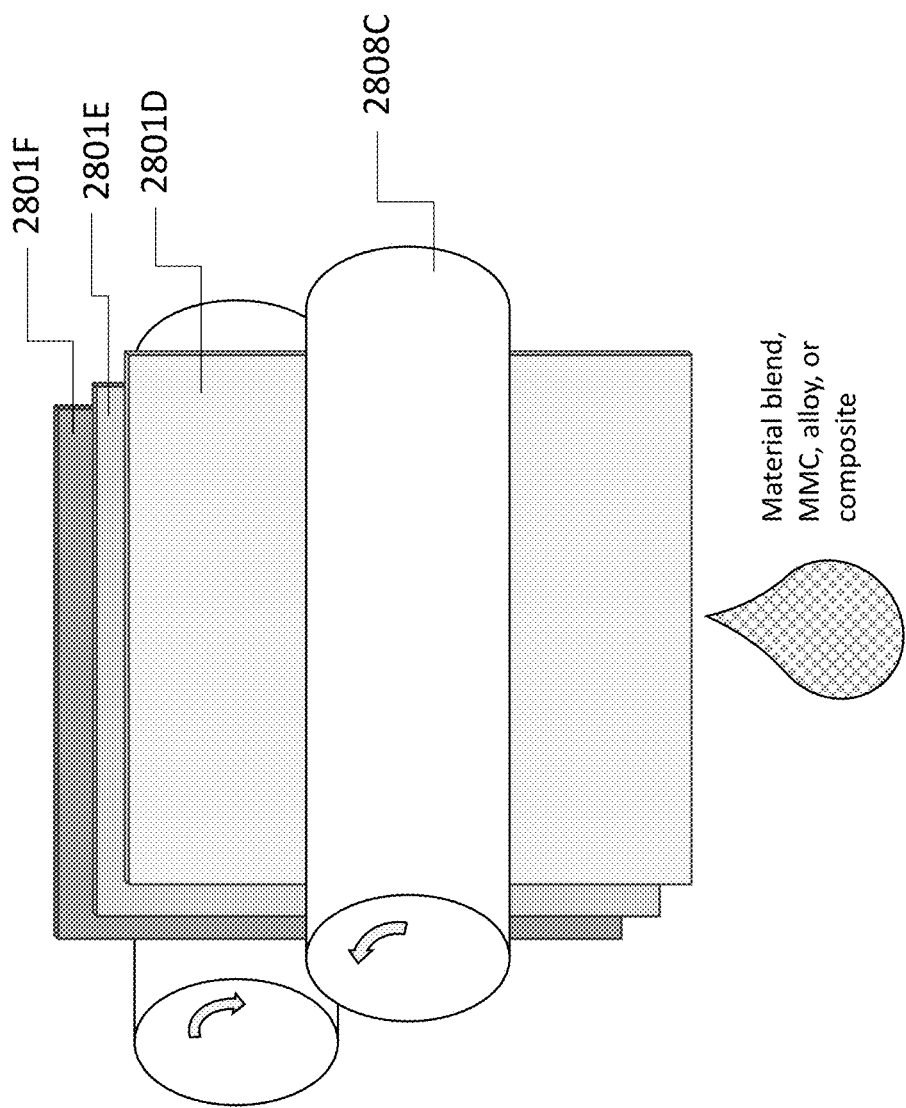
FIG. 28G is a schematic diagram of a drive wheel system for continuous supply of sheets made of different materials and in situ formation of MMC, blends, alloy and/or composites according to an embodiment.

In other embodiments, two or more sheets or films of the same or different filler materials 2801D, 2801E and 2801F are continuously supplied through heated rollers 2808C, where they are being consolidated into a single blend, mixture, alloy, composite material, and then, as such an in situ manufactured composite or hybrid material is then supplied to the solid-state additive manufacturing machine (FIG. 28E).

In some embodiments, the filler material is supplied in a powder form or as granules, beads, flakes, pellets, briquettes, chopped fibers or chopped wires. One or multiple types of materials 2901A and 2901B can be supplied via feeding ports 2910A and 2910B. Additives or liquids can be added (injected) via a special port 2911. To provide a continuous supply of well-mixed filler components, an auger screw 2917 and an agitator 2915 with agitator arms 2916 can be included in the feeding section, i.e. hopper 2913, as presented in FIG. 29A. The cover 2914 is optional and serves the purpose of suppressing release of volatile compounds and dust into the surrounding environment. To enable better mixing of the starting filler components, a heater 2918 can be added to the hopper or along its walls. The final material stream 2901C is mixed in the feeding/hopper section serves as the filler material supplied to the subsequent section of the solid-state additive manufacturing system (i.e. to the spindle) (FIG. 29A).

In yet other embodiments, the drive wheels in the feeding section are not only used to provide a continuous supply of filler, but also for mixing, compression, consolidation, squeezing/kneading, cutting, or chopping of the initial fillers.

Figure 29B:
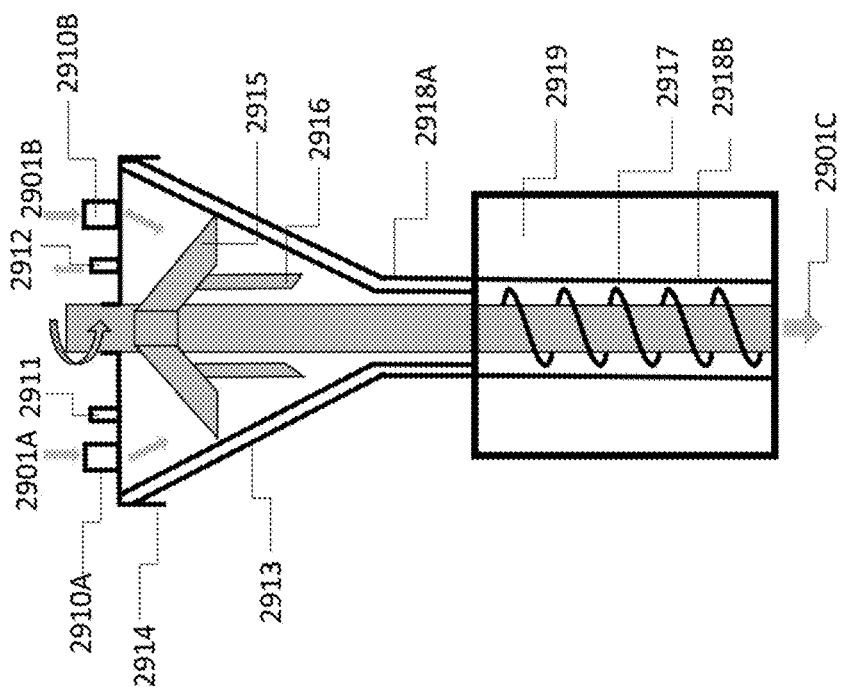
FIGS. 29A and 29B are schematic diagrams of several feeding systems with auger screws for delivering powder, beads, flakes and/or granular filler material, where
Figure 29A:
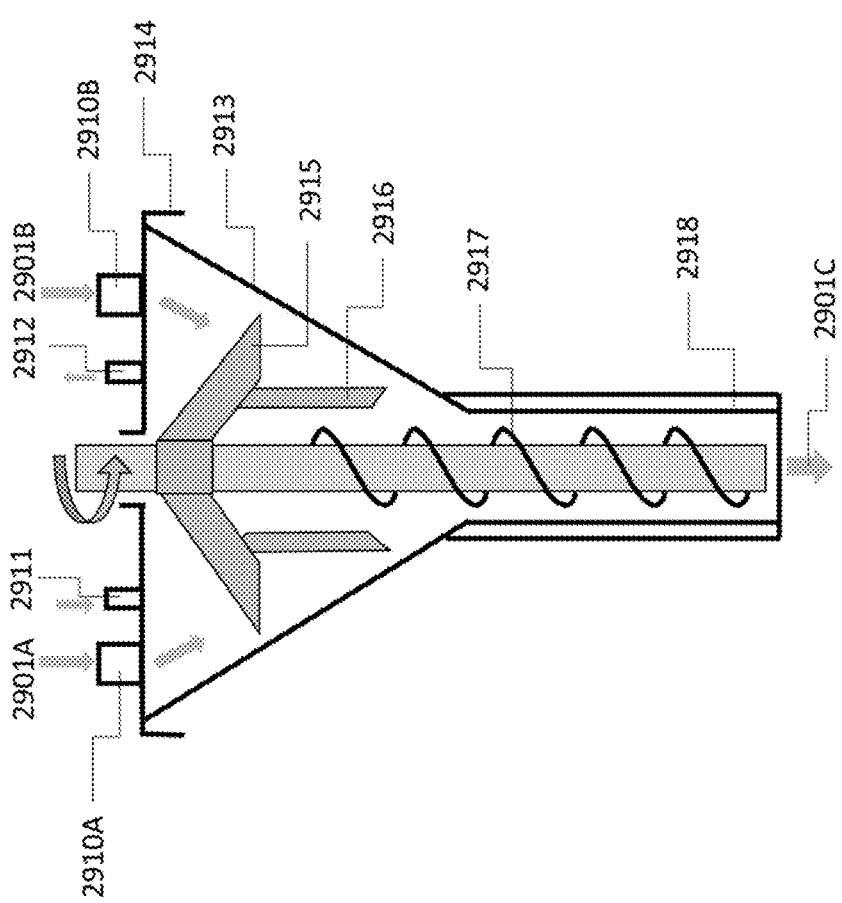

In some embodiments, the feeding section is equipped with multiple ports 2910A, and 2910B, such as a port for liquid (additives) injection 2911 and a port for venting (or degassing) 2912, as presented in FIG. 29A.

In a particular embodiment, the auger screw 2917 and the agitator 2915 with agitator arms 2916 are introduced into the feeding system (FIG. 29A). One, two or more materials 2901A, 2901B, etc. are supplied via filler materials ports 2910A, 2910B, etc. and mixed well in the entrance section (hopper) 2913 of the feeding system. In addition, a variety of additives (in solid or liquid form), such as lubricants, plasticizers, UV-, ozone- or thermal-stabilizers and others can be supplied in this section via specially designed ports (or injection ports) 2911, or the additives can be mixed together with the filler material prior to the fillers' entrance into the feeding system.

In yet another embodiment, the feeding section is equipped with an agitator 2915 and agitator arms 2916, while the auger screw 2917 is located in the spindle 2919, as presented in FIG. 29B. Heater units 2918A and 2918B can be added to the hopper 2913 and the spindle 2919, respectively.

Figure 29C:
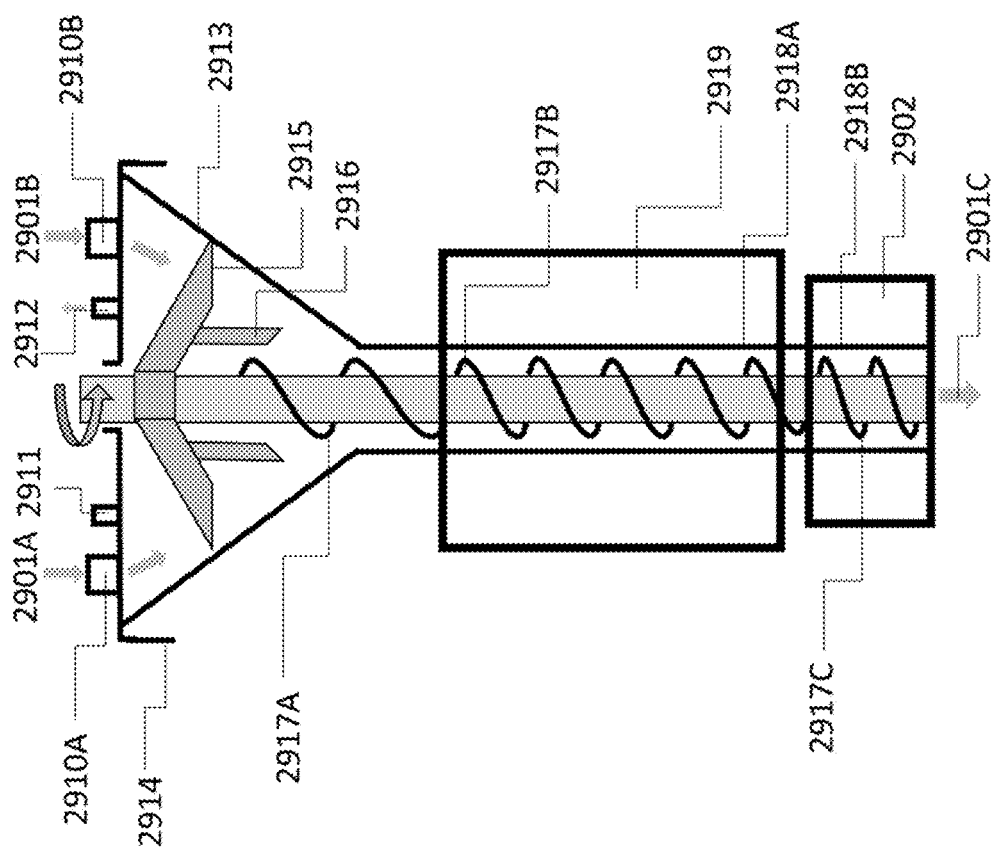
FIG. 29C is a schematic diagram showing an auger screw extending from the hopper via the spindle into the hollow tool according to an embodiment.
Figure 30H:
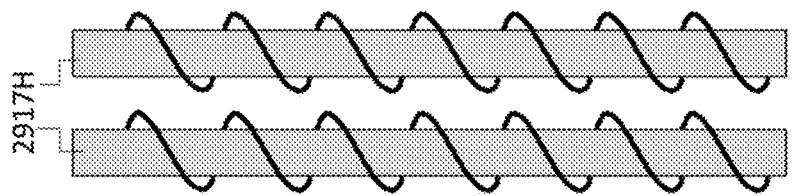
FIGS. 30A, 30B, 30C, 30D, 30E, 30F, 30G and 30H are schematic diagrams showing various auger screw designs used for continuous supply of powder and/or granular filler material according to embodiments.
Figure 30G:
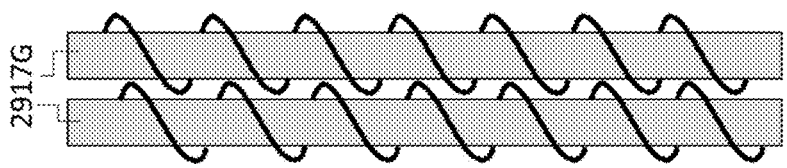
Figure 30F:
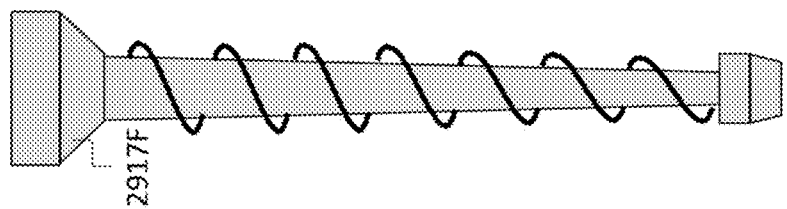
Figure 30E:
Figure 30D:
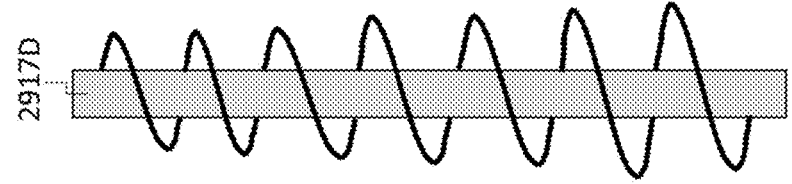
Figure 30C:
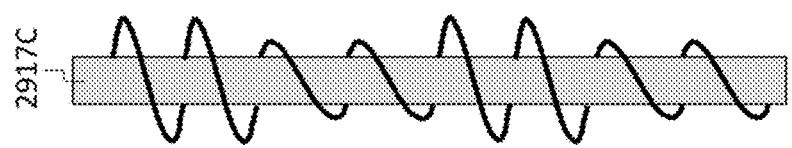
Figure 30B:
Figure 30A:

The auger screw 2917 from the feeding section can extend to other sections of the solid-state additive manufacturing system, e.g. in the spindle 2919 and the tool 2902, as presented in FIG. 29C.

In some embodiments, the feeding section is equipped with a heater 2918, which can be any type of heat exchanger, wall heater, etc. In a particular embodiment, the hopper can be heated inside its cavity or by way of surface heating of the hopper walls.

In another embodiment, a vibration is provided in the hopper and/or other sections of the solid-state additive manufacturing system to enable better mixing and supply of the filler material to the next section of the solid-state additive manufacturing system.

In a particular embodiment, the hopper is equipped with an agitator 2915 and agitator arms 2916 to mix the filler materials in powder, granular, bead, pellet, flakes, and/or briquette form or their combinations along with the additives (lubricants, plasticizers, stabilizers). Then the spindle 2919 with auger screw 2917 is used to further mix and supply the mixed material into the next section of the solid-state additive manufacturing system (FIG. 29B).

In another embodiment, in addition to the agitator, the auger screw is used in the hopper, which extends also in the spindle and the hollow tool (FIG. 29C). The auger screw 2917 can have the same design in all three sections, i.e. in the hopper 2913, the spindle 2919 and the tool 2902, or can vary in diameter and pitch as it extends from one section into another.

In another embodiment, the auger screw for a continuous supply of a filler material is used only in the hollow tool 2902. This particular design can provide quick changes in the flow rate of the filler on the workpiece.

The auger screw designs, used for a continuous supply of materials in a powder, granular, pellet, bead, briquette, flake and other forms, can vary and several examples used in embodiments of the present invention are shown in FIG. 30. For instance, examples of auger screws with constant pitch 2917A (FIG. 30A), variable pitch 2917B (FIG. 30B), variable depth 2917D (FIG. 30D), variable pitch and depth 2917C (FIG. 30C), variable diameter screws 2917E (FIG. 30E), screws with specific endings 2917F (FIG. 30F), twin- or double-auger screws 2917G and 2917H, respectively are shown in FIGS. 30G and 30H. Auger screws with full-pitch, half-pitch segments, tapered- or ribbon-segments can also be used, depending on the material type or form needed to be supplied. Screws with paddle-type blades or crescent-type blades can also be used in certain embodiments.

In some embodiments, the auger screw has a pitch in the range between 10 inches and 0.1 inch, more preferably between 2 inches and 0.2 inches, and most preferably in the range of between 1 inch and 0.3 inches.

In some embodiments, the auger screw has a thread with specific designs that provide less wearing of the threads. For instance, in one embodiment, the front side of the thread is designed to be perpendicular to the auger screw axis. In yet another embodiment, the back side of the thread is such that it has an angle between 10 degrees and 50 degrees, and more preferably between 20 degrees and 30 degrees, with respect to the auger screw axis.

In other embodiments, shaftless flights, or sectional flights (individual turns, helicoidal flights, wraps) are used to move larger pieces of filler materials (e.g. chopped plastic bottles, used bullet casings), sticky materials, lumps, and so on, especially in the entrance section of the feeding system.

In some embodiments, the feeding system is capable of supplying filler material in a form of beads, granules, pellets, briquettes, flakes, fibers (chopped, continuous), irregular or regular shaped particles and their combinations.

In yet other embodiments, besides the filler material, the feeding system is capable of supplying additives such as lubricants (powder, liquid, gels), plasticizers, stabilizers (UV-, ozone-, thermal-stabilizers), reinforcers, fillers and so on, to the solid-state additive manufacturing machine.

The system(s) of the invention can include, at a minimum, one or more computer processor(s) for carrying out the computer-executable instructions of the invention. In addition, or alternatively, the system(s) can include a conventional computer or specialized computer with components such as one or more processor(s), memory, hard drive, graphics processing unit (GPU), and input/output devices such as display, keyboard, and mouse. Such computer can be in communication with the solid-state additive manufacturing machine by way of a wired or wireless connection for issuing commands to various components of the solid-state additive manufacturing machine such as the actuator, or any other actuator, motor, or controller described herein. Further, such computer may be in a wired or wireless communication with any sensor, gauge, or detector described herein for providing inputs to any software, firmware, or hardware for carrying out the methods of the invention. The processor(s) or computer can be separate from the machine or can be integrated with the machine (e.g. share a housing).

The system can also include a non-transitory computer storage media such as RAM which stores a set of computer executable instructions (software) for instructing the processors to carry out any of the methods described in this disclosure. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include the set of computer-executable instructions for providing an operating system as well as a set of computer-executable instructions, or software, for implementing the methods of the invention.

According to embodiments, the solid-state additive manufacturing machine may be or include any tool described or depicted in US Application Publication Nos. 2010/0285207, 2012/0279441, 2015/0165546, 2017/0216962, which are hereby incorporated by reference herein in their entireties. According to one embodiment, the machine comprises a friction-based fabrication tool comprising: a non-consumable body formed from material capable of resisting deformation when subject to frictional heating and compressive loading and a throat defining a passageway lengthwise through the body and shaped for exerting normal forces on a material in the throat during rotation of the body.

According to another embodiment, the machine comprises a non-consumable member having a body and a throat; wherein the throat is shaped to exert a normal force on a consumable material disposed therein for imparting rotation to the coating material from the body when rotated at a speed sufficient for imposing frictional heating of the coating material against a substrate; wherein the body is operably connected with a downward force actuator for dispensing and compressive loading of the consumable material from the throat onto the substrate and with one or more actuators or motors capable of rotating and translating the body relative to the substrate; wherein the body comprises a surface capable of trapping the consumable material loaded on the substrate in a volume between the body and the substrate and forming and shearing a surface of a coating on the substrate.

Other specific embodiments include friction-based fabrication tools comprising: (a) a spindle member comprising a hollow interior capable of housing a consumable coating or filler material disposed therein prior to deposition on a substrate; wherein the interior of the spindle is shaped to exert a normal force on the consumable material disposed therein for rotating the consumable material during rotation of the spindle; (b) a downward force actuator, in operable communication with the spindle, capable of dispensing and compressive loading of the consumable material from the spindle onto the substrate and with one or more motors or actuators for rotating and translating the spindle relative to the substrate; and wherein the spindle comprises a shoulder surface with a flat surface geometry or a surface geometry with structure capable of enhancing mechanical stirring of the loaded consumable material, which shoulder surface is operably configured for trapping the loaded consumable material in a volume between the shoulder and the substrate and forming and shearing a surface of a coating on the substrate.

In some embodiments, the throat has a non-circular cross-sectional shape. Additionally, any filler material can be used as the consumable material, including consumable solid, powder, or powder-filled tube type coating materials. In the case of a powder-type coating material, the powder can be loosely or tightly packed within the interior throat of the tool, with normal forces being more efficiently exerted on tightly packed powder filler material. Packing of the powder filler material can be achieved before or during the coating process.

Further provided are tooling configurations comprising any configuration described in this disclosure, or any configuration needed to implement a method according to the invention described herein, combined with a consumable filler material member. Thus, tooling embodiments of the invention include a non-consumable portion (resists deformation under heat and pressure) alone or together with a consumable coating material or consumable filler material (e.g., such consumable materials include those that would deform, melt, or plasticize under the amount of heat and pressure the non-consumable portion is exposed to).

Another aspect of the present invention is to provide a method of forming a surface layer on a substrate, such as repairing a marred surface, building up a surface to obtain a substrate with a different thickness, joining two or more substrates together, or filling holes in the surface of a substrate. Such methods can comprise depositing a coating or filler material on the substrate with tooling described in this disclosure, and optionally friction stirring the deposited coating material, e.g., including mechanical means for combining the deposited coating material with material of the substrate to form a more homogenous coating-substrate interface. Depositing and stirring can be performed simultaneously, or in sequence with or without a period of time in between. Depositing and stirring can also be performed with a single tool or separate tools, which are the same or different.

Particular methods include depositing a coating on a substrate using frictional heating and compressive loading of a coating material against the substrate, where a tool supports the coating material during frictional heating and compressive loading and is operably configured for forming and shearing a surface of the coating.

In embodiments, the tool and consumable material preferably rotate relative to the substrate. The tool can be attached to the consumable material and optionally in a manner to allow for repositioning of the tool on the coating material. Such embodiments can be configured to have no difference in rotational velocity between the coating material and tool during use. The consumable material and tool can alternatively not be attached to allow for continuous or semi-continuous feeding or deposition of the consumable material through the throat of the tool. In such designs, it is possible that during use there is a difference in rotational velocity between the consumable material and tool during the depositing. Similarly, embodiments provide for the consumable material to be rotated independently or dependently of the tool.

Preferably, the consumable material is delivered through a throat of the tool and optionally by pulling or pushing the consumable material through the throat. In embodiments, the consumable material has an outer surface and the tool has an inner surface, wherein the outer and inner surfaces are complementary to allow for a key and lock type fit. Optionally, the throat of the tool and the consumable material are capable of lengthwise slideable engagement. Even further, the throat of the tool can have an inner diameter and the consumable material can be a cylindrical rod concentric to the inner diameter. Further yet, the tool can have a throat with an inner surface and the consumable material can have an outer surface wherein the surfaces are capable of engaging or interlocking to provide rotational velocity to the consumable material from the tool. In preferred embodiments, the consumable filler or coating material is continuously or semi-continuously fed and/or delivered into and/or through the throat of the tool. Shearing of any deposited consumable material to form a new surface of the substrate preferably is performed in a manner to disperse any oxide barrier coating on the substrate.

Yet another aspect of the present invention is to provide a method of forming a surface layer on a substrate, which comprises filling a hole in a substrate. The method comprises placing powder of a fill material in the hole(s) and applying frictional heating and compressive loading to the fill material powder in the hole to consolidate the fill material.

In yet another embodiment, the machine, in addition to including a tool described in this specification, includes a substrate. Materials that can serve as the consumable filler material or as the substrate(s) can include metals and metallic materials, polymers and polymeric materials, ceramic and other reinforced materials, as well as combinations of these materials. In embodiments, the filler material can be of a similar or dissimilar material as that of the substrate material(s). The filler material and the substrate(s) can include polymeric material or metallic material, and without limitation can include metal-metal combinations, metal matrix composites, polymers, polymer matrix composites, polymer-polymer combinations, metal-polymer combinations, metal-ceramic combinations, and polymer-ceramic combinations.

In one particular embodiment, the substrate(s) and/or the filler material are metal or metallic. The filer material, or the substrate(s) can be independently selected from any metal, including for example Al, Ni, Cr, Cu, Co, Au, Ag, Mg, Cd, Pb, Pt, Ti, Zn, or Fe, Nb, Ta, Mo, W, or an alloy comprising one or more of these metals. In embodiments, the substrate(s) and/or the filler material are polymeric material. Non-limiting examples of polymeric materials useful as a filler material include polyolefins, polyesters, nylons, vinyls, polyvinyls, acrylics, polyacrylics, polycarbonates, polystyrenes, polyurethanes, and the like.

In still yet another embodiment, the filler material is a composite material comprising at least one metallic material and at least one polymeric material. In other embodiments, multiple material combinations can be used for producing a composite at the interface.

The filler materials can be in several forms, including but not limited to: 1) a metal powder or rod of a single composition; 2) mixed matrix metal and reinforcement powders; or 3) a solid rod of matrix bored to create a tube or other hollow cylinder type structure and filled with reinforcement powder, or mixtures of metal matric composite and reinforcement material. In the latter, mixing of the matrix and reinforcement can occur further during the fabrication process. In embodiments, the filler material may be a solid metal rod. In one embodiment, the filler material is aluminum.

According to embodiments, the filler material and/or the substrate(s) are independently chosen from plastics, homo polymers, co-polymers, or polymeric materials comprising polyesters, nylons, polyvinyls such as polyvinyl chloride (PVC), polyacrylics, polyethylene terephthalate (PET or PETE), polylactide, polycarbonates, polystyrenes, polyurethanes, and/or polyolefins such as high density polyethylene (HDPE), low density polyethylene (LDPE), polypropylene, composites, mixtures, reinforcement materials, or a metal matrix composite comprising a metal matrix and a ceramic phase, wherein the metal matrix comprises one or more of a metal, a metal alloy, or an intermetallic, and the ceramic phase comprises a ceramic, and independently chosen from metallic materials, metal matrix composites (MMCs), ceramics, ceramic materials such as SiC, TiB2 and/or $Al_2O_3$, metals comprising steel, Al, Ni, Cr, Cu, Co, Au, Ag, Mg, Cd, Pb, Pt, Ti, Zn, Fe, Nb, Ta, Mo, W, or an alloy comprising one or more of these metals, as well as combinations of any of these materials The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

What is claimed is:

1. A system to control addition of a solid filler material to a surface of a workpiece using a solid-state additive manufacturing system, the system comprising:
 a spindle configured to receive solid filler material;
 tooling configured to receive the solid filler material from the spindle and add the solid filler material to the surface of the workpiece to provide added solid filler material with a selected microstructure on the surface of the workpiece, wherein the tooling comprises a body and a throat capable of receiving the solid filler material from the spindle, and wherein the spindle is configured to provide a downward force to push the solid filler material through the throat of the tooling during addition of the solid filler material to the surface of the workpiece; and
 a controller electrically coupled to the spindle and the tooling to control the selected microstructure of the solid filler material added to the surface of the workpiece, wherein the controller is configured to receive a first process variable from the spindle and a second process variable from the tooling, and wherein the controller is configured to independently control the spindle using the received, first process variable and control the tooling using the received, second process variable, to add the solid filler material from the tooling to the surface of the workpiece as plasticly deformed solid filler material, and wherein the controller is configured to use the received, second process variable to control the provided downward force from the spindle.

2. The system of claim 1, wherein the controller is configured to provide the selected microstructure that comprises one or more of a honeycomb structure, a sandwich structure, or a repeating block structure.

3. The system of claim 1, further comprising a solid filler system configured to provide the solid filler material to the spindle, wherein the controller is configured to use a received, third process variable from the solid filler system to control continuous loading of solid filler material into the solid filler system to permit continuous addition of the plasticly deformed solid filler material to the surface of the workpiece.

4. The system of claim 3, wherein the controller is configured to use the received, third process variable to control a down force that pushes the solid filler material toward the spindle.

5. The system of claim 3, wherein the controller is configured to use the received, second process variable to control angular velocity of the tooling during addition of the plasticly deformed solid filler material to the surface of the workpiece.

6. The system of claim 3, wherein the controller is configured to use the received, second process variable to control torque of the tooling during addition of the plasticly deformed solid filler material to the surface of the workpiece.

7. The system of claim 3, wherein the controller is configured to use the received, second process variable and provide closed loop control to control a friction force between the tooling and the surface of the workpiece during addition of the plasticly deformed solid filler material to the surface of the workpiece.

8. The system of claim 3, wherein the controller is configured to use the received, second process variable to control transverse movement of the tooling while the plasticly deformed solid filler material is added to the surface of the workpiece.

9. The system of claim 3, wherein the controller is configured to use the received, second process variable to control layering of the plasticly deformed solid added filler material on the surface of the workpiece.

10. The system of claim 3, wherein the controller is configured to use the received, second process variable to control the temperature of the surface of the workpiece.

11. The system of claim 3, wherein the controller is configured to use the received, third process variable to control a temperature of solid filler material in the solid filler system.

12. The system of claim 1, wherein the controller is configured to monitor thickness and width of the solid filler material added to the surface of the workpiece, and wherein when the thickness and width of the added solid filler material is achieved, the controller is configured to retract the tooling from the surface of the workpiece to discontinue addition of the solid filler material to the surface of the workpiece.

13. The system of claim 1, further comprising a first sensor configured to measure the first process variable, and a second sensor configured to measure the second process variable, wherein the first sensor and the second sensor are each electrically coupled to the controller.

* * * * *